United States Patent
Misra et al.

(10) Patent No.: US 12,407,838 B2
(45) Date of Patent: *Sep. 2, 2025

(54) SYSTEMS AND METHODS FOR APPLYING DEBLOCKING FILTERS TO RECONSTRUCTED VIDEO DATA

(71) Applicant: Sharp Kabushiki Kaisha, Sakai (JP)

(72) Inventors: Kiran Mukesh Misra, Vancouver, WA (US); Christopher Andrew Segall, Vancouver, WA (US); Philip Cowan, Vancouver, WA (US); Frank Bossen, Vancouver, WA (US)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/746,205

(22) Filed: Jun. 18, 2024

(65) Prior Publication Data
US 2024/0340432 A1    Oct. 10, 2024

Related U.S. Application Data

(63) Continuation of application No. 17/622,073, filed as application No. PCT/JP2020/024983 on Jun. 25, 2020, now Pat. No. 12,058,350.

(60) Provisional application No. 62/900,965, filed on Sep. 16, 2019, provisional application No. 62/898,411, filed on Sep. 10, 2019, provisional application No. 62/891,262, filed on Aug. 23, 2019, provisional application No. 62/871,156, filed on Jul. 7, 2019, provisional application No. 62/866,596, filed on Jun. 25, 2019.

(51) Int. Cl.
*H04N 19/186* (2014.01)
*H04N 19/117* (2014.01)
*H04N 19/14* (2014.01)
*H04N 19/176* (2014.01)

(52) U.S. Cl.
CPC ........ *H04N 19/186* (2014.11); *H04N 19/117* (2014.11); *H04N 19/14* (2014.11); *H04N 19/176* (2014.11)

(58) Field of Classification Search
CPC ..... H04N 19/186; H04N 19/14; H04N 19/117
See application file for complete search history.

(56) References Cited

PUBLICATIONS

Misra et al., "Systems and Methods for Applying Deblocking Filters To Reconstructed Video Data", U.S. Appl. No. 17/622,073, filed Dec. 22, 2021.

*Primary Examiner* — On S Mung
(74) *Attorney, Agent, or Firm* — Keating & Bennett, LLP

(57) ABSTRACT

This disclosure relates to video coding and more particularly to techniques for performing deblocking of reconstructed video data. According to an aspect of an invention, reconstructed video data having a 4:2:2 chroma format is received and for a four line decision segment corresponding to a vertical deblocking boundary for a chroma component of the video data, a gradient value is computed using samples included in the first and fourth lines.

3 Claims, 25 Drawing Sheets

FIG. 6

| | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| Q | 0 | 1 | 2 | 3 | 4 | 5 | 6 | 7 | 8 | 9 | 10 | 11 | 12 | 13 | 14 | 15 | 16 |
| B' | 0 | 0 | 0 | 0 | 0 | 0 | 0 | 0 | 0 | 0 | 0 | 0 | 0 | 0 | 0 | 0 | 6 |
| tc' | 0 | 0 | 0 | 0 | 0 | 0 | 0 | 0 | 0 | 0 | 0 | 0 | 0 | 0 | 0 | 0 | 0 |
| Q | 17 | 18 | 19 | 20 | 21 | 22 | 23 | 24 | 25 | 26 | 27 | 28 | 29 | 30 | 31 | 32 | 33 |
| B' | 7 | 8 | 9 | 10 | 11 | 12 | 13 | 14 | 15 | 16 | 17 | 18 | 20 | 22 | 24 | 26 | 28 |
| tc' | 0 | 1 | 1 | 1 | 1 | 1 | 1 | 1 | 1 | 1 | 2 | 2 | 2 | 2 | 3 | 3 | 3 |
| Q | 34 | 35 | 36 | 37 | 38 | 39 | 40 | 41 | 42 | 43 | 44 | 45 | 46 | 47 | 48 | 49 | 50 |
| B' | 30 | 32 | 34 | 36 | 38 | 40 | 42 | 44 | 46 | 48 | 50 | 52 | 54 | 56 | 58 | 60 | 62 |
| tc' | 3 | 4 | 4 | 4 | 5 | 5 | 6 | 6 | 7 | 8 | 9 | 10 | 11 | 13 | 14 | 16 | 18 |
| Q | 51 | 52 | 53 | 54 | 55 | 56 | 57 | 58 | 59 | 60 | 61 | 62 | 63 | 64 | 65 | | |
| B' | 64 | 66 | 68 | 70 | 72 | 74 | 76 | 78 | 80 | 82 | 84 | 86 | 88 | - | - | | |
| tc' | 20 | 22 | 25 | 28 | 31 | 35 | 39 | 44 | 50 | 56 | 63 | 70 | 79 | 88 | 99 | | |

4:4:4 Sampling Format

SYSTEMS AND METHODS FOR APPLYING DEBLOCKING FILTERS TO RECONSTRUCTED VIDEO DATA

TECHNICAL FIELD

This disclosure relates to video coding and more particularly to techniques for performing deblocking of reconstructed video data.

BACKGROUND ART

Digital video capabilities can be incorporated into a wide range of devices, including digital televisions, laptop or desktop computers, tablet computers, digital recording devices, digital media players, video gaming devices, cellular telephones, including so-called smartphones, medical imaging devices, and the like. Digital video may be coded according to a video coding standard. Video coding standards define the format of a compliant bitstream encapsulating coded video data. A compliant bitstream is a data structure that may be received and decoded by a video decoding device to generate reconstructed video data. Video coding standards may incorporate video compression techniques. Examples of video coding standards include ISO/IEC MPEG-4 Visual and ITU-T H.264 (also known as ISO/IEC MPEG-4 AVC) and High-Efficiency Video Coding (HEVC). HEVC is described in High Efficiency Video Coding (HEVC), Rec. ITU-T H.265, December 2016, which is incorporated by reference, and referred to herein as ITU-T H.265. Extensions and improvements for ITU-T H.265 are currently being considered for the development of next generation video coding standards. For example, the ITU-T Video Coding Experts Group (VCEG) and ISO/IEC (Moving Picture Experts Group (MPEG) (collectively referred to as the Joint Video Exploration Team (JVET)) are working to standardized video coding technology with a compression capability that significantly exceeds that of the current HEVC standard. The Joint Exploration Model 7 (JEM 7), Algorithm Description of Joint Exploration Test Model 7 (JEM 7), ISO/IEC JTC1/SC29/WG11 Document: JVET-G1001, July 2017, Torino, IT, which is incorporated by reference herein, describes the coding features that were under coordinated test model study by the JVET as potentially enhancing video coding technology beyond the capabilities of ITU-T H.265. It should be noted that the coding features of JEM 7 are implemented in JEM reference software. As used herein, the term JEM may collectively refer to algorithms included in JEM 7 and implementations of JEM reference software. Further, in response to a "Joint Call for Proposals on Video Compression with Capabilities beyond HEVC," jointly issued by VCEG and MPEG, multiple descriptions of video coding tools were proposed by various groups at the 10$^{th}$ Meeting of ISO/IEC JTC1/SC29/WG11 16-20 Apr. 2018, San Diego, CA. From the multiple descriptions of video coding tools, a resulting initial draft text of a video coding specification is described in "Versatile Video Coding (Draft 1)," 10$^{th}$ Meeting of ISO/IEC JTC1/SC29/WG11 16-20 Apr. 2018, San Diego, CA, document JVET-J1001-v2, which is incorporated by reference herein, and referred to as JVET-J1001. The current development of a next generation video coding standard by the VCEG and MPEG is referred to as the Versatile Video Coding (VVC) project. "Versatile Video Coding (Draft 5)," 14th Meeting of ISO/IEC JTC1/SC29/WG11 19-27 Mar. 2019, Geneva, CH, document JVET-N1001-v8, which is incorporated by reference herein, and referred to as JVET-N1001, represents an iteration of the draft text of a video coding specification corresponding to the VVC project.

Video compression techniques enable data requirements for storing and transmitting video data to be reduced. Video compression techniques may reduce data requirements by exploiting the inherent redundancies in a video sequence. Video compression techniques may sub-divide a video sequence into successively smaller portions (i.e., groups of pictures within a video sequence, a picture within a group of pictures, regions within a picture, sub-regions within regions, etc.). Intra prediction coding techniques (e.g., spatial prediction techniques within a picture) and inter prediction techniques (i.e., inter-picture techniques (temporal)) may be used to generate difference values between a unit of video data to be coded and a reference unit of video data. The difference values may be referred to as residual data. Residual data may be coded as quantized transform coefficients. Syntax elements may relate residual data and a reference coding unit (e.g., intra-prediction mode indices, and motion information). Residual data and syntax elements may be entropy coded. Entropy encoded residual data and syntax elements may be included in data structures forming a compliant bitstream

SUMMARY OF INVENTION

In one example, a method of filtering reconstructed video data, the method comprising: receiving reconstructed video data having a 4:2:2 chroma format; for a four line decision segment corresponding to a vertical deblocking boundary for a chroma component of the video data, computing a gradient value using samples included in the first and fourth lines; modifying a parameter on which a filter length depends by using sample values adjacent to the vertical deblocking boundary.

In one example, a device for coding video data, the device comprising one or more processors configured to: receive reconstructed video data having a 4:2:2 chroma format; for a four line decision segment corresponding to a vertical deblocking boundary for a chroma component of the video data, compute a gradient value using samples included in the first and fourth lines; and modify a parameter on which a filter length depends by using sample values adjacent to the vertical deblocking boundary.

BRIEF DESCRIPTION OF DRAWINGS

FIG. 6 is an example of a table that may be used to determine deblocking parameters in accordance with one or more techniques of this disclosure.

DESCRIPTION OF EMBODIMENTS

Figure 1:
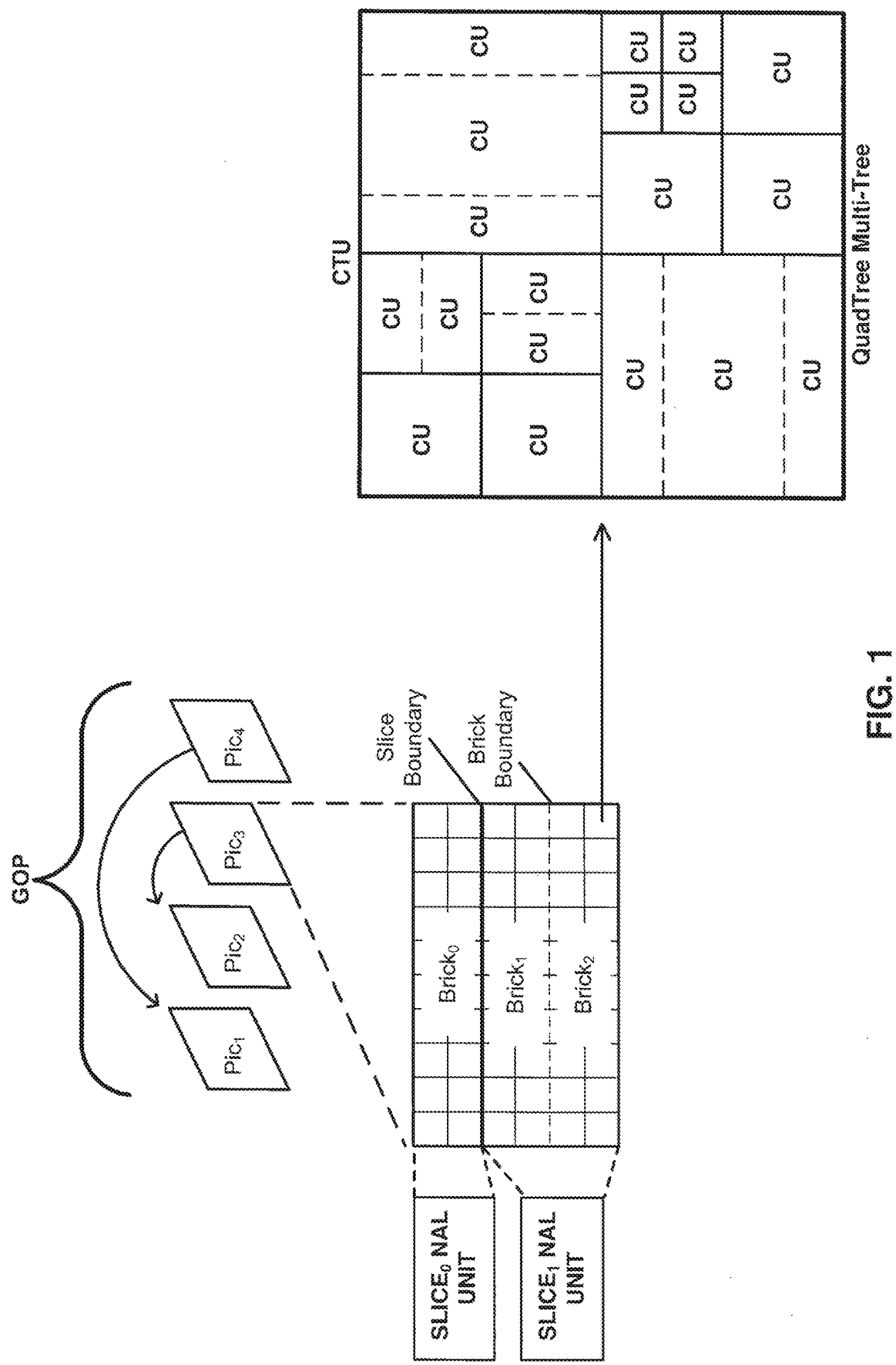
FIG. 1 is a conceptual diagram illustrating an example of a group of pictures coded according to a quad tree multi-tree partitioning in accordance with one or more techniques of this disclosure.

In general, this disclosure describes various techniques for coding video data. In particular, this disclosure describes techniques for performing deblocking of reconstructed video data. It should be noted that although techniques of this disclosure are described with respect to ITU-T H.264, ITU-T H.265, JEM, and JVET-N1001 the techniques of this disclosure are generally applicable to video coding. For example, the coding techniques described herein may be incorporated into video coding systems, (including video coding systems based on future video coding standards) including video block structures, intra prediction techniques, inter prediction techniques, transform techniques, filtering techniques, and/or entropy coding techniques other than those included in ITU-T H.265, JEM, and JVET-N1001. Thus, reference to ITU-T H.264, ITU-T H.265, JEM, and/or JVET-N1001 is for descriptive purposes and should not be construed to limit the scope of the techniques described herein. Further, it should be noted that incorporation by reference of documents herein is for descriptive purposes and should not be construed to limit or create ambiguity with respect to terms used herein. For example, in the case where an incorporated reference provides a different definition of a term than another incorporated reference and/or as the term is used herein, the term should be interpreted in a manner that broadly includes each respective definition and/or in a manner that includes each of the particular definitions in the alternative.

In one example, a method of filtering reconstructed video data comprises receiving arrays of sample values including adjacent reconstructed video blocks for respective luma and chroma channels of video data, for each of a horizontal and vertical direction, determining whether the number of chroma samples is half of or equal to the number of luma samples, selecting lines for computing gradients for determining blockiness for chroma based on the determination, determining blockiness based on the selected lines, and modifying sample values in the adjacent reconstructed video blocks based on the determined blockiness according to a deblocking filter.

In one example, a device for video coding comprises one or more processors configured to receive arrays of sample values including adjacent reconstructed video blocks for respective luma and chroma channels of video data, for each of a horizontal and vertical direction, determine whether the number of chroma samples is half of or equal to the number of luma samples, select lines for computing gradients for determining blockiness for chroma based on the determination, determine blockiness based on the selected lines, and modify sample values in the adjacent reconstructed video blocks based on the determined blockiness according to a deblocking filter.

In one example, a non-transitory computer-readable storage medium comprises instructions stored thereon that, when executed, cause one or more processors of a device to receive arrays of sample values including adjacent reconstructed video blocks for respective luma and chroma channels of video data, for each of a horizontal and vertical direction, determine whether the number of chroma samples is half of or equal to the number of luma samples, select lines for computing gradients for determining blockiness for chroma based on the determination, determine blockiness based on the selected lines, and modify sample values in the adjacent reconstructed video blocks based on the determined blockiness according to a deblocking filter.

In one example, an apparatus comprises means for receiving arrays of sample values including adjacent reconstructed video blocks for respective luma and chroma channels of video data, means for determining whether the number of chroma samples is half of or equal to the number of luma samples for each of a horizontal and vertical direction, means for selecting lines for computing gradients for determining blockiness for chroma based on the determination, means for determining blockiness based on the selected lines, and means for modifying sample values in the adjacent reconstructed video blocks based on the determined blockiness according to a deblocking filter.

The details of one or more examples are set forth in the accompanying drawings and the description below. Other features, objects, and advantages will be apparent from the description and drawings, and from the claims.

Video content includes video sequences comprised of a series of frames (or pictures). A series of frames may also be referred to as a group of pictures (GOP). Each video frame or picture may divided into one or more regions. Regions may be defined according to a base unit (e.g., a video block) and sets of rules defining a region. For example, a rule defining a region may be that a region must be an integer number of video blocks arranged in a rectangle. Further, video blocks in a region may be ordered according to a scan pattern (e.g., a raster scan). As used herein, the term video block may generally refer to an area of a picture or may more specifically refer to the largest array of sample values that may be predictively coded, sub-divisions thereof, and/or corresponding structures. Further, the term current video block may refer to an area of a picture being encoded or decoded. A video block may be defined as an array of sample values. It should be noted that in some cases pixel values may be described as including sample values for respective components of video data, which may also be referred to as color components, (e.g., luma (Y) and chroma (Cb and Cr) components or red, green, and blue components). It should be noted that in some cases, the terms pixel value and sample value are used interchangeably. Further, in some cases, a pixel or sample may be referred to as a pel. A video sampling format, which may also be referred to as a chroma format, may define the number of chroma samples included in a video block with respect to the number of luma samples included in a video block.

A video encoder may perform predictive encoding on video blocks and sub-divisions thereof. Video blocks and sub-divisions thereof may be referred to as nodes. ITU-T H.264 specifies a macroblock including 16×16 luma samples. That is, in ITU-T H.264, a picture is segmented into macroblocks. ITU-T H.265 specifies an analogous Coding Tree Unit (CTU) structure (which may be referred to as a largest coding unit (LCU)). In ITU-T H.265, pictures are segmented into CTUs. In ITU-T H.265, for a picture, a CTU size may be set as including 16×16, 32×32, or 64×64 luma samples. In ITU-T H.265, a CTU is composed of respective Coding Tree Blocks (CTB) for each component of video data (e.g., luma (Y) and chroma (Cb and Cr). It should be noted that video having one luma component and the two corresponding chroma components may be described as having two channels, i.e., a luma channel and a chroma channel. Further, in ITU-T H.265, a CTU may be partitioned according to a quadtree (QT) partitioning structure, which results in the CTBs of the CTU being partitioned into Coding Blocks (CB). That is, in ITU-T H.265, a CTU may be partitioned into quadtree leaf nodes. According to ITU-T H.265, one luma CB together with two corresponding chroma CBs and associated syntax elements are referred to as a coding unit (CU). In ITU-T H.265, a minimum allowed size of a CB may be signaled. In ITU-T H.265, the smallest minimum allowed size of a luma CB is 8×8 luma samples. In ITU-T H.265, the decision to code a picture area using intra prediction or inter prediction is made at the CU level.

In ITU-T H.265, a CU is associated with a prediction unit (PU) structure having its root at the CU. In ITU-T H.265, PU structures allow luma and chroma CBs to be split for purposes of generating corresponding reference samples. That is, in ITU-T H.265, luma and chroma CBs may be split into respective luma and chroma prediction blocks (PBs), where a PB includes a block of sample values for which the same prediction is applied. In ITU-T H.265, a CB may be partitioned into 1, 2, or 4 PBs. ITU-T H.265 supports PB sizes from 64×64 samples down to 4×4 samples. In ITU-T H.265, square PBs are supported for intra prediction, where a CB may form the PB or the CB may be split into four square PBs. In ITU-T H.265, in addition to the square PBs, rectangular PBs are supported for inter prediction, where a CB may by halved vertically or horizontally to form PBs. Further, it should be noted that in ITU-T H.265, for inter prediction, four asymmetric PB partitions are supported, where the CB is partitioned into two PBs at one quarter of the height (at the top or the bottom) or width (at the left or the right) of the CB. Intra prediction data (e.g., intra prediction mode syntax elements) or inter prediction data (e.g., motion data syntax elements) corresponding to a PB is used to produce reference and/or predicted sample values for the PB.

JEM specifies a CTU having a maximum size of 256×256 luma samples. JEM specifies a quadtree plus binary tree (QTBT) block structure. In JEM, the QTBT structure enables quadtree leaf nodes to be further partitioned by a binary tree (BT) structure. That is, in JEM, the binary tree structure enables quadtree leaf nodes to be recursively divided vertically or horizontally. In JVET-N1001, CTUs are partitioned according a quadtree plus multi-type tree (QTMT or QT+MTT) structure. The QTMT in JVET-N1001 is similar to the QTBT in JEM. However, in JVET-N1001, in addition to indicating binary splits, the multi-type tree may indicate so-called ternary (or triple tree (TT)) splits. A ternary split divides a block vertically or horizontally into three blocks. In the case of a vertical TT split, a block is divided at one quarter of its width from the left edge and at one quarter its width from the right edge and in the case of a horizontal TT split a block is at one quarter of its height from the top edge and at one quarter of its height from the bottom edge. Referring again to FIG. 1, FIG. 1 illustrates an example of a CTU being partitioned into quadtree leaf nodes and quadtree leaf nodes being further partitioned according to a BT split or a TT split. That is, in FIG. 1 dashed lines indicate additional binary and ternary splits in a quadtree.

As described above, each video frame or picture may divided into one or more regions. For example, according to ITU-T H.265, each video frame or picture may be partitioned to include one or more slices and further partitioned to include one or more tiles, where each slice includes a sequence of CTUs (e.g., in raster scan order) and where a tile is a sequence of CTUs corresponding to a rectangular area of a picture. It should be noted that a slice, in ITU-T H.265, is a sequence of one or more slice segments starting with an independent slice segment and containing all subsequent dependent slice segments (if any) that precede the next independent slice segment (if any). A slice segment, like a slice, is a sequence of CTUs. Thus, in some cases, the terms slice and slice segment may be used interchangeably to indicate a sequence of CTUs arranged in a raster scan order. Further, it should be noted that in ITU-T H.265, a tile may consist of CTUs contained in more than one slice and a slice may consist of CTUs contained in more than one tile. However, ITU-T H.265 provides that one or both of the following conditions shall be fulfilled: (1) All CTUs in a slice belong to the same tile; and (2) All CTUs in a tile belong to the same slice.

With respect to JVET-N1001, slices are required to consist of an integer number of bricks instead of only being required to consist of an integer number of CTUs. In JVET-N1001, a brick is a rectangular region of CTU rows within a particular tile in a picture. Further, in JVET-N1001, a tile may be partitioned into multiple bricks, each of which consisting of one or more CTU rows within the tile. A tile that is not partitioned into multiple bricks is also referred to as a brick. However, a brick that is a true subset of a tile is not referred to as a tile. As such, a slice including a set of CTUs which do not form a rectangular region of a picture may or may not be supported in some video coding techniques. Further, it should be noted that in some cases, a slice may be required to consist of an integer number of complete tiles and in this case is referred to as a tile group. The techniques described herein may applicable to bricks, slices, tiles, and/or tile groups. FIG. 1 is a conceptual diagram illustrating an example of a group of pictures including slices. In the example illustrated in FIG. 1, $Pic_3$ is illustrated as including two slices (i.e., $Slice_0$ and $Slice_1$). In the example illustrated in FIG. 1, $Slice_0$ includes one brick, i.e., $Brick_0$ and $Slice_1$ includes two bricks, i.e., $Brick_1$ and $Brick_2$. It should be noted that in some cases, $Slice_0$ and $Slice_i$ may meet the requirements of and be classified as tiles and/or tile groups.

For intra prediction coding, an intra prediction mode may specify the location of reference samples within a picture. In ITU-T H.265, defined possible intra prediction modes include a planar (i.e., surface fitting) prediction mode, a DC (i.e., flat overall averaging) prediction mode, and 33 angular prediction modes (predMode: 2-34). In JEM, defined possible intra-prediction modes include a planar prediction mode, a DC prediction mode, and 65 angular prediction modes. It should be noted that planar and DC prediction modes may be referred to as non-directional prediction modes and that angular prediction modes may be referred to as directional prediction modes. It should be noted that the techniques described herein may be generally applicable regardless of the number of defined possible prediction modes.

For inter prediction coding, a reference picture is determined and a motion vector (MV) identifies samples in the reference picture that are used to generate a prediction for a current video block. For example, a current video block may be predicted using reference sample values located in one or more previously coded picture(s) and a motion vector is used to indicate the location of the reference block relative to the current video block. A motion vector may describe, for example, a horizontal displacement component of the motion vector (i.e., $MV_x$), a vertical displacement component of the motion vector (i.e., $MV_y$), and a resolution for the motion vector (e.g., one-quarter pixel precision, one-half pixel precision, one-pixel precision, two-pixel precision, four-pixel precision). Previously decoded pictures, which may include pictures output before or after a current picture, may be organized into one or more to reference pictures lists and identified using a reference picture index value. Further, in inter prediction coding, uni-prediction refers to generating a prediction using sample values from a single reference picture and bi-prediction refers to generating a prediction using respective sample values from two reference pictures. That is, in uni-prediction, a single reference picture and corresponding motion vector are used to generate a prediction for a current video block and in bi-prediction, a first reference picture and corresponding first motion vector and a second reference picture and corresponding second motion vector are used to generate a prediction for a current video block. In bi-prediction, respective sample values are combined (e.g., added, rounded, and clipped, or averaged according to weights) to generate a prediction. Pictures and regions thereof may be classified based on which types of prediction modes may be utilized for encoding video blocks thereof. That is, for regions having a B type (e.g., a B slice), bi-prediction, uni-prediction, and intra prediction modes may be utilized, for regions having a P type (e.g., a P slice), uni-prediction, and intra prediction modes may be utilized, and for regions having an I type (e.g., an I slice), only intra prediction modes may be utilized. As described above, reference pictures are identified through reference indices. For example, for a P slice, there may be a single reference picture list, RefPicList0 and for a B slice, there may be a second independent reference picture list, RefPicList1, in addition to RefPicList0. It should be noted that for uni-prediction in a B slice, one of RefPicList0 or RefPicList1 may be used to generate a prediction. Further, it should be noted that during the decoding process, at the onset of decoding a picture, reference picture list(s) are generated from previously decoded pictures stored in a decoded picture buffer (DPB).

Further, a coding standard may support various modes of motion vector prediction. Motion vector prediction enables the value of a motion vector for a current video block to be derived based on another motion vector. For example, a set of candidate blocks having associated motion information may be derived from spatial neighboring blocks and temporal neighboring blocks to the current video block. Further, generated (or default) motion information may be used for motion vector prediction. Examples of motion vector prediction include advanced motion vector prediction (AMVP), temporal motion vector prediction (TMVP), so-called "merge" mode, and "skip" and "direct" motion inference. Further, other examples of motion vector prediction include advanced temporal motion vector prediction (ATMVP) and Spatial-temporal motion vector prediction (STMVP). For motion vector prediction, both a video encoder and video decoder perform the same process to derive a set of candidates. Thus, for a current video block, the same set of candidates is generated during encoding and decoding.

As described above, for inter prediction coding, reference samples in a previously coded picture are used for coding video blocks in a current picture. Previously coded pictures which are available for use as reference when coding a current picture are referred as reference pictures. It should be noted that the decoding order does not necessary correspond with the picture output order, i.e., the temporal order of pictures in a video sequence. In ITU-T H.265, when a picture is decoded it is stored to a decoded picture buffer (DPB) (which may be referred to as frame buffer, a reference buffer, a reference picture buffer, or the like). In ITU-T H.265, pictures stored to the DPB are removed from the DPB when they been output and are no longer needed for coding subsequent pictures. In ITU-T H.265, a determination of whether pictures should be removed from the DPB is invoked once per picture, after decoding a slice header, i.e., at the onset of decoding a picture. For example, referring to FIG. 1, $Pic_3$ is illustrated as referencing $Pic_2$. Similarly, $Pic_4$ is illustrated as referencing $Pic_1$. With respect to FIG. 1 assuming the picture number corresponds to the decoding order the DPB would be populated as follows: after decoding $Pic_1$, the DPB would include $\{Pic_1\}$; at the onset of decoding $Pic_2$, the DPB would include $\{Pic_1\}$; after decoding $Pic_2$, the DPB would include $\{Pic_1, Pic_2\}$; at the onset of decoding $Pic_1$, the DPB would include $\{Pic_1, Pic_2\}$. $Pic_3$ would then be decoded with reference to $Pic_2$ and after decoding $Pic_3$, the DPB would include $\{Pic_1, Pic_2, Pic_3\}$. At the onset of decoding $Pic_4$, pictures $Pic_2$ and $Pic_3$ would be marked for removal from the DPB, as they are not needed for decoding $Pic_4$ (or any subsequent pictures, not shown) and assuming $Pic_2$ and $Pic_3$ have been output, the DPB would be updated to include $\{Pic_1\}$. $Pic_4$ would then be decoded with referencing $Pic_1$. The process of marking pictures for removal from a DPB may be referred to as reference picture set (RPS) management.

As described above, intra prediction data or inter prediction data is used to produce reference sample values for a block of sample values. The difference between sample values included in a current PB, or another type of picture area structure, and associated reference samples (e.g., those generated using a prediction) may be referred to as residual data. Residual data may include respective arrays of difference values corresponding to each component of video data. Residual data may be in the pixel domain. A transform, such as, a discrete cosine transform (DCT), a discrete sine transform (DST), an integer transform, a wavelet transform, or a conceptually similar transform, may be applied to an array of difference values to generate transform coefficients. It should be noted that in ITU-T H.265 and JVET-N1001, a CU is associated with a transform unit (TU) structure having its root at the CU level. That is, an array of difference values may be partitioned for purposes of generating transform coefficients (e.g., four 8×8 transforms may be applied to a 16×16 array of residual values). For each component of video data, such sub-divisions of difference values may be referred to as Transform Blocks (TBs). It should be noted that in some cases, a core transform and a subsequent secondary transforms may be applied (in the video encoder) to generate transform coefficients. For a video decoder, the order of transforms is reversed.

A quantization process may be performed on transform coefficients or residual sample values directly (e.g., in the case, of palette coding quantization). Quantization approximates transform coefficients by amplitudes restricted to a set of specified values. Quantization essentially scales transform coefficients in order to vary the amount of data required to represent a group of transform coefficients. Quantization may include division of transform coefficients (or values resulting from the addition of an offset value to transform coefficients) by a quantization scaling factor and any associated rounding functions (e.g., rounding to the nearest integer). Quantized transform coefficients may be referred to as coefficient level values. Inverse quantization (or "dequantization") may include multiplication of coefficient level values by the quantization scaling factor, and any reciprocal rounding or offset addition operations. It should be noted that as used herein the term quantization process in some instances may refer to division by a scaling factor to generate level values and multiplication by a scaling factor to recover transform coefficients in some instances. That is, a quantization process may refer to quantization in some cases and inverse quantization in some cases. Further, it should be noted that although in some of the examples below quantization processes are described with respect to arithmetic operations associated with decimal notation, such descriptions are for illustrative purposes and should not be construed as limiting. For example, the techniques described herein may be implemented in a device using binary operations and the like. For example, multiplication and division operations described herein may be implemented using bit shifting operations and the like.

Quantized transform coefficients and syntax elements (e.g., syntax elements indicating a coding structure for a video block) may be entropy coded according to an entropy coding technique. An entropy coding process includes coding values of syntax elements using lossless data compression algorithms. Examples of entropy coding techniques include content adaptive variable length coding (CAVLC), context adaptive binary arithmetic coding (CABAC), probability interval partitioning entropy coding (PIPE), and the like. Entropy encoded quantized transform coefficients and corresponding entropy encoded syntax elements may form a compliant bitstream that can be used to reproduce video data at a video decoder. An entropy coding process, for example, CABAC, may include performing a binarization on syntax elements. Binarization refers to the process of converting a value of a syntax element into a series of one or more bits. These bits may be referred to as "bins." Binarization may include one or a combination of the following coding techniques: fixed length coding, unary coding, truncated unary coding, truncated Rice coding, Golomb coding, k-th order exponential Golomb coding, and Golomb-Rice coding. For example, binarization may include representing the integer value of 5 for a syntax element as 00000101 using an 8-bit fixed length binarization technique or representing the integer value of 5 as 11110 using a unary coding binarization technique. As used herein each of the terms fixed length coding, unary coding, truncated unary coding, truncated Rice coding, Golomb coding, k-th order exponential Golomb coding, and Golomb-Rice coding may refer to general implementations of these techniques and/or more specific implementations of these coding techniques. For example, a Golomb-Rice coding implementation may be specifically defined according to a video coding standard. In the example of CABAC, for a particular bin, a context provides a most probable state (MPS) value for the bin (i.e., an MPS for a bin is one of 0 or 1) and a probability value of the bin being the MPS or the least probably state (LPS). For example, a context may indicate, that the MPS of a bin is 0 and the probability of the bin being 1 is 0.3. It should be noted that a context may be determined based on values of previously coded bins including bins in the current syntax element and previously coded syntax elements. For example, values of syntax elements associated with neighboring video blocks may be used to determine a context for a current bin.

Figure 2A:
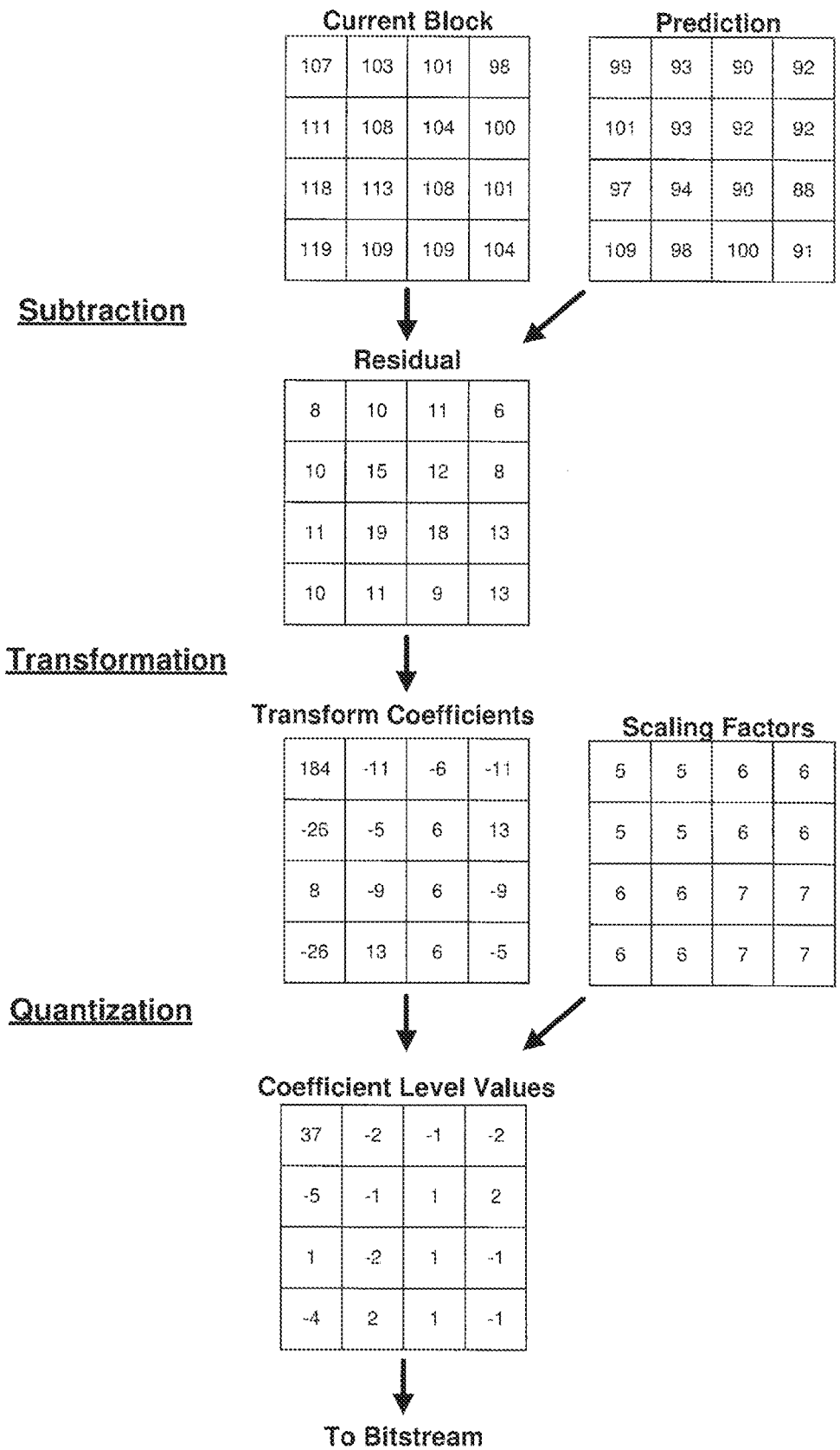
FIG. 2A is a conceptual diagram illustrating example of coding a block of video data in accordance with one or more techniques of this disclosure.
Figure 2B:
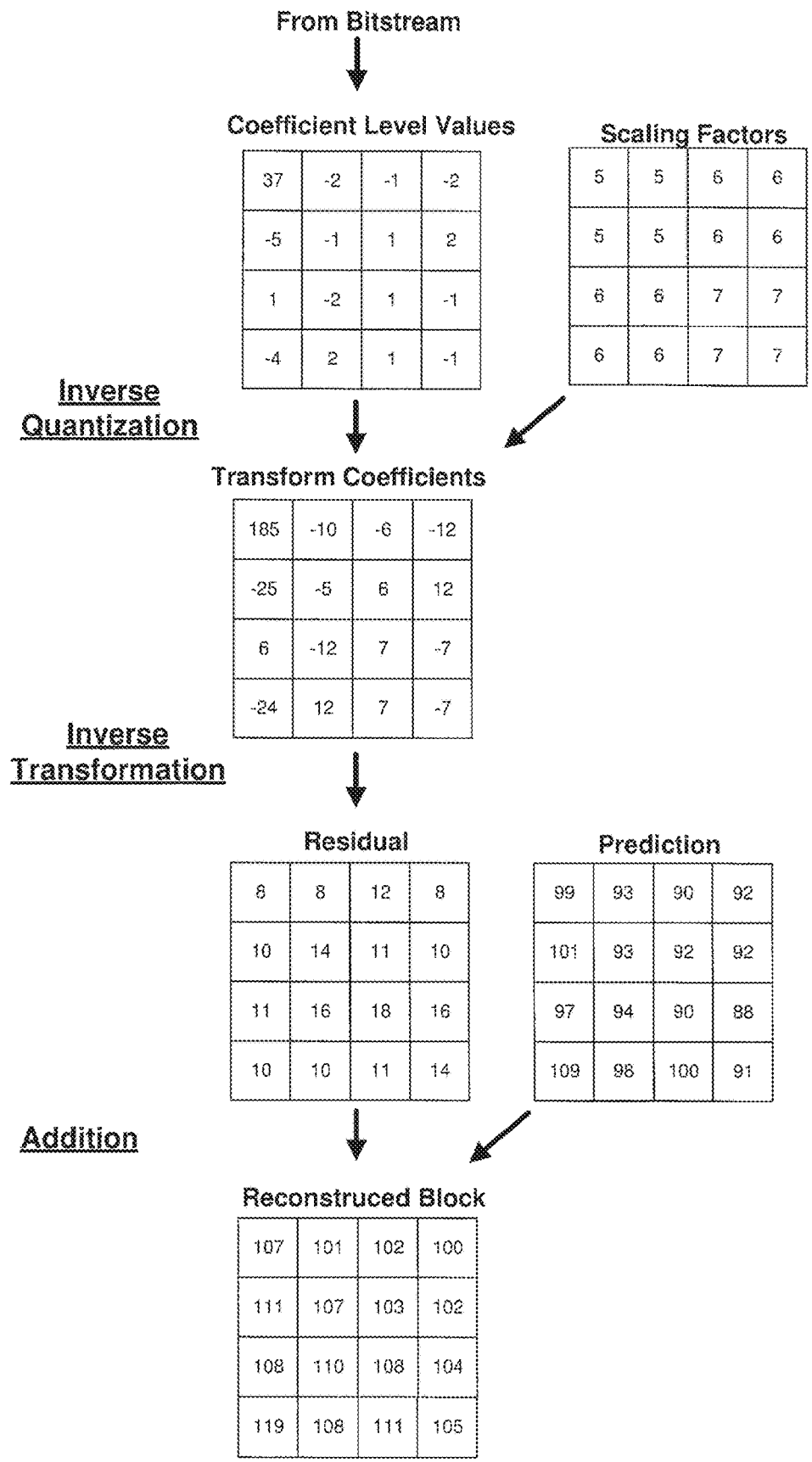
FIG. 2B is a conceptual diagram illustrating example of coding a block of video data in accordance with one or more techniques of this disclosure.

FIGS. 2A-2B are conceptual diagrams illustrating examples of coding a block of video data. As illustrated in FIG. 2A, a current block of video data (e.g., a CB corresponding to a video component) is encoded by generating a residual by subtracting a set of prediction values from the current block of video data, performing a transformation on the residual, and quantizing the transform coefficients to generate level values. As illustrated in FIG. 2B, the current block of video data is decoded by performing inverse quantization on level values, performing an inverse transform, and adding a set of prediction values to the resulting residual. It should be noted that in the examples in FIGS. 2A-2B, the sample values of the reconstructed block differs from the sample values of the current video block that is encoded. In this manner, coding may said to be lossy. However, the difference in sample values may be considered acceptable or imperceptible to a viewer of the reconstructed video.

Further, as illustrated in FIGS. 2A-2B, coefficient level values are generated using an array of scaling factors. In ITU-T H.265, an array of scaling factors is generated by selecting a scaling matrix and multiplying each entry in the scaling matrix by a quantization scaling factor. In ITU-T H.265, a scaling matrix is selected based in part on a prediction mode and a color component, where scaling matrices of the following sizes are defined: 4×4, 8×8, 16×16, and 32×32. It should be noted that in some examples, a scaling matrix may provide the same value for each entry (i.e., all coefficients are scaled according to a single value). In ITU-T H.265, the value of a quantization scaling factor, may be determined by a quantization parameter, QP. In ITU-T H.265, for a bitdepth of 8-bits, the QP can take 52 values from 0 to 51 and a change of 1 for QP generally corresponds to a change in the value of the quantization scaling factor by approximately 12%. Further, in ITU-T H.265, a QP value for a set of transform coefficients may be derived using a predictive quantization parameter value (which may be referred to as a predictive QP value or a QP predictive value) and an optionally signaled quantization parameter delta value (which may be referred to as a QP delta value or a delta QP value). In ITU-T H.265, a quantization parameter may be updated for each CU and a respective quantization parameter may be derived for each of the luma and chroma channels.

Figure 3:
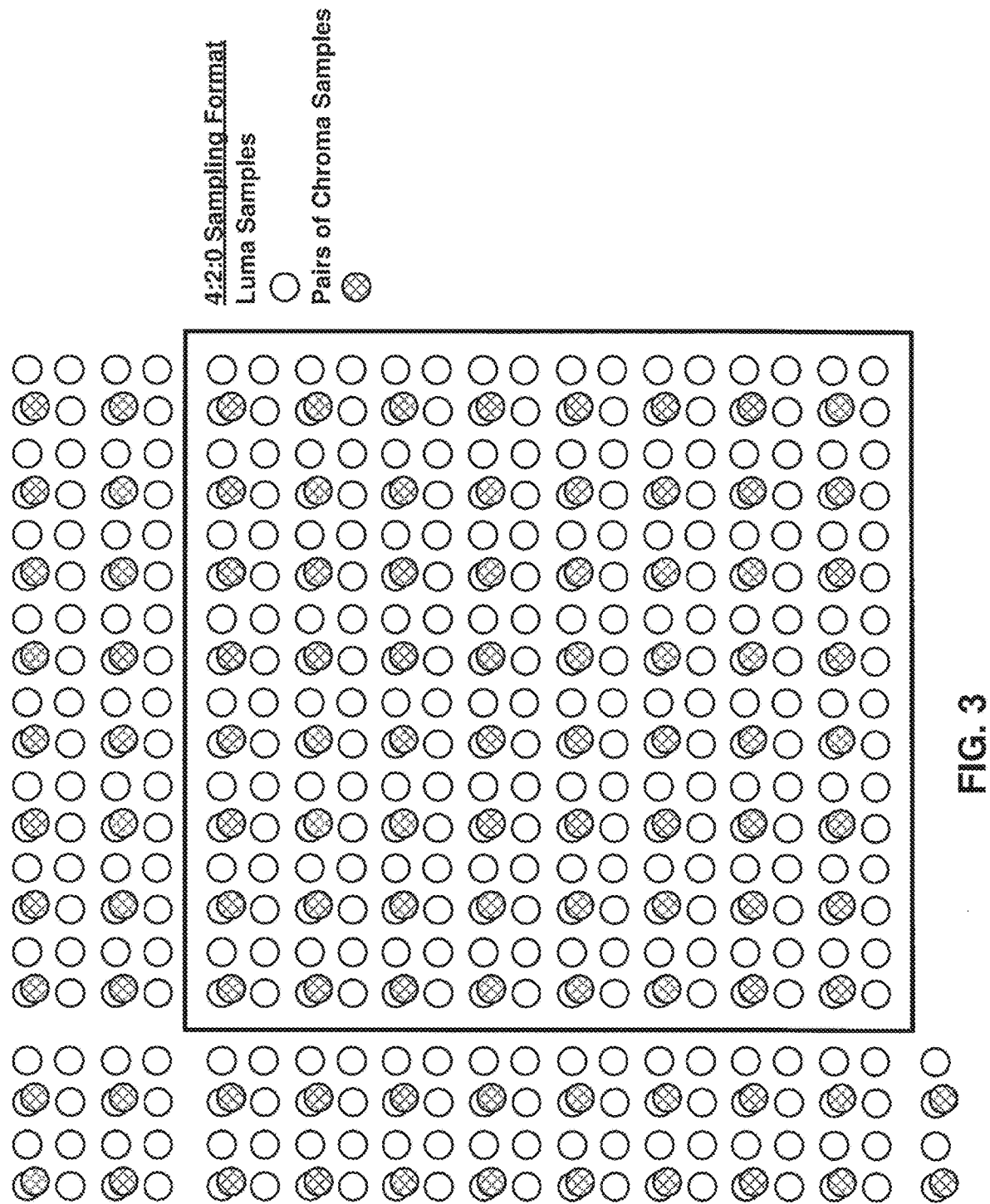
FIG. 3 is a conceptual diagram illustrating an example of a video component sampling format that may be utilized in accordance with one or more techniques of this disclosure.
Figure 4A:
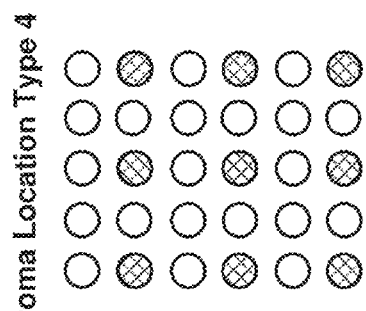
FIG. 4A is a conceptual diagram illustrating example of location types for a video component sampling format that may be utilized in accordance with one or more techniques of this disclosure.
Figure 4B:
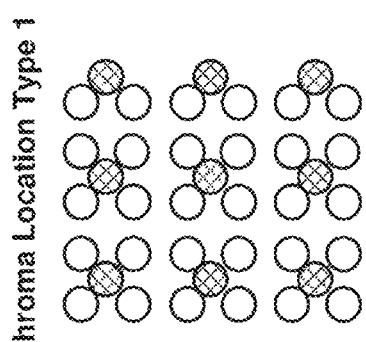
FIG. 4B is a conceptual diagram illustrating example of location types for a video component sampling format that may be utilized in accordance with one or more techniques of this disclosure.
Figure 4C:
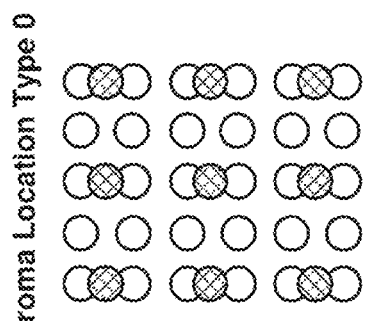
FIG. 4C is a conceptual diagram illustrating example of location types for a video component sampling format that may be utilized in accordance with one or more techniques of this disclosure.
Figure 4D:
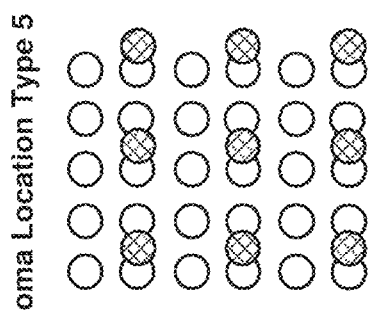
FIG. 4D is a conceptual diagram illustrating example of location types for a video component sampling format that may be utilized in accordance with one or more techniques of this disclosure.
Figure 4E:
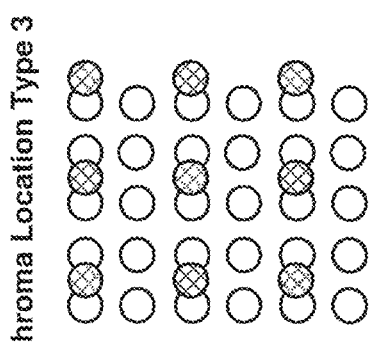
FIG. 4E is a conceptual diagram illustrating example of location types for a video component sampling format that may be utilized in accordance with one or more techniques of this disclosure.
Figure 4F:
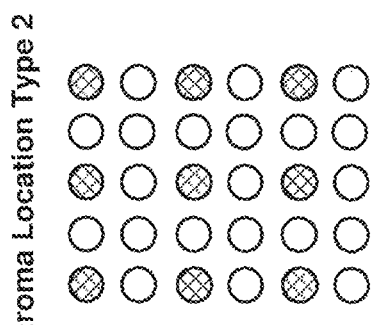
FIG. 4F is a conceptual diagram illustrating example of location types for a video component sampling format that may be utilized in accordance with one or more techniques of this disclosure.

As described above, a video sampling format, which may also be referred to as a chroma format, may define the number of chroma samples included in a video block with respect to the number of luma samples included in a video block. For example, for the 4:2:0 sampling format, the sampling rate for the luma component is twice that of the chroma components for both the horizontal and vertical directions. As a result, for a CU formatted according to the 4:2:0 format, the width and height of an array of samples for the luma component are twice that of each array of samples for the chroma components. FIG. 3 is a conceptual diagram illustrating an example of a coding unit formatted according to a 4:2:0 sample format. FIG. 3 illustrates the relative position of chroma samples with respect to luma samples within a CU. As described above, a CU is typically defined according to the number of horizontal and vertical luma samples. Thus, as illustrated in FIG. 3, a 16×16 CU formatted according to the 4:2:0 sample format includes 16×16 samples of luma components and 8×8 samples for each chroma component. Further, in the example illustrated in FIG. 3, the relative position of chroma samples with respect to luma samples for video blocks neighboring the 16×16 CU are illustrated. For a CU formatted according to the 4:2:2 format, the width of an array of samples for the luma component is twice that of the width of an array of samples for each chroma component, but the height of the array of samples for the luma component is equal to the height of an array of samples for each chroma component. Further, for a CU formatted according to the 4:4:4 format, an array of samples for the luma component has the same width and height as an array of samples for each chroma component. Table 1 illustrates how a chroma format is specified in JVET-N1001 based on values of syntax elements chroma_format_idc and separate colour_plane_flag included in JVET-N1001.

Further, Table 1 illustrates how the variables SubWidthC and SubHeightC are specified derived depending on the chroma format. SubWidthC and SubHeightC are utilized for deblocking, described in further detail below. With respect to Table 1, JVET-N1001 provides the following:

In monochrome sampling there is only one sample array, which is nominally considered the luma array.

In 4:2:0 sampling, each of the two chroma arrays has half the height and half the width of the luma array.

In 4:2:2 sampling, each of the two chroma arrays has the same height and half the width of the luma array.

In 4:4:4 sampling, depending on the value of separate_colour_plane_flag, the following applies:

If separate_colour_plane_flag is equal to 0, each of the two chroma arrays has the same height and width as the luma array.

Otherwise (separate_colour_plane_flag is equal to 1), the three colour planes are separately processed as monochrome sampled pictures.

TABLE 1

| chroma_format_idc | separate_colour_plane_flag | Chroma format | SubWidthC | SubHeightC |
|---|---|---|---|---|
| 0 | 0 | Monochrome | 1 | 1 |
| 1 | 0 | 4:2:0 | 2 | 2 |
| 2 | 0 | 4:2:2 | 2 | 1 |
| 3 | 0 | 4:4:4 | 1 | 1 |
| 3 | 1 | 4:4:4 | 1 | 1 |

It should be noted that for a sampling format, e.g., a 4:2:0 sample format, a chroma location type may be specified. That is, for example for the 4:2:0 sample format, horizontal and vertical offset values which indicate relative spatial positioning may be specified for chroma samples with respect to luma samples. Table 2 provides a definition of HorizontalOffsetC and VerticalOffsetC for the 5 chroma location types provided in JVET-N1001. Further, FIGS. 4A-4F illustrate the chroma location types specified in JVET-N1001 for the 4:2:0 sample format.

TABLE 2

| ChromaLocType | HorizontalOffsetC | VerticalOffsetC |
| --- | --- | --- |
| 0 | 0 | 0.5 |
| 1 | 0.5 | 0.5 |
| 2 | 0 | 0 |
| 3 | 0.5 | 0 |
| 4 | 0 | 1 |
| 5 | 0.5 | 1 |

With respect to the equations used herein, the following arithmetic operators may be used:
+ Addition
− Subtraction
* Multiplication, including matrix multiplication
$x^y$ Exponentiation. Specifies x to the power of y. In other contexts, such notation is used for superscripting not intended for interpretation as exponentiation.
/ Integer division with truncation of the result toward zero. For example, 7/4 and −7/−4 are truncated to 1 and −7/4 and 7/−4 are truncated to −1.
÷ Used to denote division in mathematical equations where no truncation or rounding is intended.

$$\frac{x}{y}$$

Used to denote division in mathematical equations where no truncation or rounding is intended.

x % y Modulus. Remainder of x divided by y, defined only for integers x and y with x>=0 and y>0.

Further, the following logical operators may be used:
x && y Boolean logical "and" of x and y
x||y Boolean logical "or" of x and y
! Boolean logical "not"
x?y:z If x is TRUE or not equal to 0, evaluates to the value of y; otherwise, evaluates to the value of z.

Further, the following relational operators may be used:
> Greater than
>= Greater than or equal to
< Less than
<= Less than or equal to
== Equal to
!=Not equal to Further, the following bit-wise operators may be used:
& Bit-wise "and". When operating on integer arguments, operates on a two's complement representation of the integer value. When operating on a binary argument that contains fewer bits than another argument, the shorter argument is extended by adding more significant bits equal to 0.
| Bit-wise "or". When operating on integer arguments, operates on a two's complement representation of the integer value. When operating on a binary argument that contains fewer bits than another argument, the shorter argument is extended by adding more significant bits equal to 0.
^ Bit-wise "exclusive or". When operating on integer arguments, operates on a two's complement representation of the integer value. When operating on a binary argument that contains fewer bits than another argument, the shorter argument is extended by adding more significant bits equal to 0.
x>>y Arithmetic right shift of a two's complement integer representation of x by y binary digits. This function is defined only for non-negative integer values of y. Bits shifted into the most significant bits (MSBs) as a result of the right shift have a value equal to the MSB of x prior to the shift operation.
x<<y Arithmetic left shift of a two's complement integer representation of x by y binary digits. This function is defined only for non-negative integer values of y. Bits shifted into the least significant bits (LSBs) as a result of the left shift have a value equal to 0.

Further, the following assignment operators may be used:
= Assignment operator
++ Increment, i.e., x++ is equivalent to x=x+1; when used in an array index, evaluates to the value of the variable prior to the increment operation.
— Decrement, i.e., x— is equivalent to x=x−1; when used in an array index, evaluates to the value of the variable prior to the decrement operation.
+= Increment by amount specified, i.e., x+=3 is equivalent to x=x+3, and x+=(−3) is equivalent to x=x+(−3).
−=Decrement by amount specified, i.e., x−=3 is equivalent to x=x−3, and x−= (−3) is equivalent to x=x−(−3).

Further, the following defined mathematical functions may be used:

$$\text{Abs}(x) = \begin{cases} x; & x >= 0 \\ -x; & x < 0 \end{cases}$$

Floor(x) the largest integer less than or equal to x.
Log 2(x) the base-2 logarithm of x.

$$\text{Min}(x, y) = \begin{cases} x; & x <= y \\ y; & x > y \end{cases}$$

$$\text{Max}(x, y) = \begin{cases} x; & x >= y \\ y; & x < y \end{cases}$$

$$\text{Clip3}(x, y, z) = \begin{cases} x; & z < x \\ y; & z > y \\ z; & \text{otherwise} \end{cases}$$

As described above, with respect to the examples illustrated in FIGS. 2A-2B, the sample values of a reconstructed block may differ from the sample values of the current video block that is encoded. Further, it should be noted that in some cases, coding video data on a block-by-block basis may result in artifacts (e.g., so-called blocking artifacts, banding artifacts, etc.) For example, blocking artifacts may cause coding block boundaries of reconstructed video data to be visually perceptible to a user. In this manner, reconstructed sample values may be modified to minimize the difference between the sample values of the current video block that is encoded and the reconstructed block and/or minimize artifacts introduced by the video coding process. Such modifications may general be referred to as filtering. It should be noted that filtering may occur as part of an in-loop filtering process or a post-loop filtering process. For an in-loop filtering process, the resulting sample values of a filtering process may be used for predictive video blocks (e.g., stored to a reference frame buffer for subsequent encoding at video encoder and subsequent decoding at a video decoder). For a post-loop filtering process the resulting sample values of a filtering process are merely output as part of the decoding process (e.g., not used for subsequent coding). It should be noted that for an in-loop filtering process, the sample values resulting from filtering the reconstructed block would be used for subsequent decoding (e.g., stored to a reference buffer) and are typically output (e.g., to a display) and for a post-loop filtering process, the reconstructed block, without filtering, would be used for subsequent decoding and the sample values resulting from filtering the reconstructed block would be output.

Figure 5A:
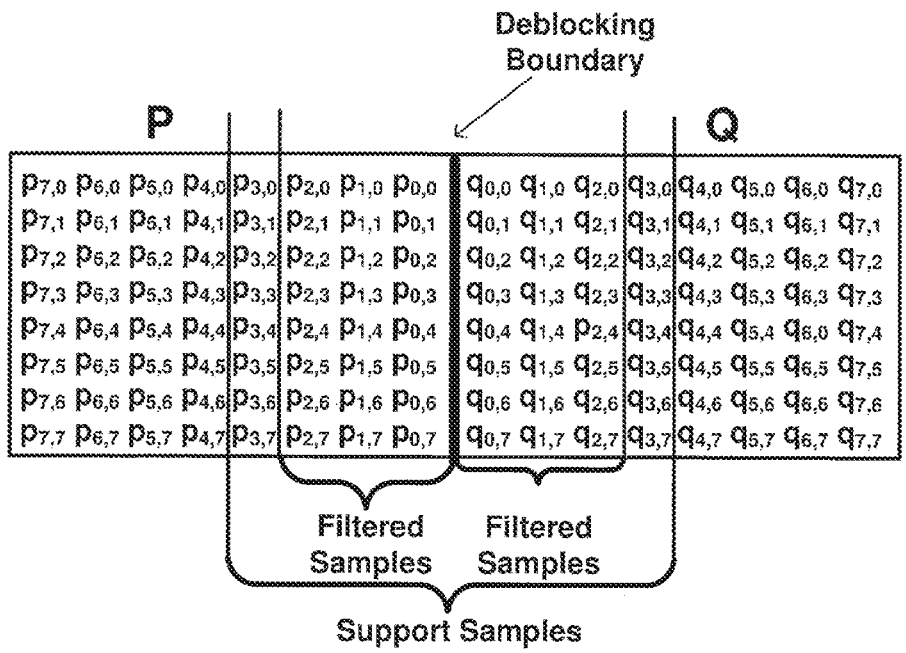
FIG. 5A is a conceptual diagram illustrating blocks of video data including a deblocking boundary in accordance with one or more techniques of this disclosure.
Figure 5B:
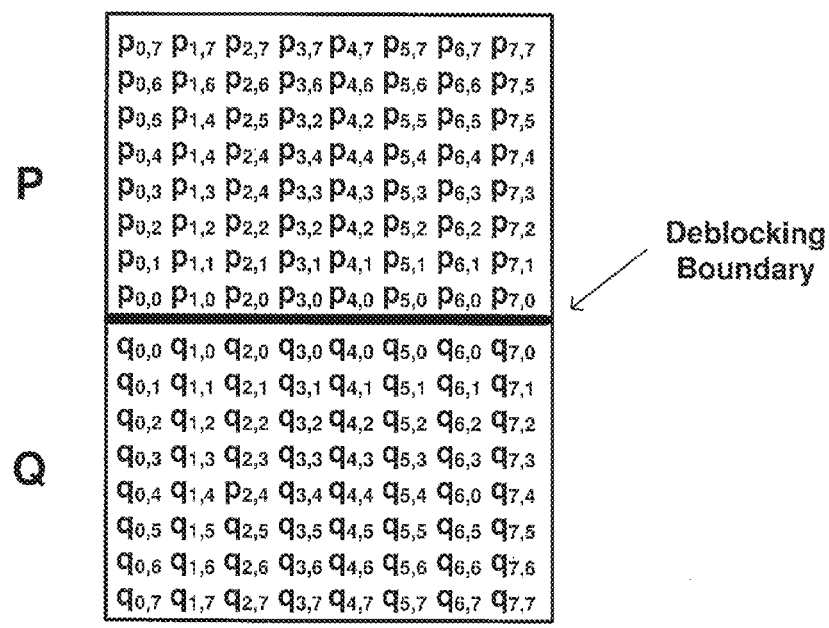
FIG. 5B is a conceptual diagram illustrating blocks of video data including a deblocking boundary in accordance with one or more techniques of this disclosure.

Deblocking (or de-blocking), deblock filtering, or applying a deblocking filter refers to the process of smoothing the boundaries of neighboring reconstructed video blocks (i.e., making boundaries less perceptible to a viewer). Smoothing the boundaries of neighboring reconstructed video blocks may include modifying sample values included in rows or columns adjacent to a boundary. ITU-T H.265 provides where a deblocking filter is applied to reconstructed sample values as part of an in-loop filtering process. ITU-T H.265 includes two types deblocking filters that may be used for modifying luma samples: a Strong Filter which modifies sample values in the three adjacent rows or columns to a boundary and a Weak Filter which modifies sample values in the immediately adjacent row or column to a boundary and conditionally modifies sample values in the second row or column from the boundary. Further, ITU-T H.265 includes one type of filter that may be used for modifying chroma samples: Normal Filter. JVET-N1001 similarly provides where a deblocking filter is applied to reconstructed sample values as part of an in-loop filtering process. FIGS. 5A-5B illustrate sample values included in video blocks P and Q having a boundary. As used herein, video blocks P and Q are used to refer to adjacent video blocks having a block boundary at which deblocking may be applied. The manner in which sample values are modified may be based on defined filters, where $p_i$ and $q_i$ represent respective sample values in a column for a vertical boundary and sample values in a row for a horizontal boundary and $p_i'$ and $q_i'$ represent modified sample values. Defined filters may define samples that are to be modified (or filtered) and samples that are used to determine how samples are to be modified. For example, as illustrated in FIG. 5A, in one example, samples values in each of the first three columns adjacent to the deblocking boundary may be modified (illustrated as filtered samples) based on sample values includes in the each of the first four columns adjacent to the deblocking boundary (illustrated as support samples).

In JVET-N1001, for the luma component, a so-called long filter and a so-called short filter may be used to modify sample values. JVET-N1001 specifies the luma short filter process as follows:

Inputs to this process are:
the sample values $p_i$ and $q_i$ with i=0 . . . 3,
the locations of $p_i$ and $q_i$, $(xP_i, yP_i)$ and $(xQ_i, yQ_i)$ with i=0 . . . 2,
a variable dE,
the variables dEp and dEq containing decisions to filter samples p1 and q1,
respectively,
a variable $t_C$.

Outputs of this process are:
the number of filtered samples nDp and nDq,
the filtered sample values $p_i'$ and $q_j'$ with i=0 . . . nDp−1, j=0 . . . nDq−1.

Depending on the value of dE, the following applies:
If the variable dE is equal to 2, nDp and nDq are both set equal to 3 and the following strong filtering applies:

$$p_0' = Clip3(p_0 - 3*t_C, p_0 + 3*t_C, (p_2 + 2*p_1 + 2*p_0 + 2*q_0 + q_1 + 4) >> 3)$$

$$p_1' = Clip3(p_1 - 2*t_C, p_1 + 2*t_C, (p_2 + p_1 + p_0 + q_0 + 2) >> 2)$$

$$p_2' = Clip3(p_2 - 1*t_C, p_2 + 1*t_C, (2*p_3 + 3*p_2 + p_1 + p_1 + p_0 + q_0 + 4) >> 3)$$

$$q_0' = Clip3(q_0 - 3*t_C, q_0 + 3*t_C, (p_1 + 2*p_0 + 2*q_0 + 2*q_1 + q_2 + 4) >> 3)$$

$$q_1' = Clip3(q_1 - 2*t_C, q_1 + 2*t_C, (p_0 + q_0 + q_1 + q_2 + 2) >> 2)$$

$$q_2' = Clip3(q_2 - 1*t_C, q_2 + 1*t_C, (p_0 + q_0 + q_1 + 3*q_2 + 2*q_3 + 4) >> 3)$$

Otherwise, nDp and nDq are set both equal to 0 and the following weak filtering applies:
The following applies:

$$\Delta = (p*(q_0 - p_0) - 3*(q_1 - p_1) + 8) >> 4$$

When Abs($\Delta$) is less than $t_C$*10, the following ordered steps apply:
The filtered sample values $p_0'$ and $q_0'$ are specified as follows:

$$\Delta = Clip3(-t_C, t_C, \Delta)$$
$$p_0' = Clip1_Y(p_0 + \Delta)$$
$$q_0' = Clip1_Y(q_0 - \Delta)$$

When dBp is equal to 1, the filtered sample value $p_1'$ is specified as follows:

$$\Delta p = Clip3(-(t_C >> 1), t_C >> 1, (((p_2 + p_0 + 1) >> 1) - p_1 + \Delta) >> 1)$$
$$p_1' = Clip1_Y(p_1 + \Delta p)$$

When dEq is equal to 1, the filtered sample value $q_1'$ is specified as follows:

$$\Delta q = Clip3(-(t_C >> 1), t_C >> 1, (((q_2 + q_0 + 1) >> 1) - q_1 - \Delta) >> 1)$$
$$q_1' = Clip1_Y(q_1 + \Delta q)$$

nDp is set equal to dEp+1 and nDq is set equal to dEq+1.
When nDp is greater than 0 and one or more of the following conditions are true, nDp is set equal to 0:
pcm_loop_filter_disabled_flag is equal to 1 and pcm_flag [$xP_0$][$yP_0$] is equal to 1.

cu_transquant_bypass_flag of the coding unit that includes the coding block containing the sample $p_0$ is equal to 1.

When nDq is greater than 0 and one or more of the following conditions are true, nDq is set equal to 0:

pcm_loop_filter_disabled flag is equal to 1 and pcm_flag [xQ$_0$][yQ$_0$] is equal to 1.

cu_transquant_bypass_flag of the coding unit that includes the coding block containing the sample $q_0$ is equal to 1.

JVET-N1001 specifies the luma long filter process as follows:

Inputs to this process are:
the variables maxFilterLengthP and maxFilterLengthQ,
the sample values $p_i$ and $q_j$ with i=0 . . . maxFilterLengthP and j=0 . . . maxFilterLengthQ,
the locations of $p_i$ and $q_i$, (xP$_i$, yP$_i$) and (xQ$_i$, yQ$_i$) with i=0 . . . maxFilterLengthP−1 and j=0 . . . maxFilterLengthQ−1,
a variable $t_C$.

Outputs of this process are:
the filtered sample values $p_i'$ and $q_j'$ with i=0 . . . maxFilterLengthP−1, j=0 . . . maxFilterLengthQ−1.

The variable refMiddle is derived as follows:
If maxFilterLengthP is equal to maxFilterLengthQ and maxFilterLengthP is equal to 5, the following applies:

$$refMiddle = (p_4 + p_3 + 2*(p_2 + p_1 + p_0 + q_0 + q_1 + q_2) + q_3 + q_4 + 8) >> 4$$

Otherwise, if maxFilterLengthP is equal to maxFilterLengthQ and maxFilterLengthP is not equal to 5, the following applies:

$$refMiddle = (p_6 + p_5 + p_4 + p_3 + p_2 + p_1 + 2*(p_0 + q_0) + q_1 + q_2 + q_3 + q_4 + q_5 + q_6 + 8) >> 4$$

Otherwise, if one of the following conditions are true,
maxFilterLengthQ is equal to 7 and maxFilterLengthP is equal to 5,
maxFilterLengthQ is equal to 5 and maxFilterLengthP is equal to 7,
the following applies:

$$refMiddle = (p_4 + p_3 + 2*(p_2 + p_1 + p_0 + q_0 + q_1 + q_2) + q_3 + q_4 + 8) >> 4$$

Otherwise, if one of the following conditions are true,
maxFilterLengthQ is equal to 5 and maxFilterLengthP is equal to 3,
maxFilterLengthQ is equal to 3 and maxFilterLengthP is equal to 5,
the following applies:

$$refMiddle = (p_3 + p_2 + p_1 + p_0 + q_0 + q_1 + q_2 + q_3 + 4) >> 3$$

Otherwise, if maxFilterLengthQ is equal to 7 and maxFilterLengthP is equal to 3, the following applies:

$$refMiddle = (2*(p_2 + p_1 + p_0 + q_0) + p_0 + p_1 + q_1 + q_2 + q_3 + q_4 + q_5 + q_6 + 8) >> 4$$

Otherwise, the following applies:

$$refMiddle = (p_6 + p_5 + p_4 + p_3 + p_2 + p_1 + 2*(q_2 + q_1 + q_0 + p_0) + q_0 + q_1 + 8) >> 4$$

The variables refP and refQ are derived as follows:

$$refP = (p_{maxFilterLengthP} + p_{maxFilterLengthP-1} + 1) >> 1$$

$$refQ = (q_{maxFilterLengthQ} + q_{maxFilterLengthQ-1} + 1) >> 1$$

The variables $f_i$ and $t_C PD_i$ are defined as follows:
If maxFilterLengthP is equal to 7, the following applies:

$$f_{0..6} = \{59, 50, 41, 32, 23, 14, 5\}$$

$$t_C PD_{0..6} = \{6, 5, 4, 3, 2, 1, 1\}$$

Otherwise, if maxFilterLengthP is equal to 5, the following applies:

$$f_{0..4} = \{58, 45, 32, 19, 6\}$$

$$t_C PD_{0..4} = \{6, 5, 4, 3, 2\}$$

Otherwise, the following applies:

$$f_{0..2} = \{53, 32, 11\}$$

$$t_C PD_{0..2} = \{6, 4, 2\}$$

The variables $g_j$ and $t_C QD_j$ are defined as follows:
IfmaxFilterLengthQ is equal to 7, the following applies:

$$g_{0..6} = \{59, 50, 41, 32, 23, 14, 5\}$$

$$t_C QD_{0..6} = \{6, 5, 4, 3, 2, 1, 1\}$$

Otherwise, if maxFilterLengthQ is equal to 5, the following applies:

$$g_{0..4} = \{58, 45, 32, 19, 6\}$$

$$t_C QD_{0..4} = \{6, 5, 4, 3, 2\}$$

Otherwise, the following applies:

$$g_{0..2} = \{53, 32, 11\}$$

$$t_C QD_{0..2} = \{6, 4, 2\}$$

The filtered sample values $p_i'$ and $q_j'$ with $i=0 \ldots$ maxFilterLengthP−1 and $j=0 \ldots$ maxFilterLengthQ−1 are derived as follows:

$$p_i' = Clip3(p_i - (t_C * t_C PD_i) >> 1,$$

$$p_i + (t_C * t_C PD_i) >> 1, (refMiddle * f_i + refP * (64 - f_i) + 32) >> 6)$$

$$q_j' = Clip3(q_j - (t_C * t_C QD_j) >> 1,$$

$$q_j + (t_C * t_C QD_j) >> 1, (refMiddle * g_j + refQ * (64 - g_j) + 32) >> 6)$$

When one or more of the following conditions are true, the filtered sample value, $p_i'$ is substituted by the corresponding input sample value $p_i$ with $i=0 \ldots$ maxFilterLengthP−1:

pcm_loop_filter_disabled flag is equal to 1 and pcm_flag [xP$_i$][yP$_i$] is equal to 1.

cu_transquant_bypass_flag of the coding unit that includes the coding block containing the sample $p_i$ is equal to 1.

When one or more of the following conditions are true, the filtered sample value, $q_i'$ is substituted by the corresponding input sample value $q_i$ with $j=0 \ldots$ maxFilterLengthQ−1:

pcm_loop_filter_disabled_flag is equal to 1 and pcm_flag [xQ$_i$][yQ$_i$] is equal to 1. cu_transquant_bypass_flag of the coding unit that includes the coding block containing the sample $q_i$ is equal to 1.

JVET-N1001 further specifies a chroma filter process a follows:

This process is only invoked when ChromaArrayType is not equal to 0.

Inputs to this process are:

the variable maxFilterLength, the chroma sample values $p_i$ and $q_i$ with $i=0 \ldots$ maxFilterLengthCbCr, the chroma locations of $p_i$ and $q_i$, (xP$_i$, yP$_i$) and (xQ$_i$, yQ$_i$) with $$i = 0 \ldots \max FilterLengthCbCr - 1,$$

a variable $t_C$.

Outputs of this process are the filtered sample values $p_i'$ and $q_i'$ with $$i = 0 \ldots \max FilterLengthCbCr - 1.$$

The filtered sample values $p_i'$ and $q_i'$ with $i=0 \ldots$ maxFilterLengthCbCr−1 are derived as follows:

If maxFilterLengthCbCr is equal to 3, the following strong filtering applies:

$$p_0' = Clip3(p_0 - t_C, p_0 + t_C, (p_3 + p_2 + p_1 + 2*p_0 + q_0 + q_1 + q_2 + 4) >> 3)$$

$$p_1' = Clip3(p_1 - t_C, p_1 + t_C, (2*p_3 + p_2 + 2*p_1 + p_0 + q_0 + q_1 + 4) >> 3)$$

$$p_2' = Clip3(p_2 - t_C, p_2 + t_C, (3*p_3 + 2*p_2 + p_1 + p_0 + q_0 + 4) >> 3)$$

$$q_0' = Clip3(q_0 - t_C, q_0 + t_C, (p_2 + p_1 + p_0 + 2*q_0 + q_1 + q_2 + q_3 + 4) >> 3)$$

$$q_1' = Clip3(q_1 - t_C, q_1 + t_C, (p_1 + p_0 + q_0 + 2*q_1 + q_2 + 2*q_3 + 4) >> 3)$$

$$q_2' = Clip3(q_2 - t_C, q_2 + t_C, (p_0 + q_0 + q_1 + 2*q_2 + 3*q_3 + 4) >> 3)$$

Otherwise, the following weak filtering applies:

$$\Delta = Clip3(-t_C, t_C, ((((q_0 - p_0) << 2) + p_1 - q_1 + 4) >> 3))$$

$$p_0' = Clip1_C(p_0 + \Delta)$$

$$q_0' = Clip1_C(q_0 - \Delta)$$

When one or more of the following conditions are true, the filtered sample value, $p_i'$ is substituted by the corresponding input sample value $p_i$ with $$i = 0 \ldots \max FilterLengthCbCr - 1:$$

pcm_loop_filter_disabled_flag is equal to 1 and pcm_flag [xP$_i$*SubWidthC][yP$_i$*SubHeightC] is equal to 1.

cu_transquant_bypass_flag of the coding unit that includes the coding block containing the sample $p_i$ is equal to 1.

When one or more of the following conditions are true, the filtered sample value, $q_i'$ is substituted by the corresponding input sample value $q_i$ with $$i = 0 \ldots \max FilterLengthCbCr - 1:$$

pcm_loop_filter_disabled flag is equal to 1 and pcm_flag [xQ$_i$*SubWidthC][yQ$_i$*SubHeightC] is equal to 1.

cu_transquant_bypass_flag of the coding unit that includes the coding block containing the sample $q_i$ is equal to 1.

As indicated in the filter processes above, a variable $t_C$, and, in the case of the luma long filter, a variable dE, and the variables dEp and dEq are used as input. In JVET-N1001, for luma, the variable $t_C$, a variable dE, and the variables dEp and dEq are determined according to a decision process for block edge as follows:

Inputs to this process are:

a picture sample array recPicture, a location (xCb, yCb) specifying the top-left sample of the current coding block relative to the top-left sample of the current picture, a location (xBl, yBl) specifying the top-left sample of the current block relative to the top-left sample of the current coding block, a variable edgeType specifying whether a vertical (EDGE_VER) or a horizontal (EDGE_HOR) edge is filtered, a variable bS specifying the boundary filtering strength.

a variable maxFilterLengthP specifying the max filter length, a variable maxFilterLengthQ specifying the max filter length.

Outputs of this process are:

the variables dE, dEp and dEq containing decisions, the modified filter length variables maxFilterLengthP and maxFilterLengthQ, the variable $t_C$.

The sample values $p_{i,k}$ and $q_{i,k}$ with i=0 . . . maxFilterLengthP, j=0 . . . maxFilterLengthQ and k=0 and 3 are derived as follows:

If edgeType is equal to EDGE_VER, the following applies:

$$q_{j,k} = recPicture_L[xCb + xB1 + j][yCb + yB1 + k]$$

$$p_{i,k} = recPicture_L[xCb + xB1 - i - 1][yCb + yB1 + k]$$

Otherwise (edgeType is equal to EDGE HOR), the following applies:

$$q_{j,k} = recPicture[xCb + xB1 + k][yCb + yB1 + j]$$

$$p_{i,k} = recPicture[xCb + xB1 + k][yCb + yB1 - i - 1]$$

The variable qpOffset is derived as follows:

If sps_ladf enabled flag is equal to 1, the following applies:

The variable lumaLevel of the reconstructed luma level is derived as follow:

$$lumaLevel = ((p_{0,0} + p_{0,3} + q_{0,0} + q_{0,3}) >> 2),$$

The variable qpOffset is set equal to sps_ladf_lowest_interval_qp_offset and modified as follows:

```
for( i = 0; i < sps_num_ladf_intervals_minus2 + 1; i++ ) {
    if( lumaLevel > SpsLadfIntervalLowerBound[ i + 1 ] )
        qpOffset = sps_ladf_qp_offset[ i ]
    else
        break
}
```

Otherwise, qpOffset is set equal to 0.

The variables $Qp_Q$ and $Qp_P$ are set equal to the $Qp_Y$ values of the coding units which include the coding blocks containing the sample $q_{0,0}$ and $p_{0,0}$, respectively.

The variable qP is derived as follows:

$$qP = ((Qp_Q + Qp_P + 1) >> 1) + qpOffset$$

The value of the variable β' is determined as specified in the Table illustrated in FIG. 6 based on the quantization parameter Q derived as follows:

$$Q = Clip3(0, 63, qP + (slice\_beta\_offset\_div2 << 1))$$

where slice_beta_offset div2 is the value of the syntax element slice_beta_offset_div2 for the slice that contains sample $q_{0,0}$.

The variable β is derived as follows:

$$\beta = \beta' * (1 << (BitDepth_Y - 8))$$

The value of the variable $t_C'$ is determined as specified Table the illustrated in FIG. 6 based on the quantization parameter Q derived as follows:

$$Q = Clip3(0, 65, qP + 2*(bS - 1) + (slice\_tc\_offset\_div2 << 1))$$

where slice_tc_offset_div2 is the value of the syntax element slice_tc_offset_div2 for the slice that contains sample $q_{0,0}$.

The variable $t_C$ is derived as follows:

$$t_C = t_C' * (1 << (BitDepth_Y - 8))$$

The following ordered steps apply:
1. The variables dp0, dp3, dq0 and dq3 are derived as follows:

$$dp0 = Abs(p_{2,0} - 2 * p_{1,0} + p_{0,0})$$

$$dp3 = Abs(p_{2,3} - 2 * p_{1,3} + p_{0,3})$$

$$dq0 = Abs(q_{2,0} - 2 * q_{1,0} + q_{0,0})$$

$$dq3 = Abs(q_{2,3} - 2 * q_{1,3} + q_{0,3})$$

2. When maxFilterLengthP and maxFilterLengthQ both are equal to or greater than 3 the variables sp0, sq0, spq0, sp3, sq3 and spq3 are derived as follows:

$$sp0 = Abs(p_{3,0} - p_{0,0})$$

$$sq0 = Abs(q_{0,0} - q_{3,0})$$

$$spq0 = Abs(p_{0,0} - q_{0,0})$$

$$sp3 = Abs(p_{3,3} - p_{0,3})$$

$$sq3 = Abs(q_{0,3} - q_{3,3})$$

$$spq3 = Abs(p_{0,3} - q_{0,3})$$

3. The variables sidePisLargeBlk and sideQisLargeBlk are set equal to 0.
4. When maxFilterLengthP is larger than 3, sidePisLargeBlk is set equal to 1:
5. When maxFilterLengthQ is larger than 3, sideisLargeBlk is set equal to 1:

6. When edgeType is equal to EDGE_HOR and (yCb+yBl)% CtbSizeY is equal to 0, sidePisLargeBlk is set equal to 0.
7. The variables dSam0 and dSam3 are initialized to 0.
8. When sidePisLargeBlk or sideQisLargeBlk is greater than 0, the following applies:
   a. The variables dp0L, dp3L are derived and maxFilterLengthP is modified as follows:
      If sidePisLargeBlk is equal to 1, the following applies:

$$dp0L = (dp0 + \text{Abs}(p_{5,0} - 2*p_{4,0} + p_{3,0}) + 1) >> 1$$

$$dp3L = (dp3 + \text{Abs}(p_{5,3} - 2*p_{4,3} + p_{3,3}) + 1) >> 1$$

Otherwise, the following applies:

$$dp0L = dp0$$
      $$dp3L = dp3$$
      $$maxFilterLengthP = 3$$

b. The variables dq0L and dq3L are derived as follows:
      If sideQisLargeBlk is equal to 1, the following applies:

$$dq0L = (dq0 + \text{Abs}(d_{5,0} - 2*q_{4,0} + q_{3,0}) + 1) >> 1$$

$$dq3L = (dq3 + \text{Abs}(d_{5,3} - 2*q_{4,3} + q_{3,3}) + 1) >> 1$$

Otherwise, the following applies:

$$dq0L = dq0$$
      $$dq3L = dq3$$

c. The variables dpq0L, dpq3L, and dL are derived as follows:

$$dpq0L = dp0L + dq0L$$
      $$dpq3L = dp3L + dq3L$$
      $$dL = dpq0L + dpq0L$$

d. When dL is less than $p_i$ the following ordered steps apply:
      i. The variable dpq is set equal to 2*dpq0L.
      ii. The variable sp is set equal to sp0, the variable sq is set equal to sq0 and the variable spq is set equal to spq0.
      iii. The variables $p_0$ $p_3$ $q_0$ and $q_3$ are first initialized to 0 and then modified according to sidePisLargeBlk and sideQisLargeBlk as follows:

When sidePisLargeBlk is equal to 1, the following applies:

$$p_3 = p_{3,0}$$
      $$p_0 = p_{maxFilterLengthP,0}$$

When sideQisLargeBlk is equal to 1, the following applies:

$$q_3 = q_{3,0}$$
      $$q_0 = q_{maxFilterLengthQ,0}$$

iv. For the sample location (xCb+xBl, yCb+yBl), the decision process for a luma sample as specified below is invoked with the sample values $p_0$, $p_3$, $q_0$, $q_3$, the variables dpq, sp, sq, spq, sidePisLargeBik, sideQisLargeBlk, p and $t_C$ as inputs, and the output is assigned to the decision dSam0.
      v. The variable dpq is set equal to 2*dpq3L.
      vi. The variable sp is set equal to sp3, the variable sq is set equal to sq3 and the variable spq is set equal to spq3.
      vii. The variables $p_0$ $p_3$ $q_0$ and $q_3$ are first initialized to 0 and are then modified according to sidePisLargeBlk and sideQisLargeBlk as follows:

When sidePisLargeBlk is equal to 1, the following applies:

$$p_3 = p_{3,3}$$
      $$p_0 = p_{maxFilterLengthP,3}$$

When sideQisLargeBlk is equal to 1, the following applies:

$$q_3 = q_{3,3}$$
      $$q_0 = q_{maxFilterLengthQ,3}$$

viii. When edgeType is equal to EDGE_VER for the sample location (xCb+xBl, yCb+yBl+3) or when edgeType is equal to EDGE_HOR for the sample location (xCb+xBl+3, yCb+yBl), the decision process for a luma sample as specified below is invoked with the sample values $p_0$, $p_3$, $q_0$, $q_3$, the variables dpq, sp, sq, spq, sidePisLargeBlk, sideQisLargeBlk, β and $t_C$ as inputs, and the output is assigned to the decision dSam3.

9. The variables dE, dEp and dEq are derived as follows:
   If dSam0 and dSam3 are both equal to 1, the variable dE is set equal to 3, dEp is set equal to 1, and dEq is set equal to 1.

Otherwise, the following ordered steps apply:
a. The variables dpq0, dpq3, dp, dq and d are derived as follows:

$$dpq0 = dp0 + dq0$$
$$dpq3 = dp3 + dq3$$
$$dp = dp0 + dp3$$
$$dq = dq0 + dq3$$
$$d = dpq0 + dpq3$$

b. The variables dE, dEp, dEq, sidePisLargeBlk and sideQisLargeBlk are set equal to 0.
c. When d is less than p and both maxFilterLengthP and maxFilterLengthQ are greater than 2, the following ordered steps apply:
  i. The variable dpq is set equal to 2*dpq0.
  ii. The variable sp is set equal to sp0, the variable sq is set equal to sq0 and the variable spq is set equal to spq0.
  iii. For the sample location (xCb+xBl, yCb+yBl), the decision process for a luma sample as specified below is invoked with the variables $p_0$, $p_3$, $q_0$, $q_3$ all set equal to 0, the variables dpq, sp, sq, spq, sidePisLargeBlk, sideQisLargeBlk, R and $t_C$ as inputs, and the output is assigned to the decision dSam0.
  iv. The variable dpq is set equal to 2*dpq3.
  v. The variable sp is set equal to sp3, the variable sq is set equal to sq3 and the variable spq is set equal to spq3.
  vi. When edgeType is equal to EDGE_VER for the sample location (xCb+xBl, yCb+yBl+3) or when edgeType is equal to EDGE_HOR for the sample location (xCb xBl+3, yCb+yBl), the decision process for a sample as specified below is invoked with the variables $p_0$, $p_0$, $q_0$, $q_3$ all set equal to 0, the variables dpq, sp, sq, spq, sidePisLargeBlk, sideQisLargeBlk, β and $t_C$ as inputs, and the output is assigned to the decision dSam3.
d. When d is less than P, the following ordered steps apply:
  i. The variable dE is set equal to 1.
  ii. When dSam0 is equal to 1 and dSam3 is equal to 1, the variable dE is set equal to 2.
  iii. When dp is less than (β+(β>>1)>>3, the variable dEp is set equal to 1.
  iv. When dq is less than (β+(β>>1))>>3, the variable dEq is set equal to 1.

Decision Process for a Luma Sample
Inputs to this process are:
the sample values $p_0$, $p_3$, $q_0$ and $q_3$,
the variables dpq, sp, sq, spq, sidePisLargeBlk, sideQisLargeBlk, p and $t_C$.
Output of this process is the variable dSam containing a decision.
The variables sp and sq are modified as follows:
When sidePisLargeBlk is equal to 1, the following applies:

$$sp = (sp + \text{Abs}(p_3 - p_0) + 1) >> 1$$

When sideQisLargeBlk is equal to 1, the following applies:

$$sq = (sq + \text{Abs}(q_3 - q_0) + 1) >> 1$$

The variable sThr is derived as follows:
If sidePisLargeBlk is equal to 1 or sideQisLargeBlk is equal to 1, the following applies:

$$sThr = 3 * \beta >> 5$$

Otherwise, the following applies:

$$sThr = 3 * \beta >> 3$$

The variable dSam is specified as follows:
If all of the following conditions are true, dSam is set equal to 1:
  dpq is less than (β>>2),
  sp+sq is less than sThr,
  spq is less than (5*$t_C$+1)>>1.
Otherwise, dSam is set to 0.

In JVET-N1001, for chroma, the variable $t_C$ is determined according to a decision process for block edge as follows:
This process is only invoked when ChromaArrayType is not equal to 0.
Inputs to this process are:
a chroma picture sample array recPicture,
a chroma location (xCb, yCb) specifying the top-left sample of the current chroma coding block relative to the top-left chroma sample of the current picture,
a chroma location (xBl, yBl) specifying the top-left sample of the current chroma block relative to the top-left sample of the current chroma coding block,
a variable edgeType specifying whether a vertical (EDGE_VER) or a horizontal (EDGE_HOR) edge is filtered,
a variable cQpPicOffset specifying the picture-level chroma quantization parameter offset,
a variable bS specifying the boundary filtering strength,
a variable maxFilterLengthCbCr.
Outputs of this process are
the modified variable maxFilterLengthCbCr,
the variable $t_C$.
The values $p_i$ and $q_i$ with i=0 . . . maxFilterLengthCbCr and k=0 . . . 1 are derived as follows:
if edgeType is equal to EDGE_VER, the following applies::

$$q_{i,k} = recPicture[xCb + xB1 + i][yCb + yB1 + k]$$
$$p_{i,k} = recPicture[xCb + xB1 - i - 1][yCb + yB1 + k]$$

Otherwise (edgeType is equal to EDGE_HOR), the following applies:

$$q_{i,k} = recPicture[xCb + xB1 + i][yCb + yB1 + i]$$

$$p_{i,k} = recPicture[xCb + xB1 + k][yCb + yB1 - i - 1]$$

The variables $Qp_Q$ and $Qp_P$ are set equal to the $Qp_Y$ values of the coding units which include the coding blocks containing the sample $q_{0,0}$ and $p_{0,0}$, respectively.

The variable $Qp_C$ is derived as follows:

If ChromaArrayType is equal to 1, the variable $Qp_C$ is determined as specified in Table 3 based on the index qPi derived as follows:

$$qPi = ((Qp_Q + Qp_P + 1) >> 1) + cQpPicOffset$$

TABLE 3

| qPi | <30 | 30 | 31 | 32 | 33 | 34 | 35 | 36 | 37 | 38 | 39 | 40 | 41 | 42 | 43 | >43 |
|---|---|---|---|---|---|---|---|---|---|---|---|---|---|---|---|---|
| $Qp_C$ | = qPi | 29 | 30 | 31 | 32 | 33 | 33 | 34 | 34 | 35 | 35 | 36 | 36 | 37 | 37 | = qPi − 6 |

Otherwise (ChromaArrayType is greater than 1), the variable $Qp_C$ is set equal to Min(qPi, 63).

NOTE—The variable cQpPicOffset provides an adjustment for the value of pps_cb_qp_offset or pps_cr_qp_offset, according to whether the filtered chroma component is the Cb or Cr component. However, to avoid the need to vary the amount of the adjustment within the picture, the filtering process does not include an adjustment for the value of slice_cb_qp_offset or slice_cr_qp_offset.

The value of the variable s' is determined as specified in the Table illustrated in FIG. 6 based on the quantization parameter Q derived as follows:

$$Q = Clip3(0, 63, Qp_C + (slice\_beta\_offset\_div2 << 1))$$

where slice_beta_offset_div2 is the value of the syntax element slice_beta_offset_div2 for the slice that contains sample $q_{0,0}$.

The variable β is derived as follows:

$$\beta = \beta' * (1 << (BitDepth_C - 8))$$

The value of the variable $t_C'$ is determined as specified in the Table illustrated in FIG. 6 based on the chroma quantization parameter Q derived as follows:

$$Q = Clip3(0, 65, Qp_C + 2*(bS - 1) + (slice\_tc\_offset\_div2 << 1))$$

where slice_tc_offset_div2 is the value of the syntax element slice_tc_offset_div2 for the slice that contains sample $q_{0,0}$.

The variable $t_E$ is derived as follows:

$$t_C = t_C' * (1 << BitDepth)_C - 8))$$

When maxFilterLengthCbCr is equal to 1 and bS is not equal to 2, maxFilterLengthCbCr is set equal to 0.

When maxFilterLengthCbCr is equal to 3, the following ordered steps apply:
1. The variables dpq0, dpq1, dp, dq and d are derived as follows:

$$dp0 = Abs(p_{2,0} - 2*p_{1,0} + p_{0,0})$$

$$dp1 = Abs(p_{2,1} - 2*p_{1,1} + p_{0,1})$$

$$dq0 = Abs(q_{2,0} - 2*q_{1,0} + q_{0,0})$$

$$dq0 = Abs(q_{2,1} - 2*q_{1,1} + q_{0,1})$$

-continued $$dpq0 = dp0 + dq0$$

$$dpq1 = dp1 + dq1$$

$$dp = dp0 + dp1$$

$$dq = dq0 + dq1$$

$$d = dpq0 + dpq1$$

2. The variables dSam0 and dSam1 are both set equal to 0.
3. When d is less than 0, the following ordered steps apply:
    a. The variable dpq is set equal to 2*dpq0.
    b. The variable dSam0 is derived by invoking the decision process for a chroma sample as specified below for the sample location (xCb+xB1, yCb+yB1) with sample values $p_{0,0}$ $p_{3,0}$, $q_{0,0}$, and $q_{3,0}$, the variables dpq, β and $t_C$ as inputs, and the output is assigned to the decision dSam0.
    c. The variable dpq is set equal to 2*dpq1.
    d. The variable dSam1 is modified as follows:
        If edgeType is equal to EDGE_VER, for the sample location (xCb+xB1, yCb+yB1+1), the decision process for a chroma sample as specified below invoked with sample values $p_{0,1}$, $p_{3,1}$, $q_{0,1}$, and $q_{3,1}$, the variables dpq, β and $t_C$ as inputs, and the output is assigned to the decision dSam1.
        Otherwise (edgeType is equal to EDGE_HOR), f or the sample location (xCb+xB1+1, yCb+yB1), the decision process for a chroma sample as specified below is invoked with sample values $p_{0,1}$, $p_{3,1}$, $q_{0,1}$, and $q_{3,1}$, the variables dpq, β and $t_C$ as inputs, and the output is assigned to the decision dSam1.
4. The variable maxFilterLengthCbCr is modified as follows:
    If dSam0 is equal to 1 and dSam1 is equal to 1, maxFilterLengthCbCr is set equal to 3.

Otherwise, maxFilterLengthCbCr is set equal to 1.
Decision Process for a Chroma Sample
Inputs to this process are:
the sample values $p_0$, $p_3$, $q_0$ and $q_3$,
the variables dpq, β and $t_C$.
Output of this process is the variable dSam containing a decision.
The variable dSam is specified as follows:
If all of the following conditions are true, dSam is set equal to 1:
dpq is less than (β>>2),
Abs($p_3$−$p_0$)+Abs($q_0$−$q_3$) is less than (β>>3),
Abs($p_0$−$q_0$) is less than (5*$t_C$+1)>>1.
Otherwise, dSam is set equal to 0.
As provided above, the decision process for the variable $t_C$, a variable dE, and the variables dEp and dEq for luma and the decision process for the variable $t_C$ for chroma applied for a block edge. In JVET-N1001, a block edge is derived as follows:
The variables subW, subH, xN, yN, $xD_k$ and $yD_m$ are derived as follows:

$$subW = cIdx == 0\,?\,1 : SubWidthC$$

$$subH = cIdx == 0\,?\,1 : SubHeightC$$

$$xN =$$

$$edgeType == \text{EDGE\_VER}\,?\,\text{Max}(0, (nCbW/8)-1) : (nCbW/4/subW) - 1$$

$$yN =$$

$$edgeType == \text{EDGE\_VER}\,?\,(nCbH/4/subH) - 1 : \text{Max}(0, (nCbH/8)-1)$$

$$xD_k = edgeType == \text{EDGE\_VER}\,?\,(k<<3) : (k<<(2/subW))$$

$$yD_m = edgeType == \text{EDGE\_VER}\,?\,(m<<(2/subH)) : (m<<3)$$

Where,
cIdx==0, indicates the luma channel;
cIdx==1, indicates the chroma channel;
edgeType==EDGE_VER indicates a vertical deblocking edge, and when not true indicates a horizontal deblocking edge.
And blocks edges are provided at $xD_k$ with k=0 . . . xN and $yD_m$ with m=0 . . . yN
Thus, the decision process for the variable $t_C$, a variable dE, and the variables dEp and dEq for luma and the decision process for the variable $t_C$ for chroma applied is applied on a 4 lines by four line basis (i.e., lines are rows for a vertical deblocking edge and columns for a horizontal deblocking edge). Further, referring to the decision process for the variable $t_C$, a variable dE, and the variables dEp and dEq for luma, the decision is based on variables dp0, dp3, dq0 and dq3, which as provided above, is based on lines 0 and 3 with respect to the block edge. Further, referring to the decision process for the variable $t_C$ for chroma, the decision is based on variables dp0, dp1, dq0 and dq1, which as provided above, is based on lines 0 and 1 with respect to the block edge. Essentially, the variables dp0, dp3, dq0 and dq3, and dp0, dp1, dq0 and dq1 are used to compute gradients, i.e., between a Q block and a P block, in order to detect blockiness at a deblocking boundary.

Figure 7A:
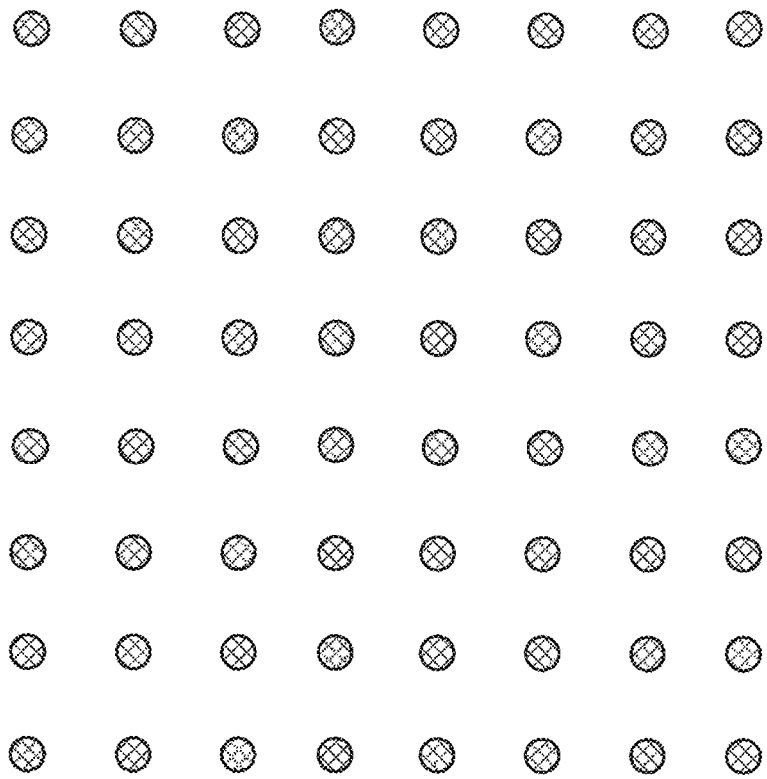
FIG. 7A is a conceptual diagram illustrating an example of a video component sampling format and corresponding deblocking decision processes in accordance with one or more techniques of this disclosure.
Figure 7A:
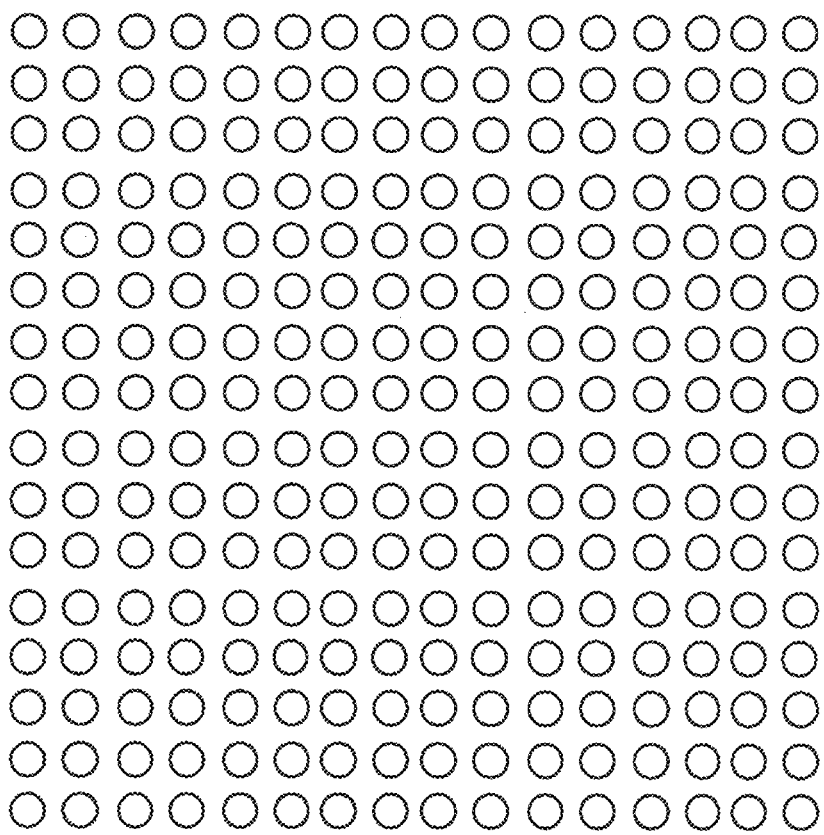
Figure 7B:
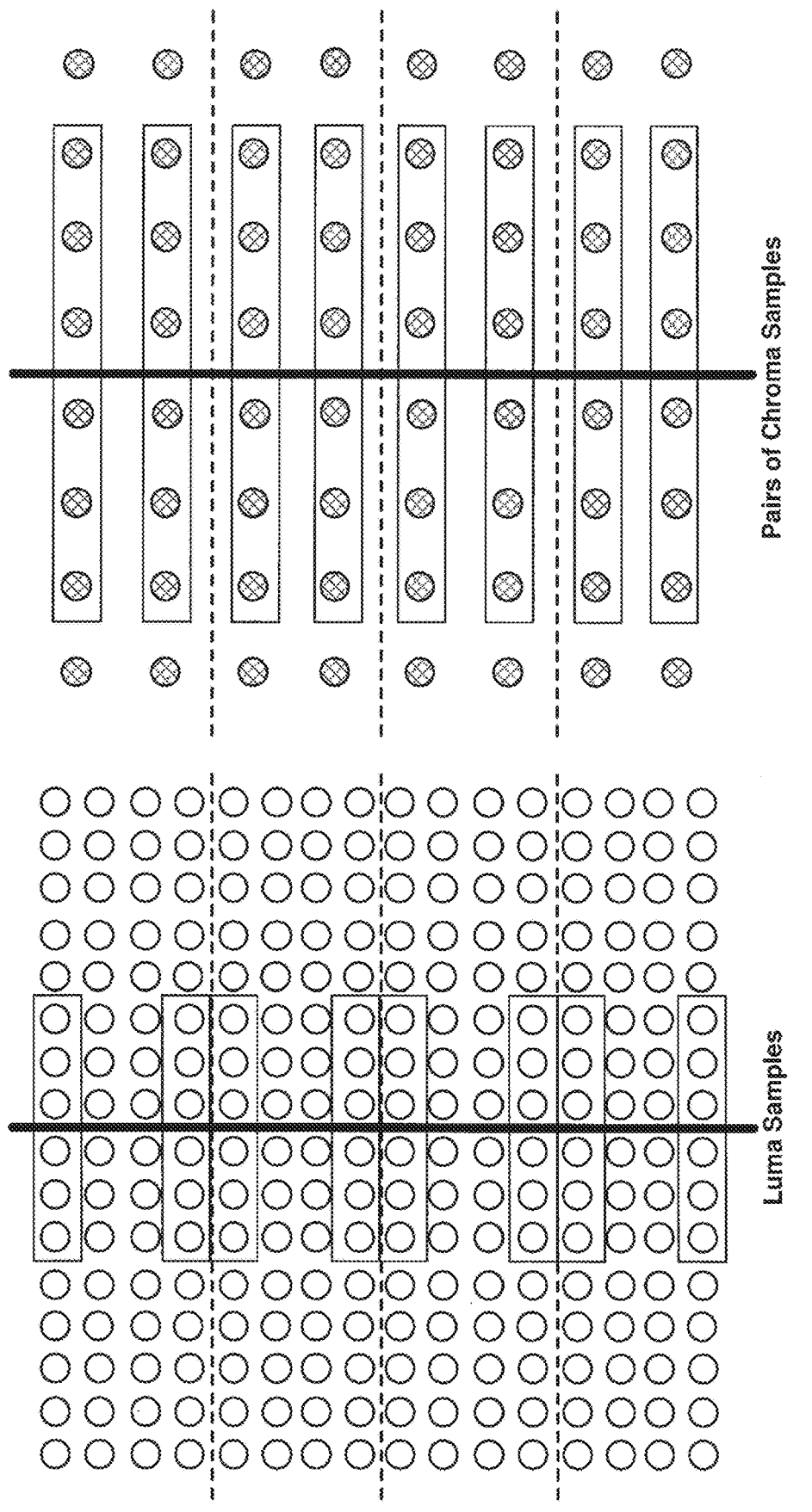
FIG. 7B is a conceptual diagram illustrating an example of a video component sampling format and corresponding deblocking decision processes in accordance with one or more techniques of this disclosure.
Figure 7C:
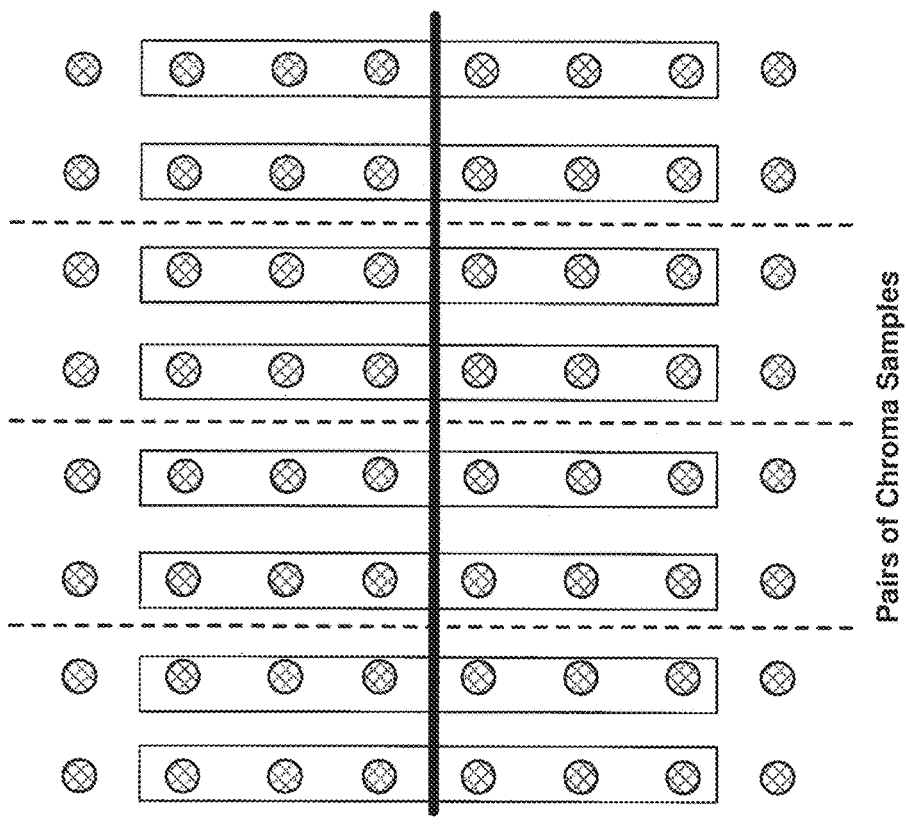
FIG. 7C is a conceptual diagram illustrating an example of a video component sampling format and corresponding deblocking decision processes in accordance with one or more techniques of this disclosure.
Figure 7C:
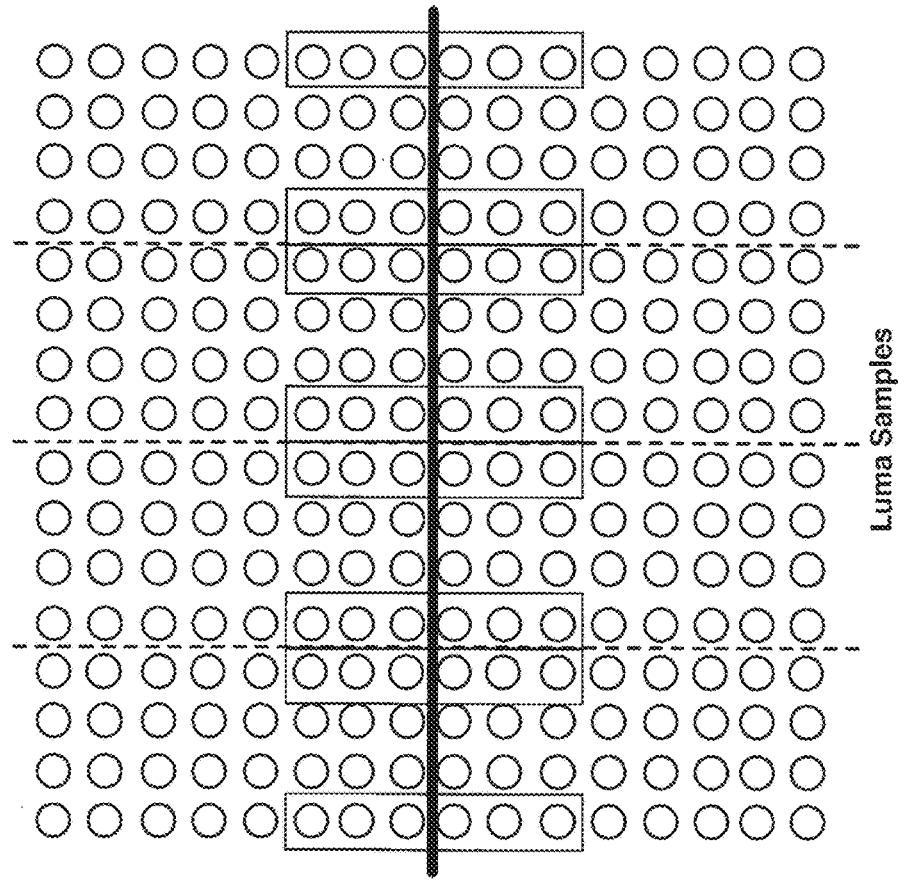
Figure 8A:
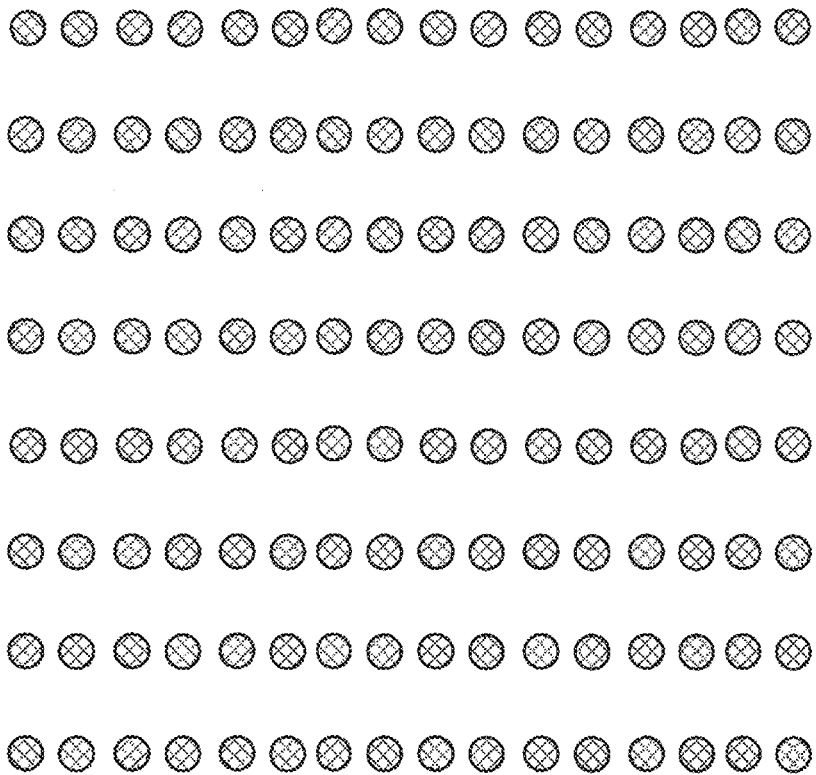
FIG. 8A is a conceptual diagram illustrating an example of a video component sampling format and corresponding deblocking decision processes in accordance with one or more techniques of this disclosure.
Figure 8A:
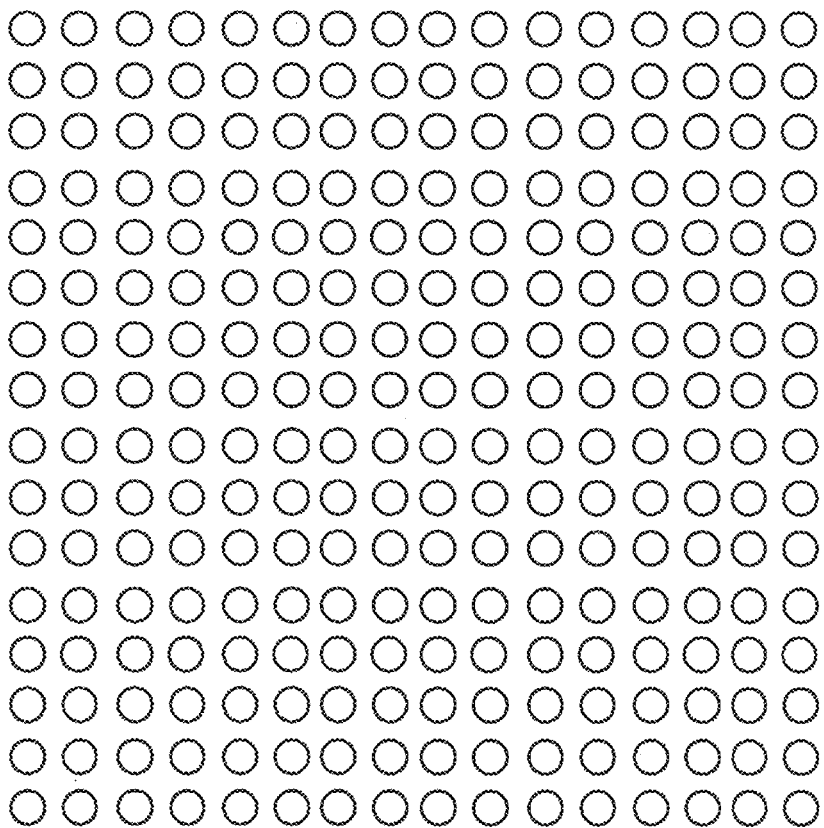
Figure 8B:
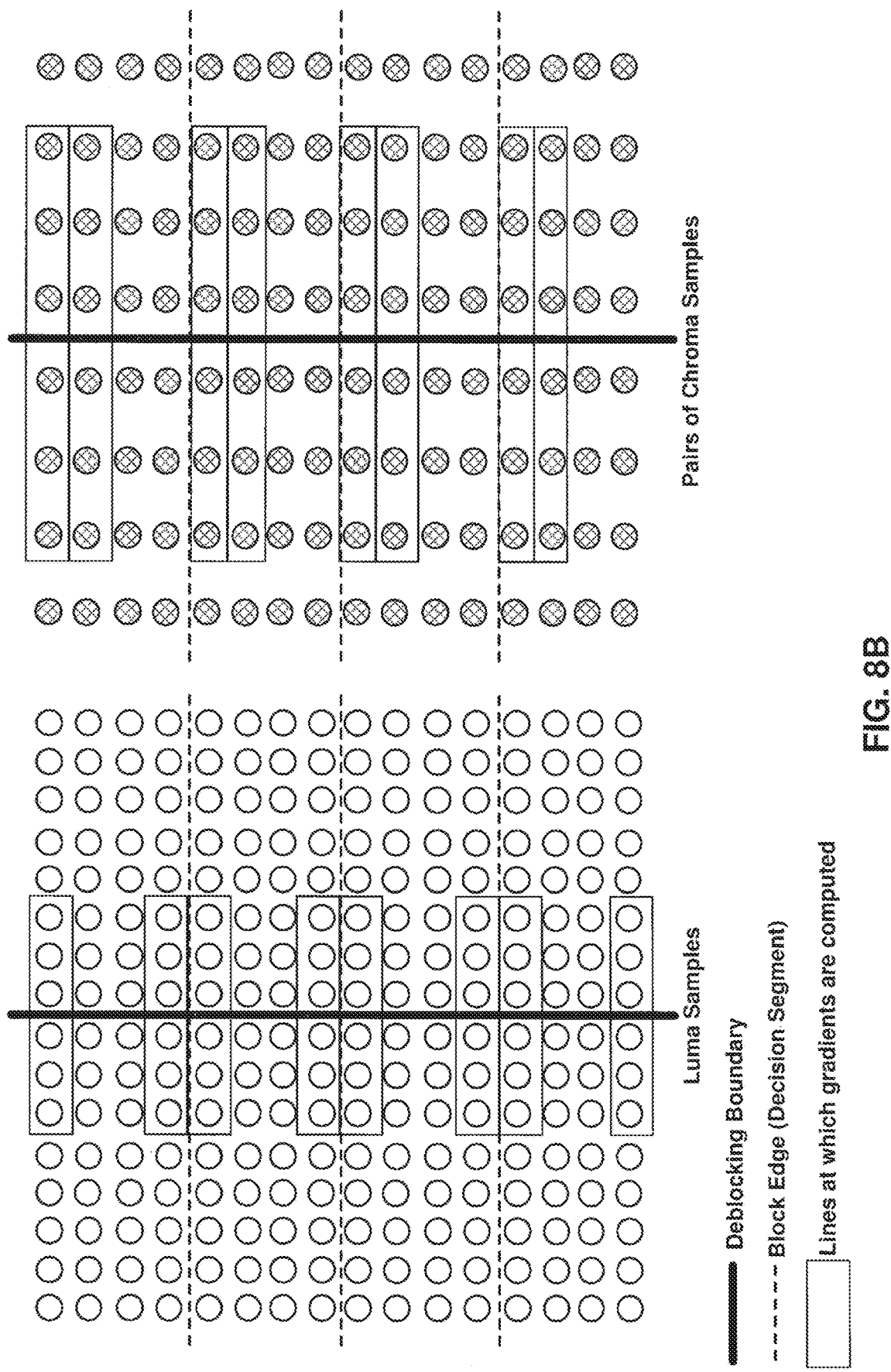
FIG. 8B is a conceptual diagram illustrating an example of a video component sampling format and corresponding deblocking decision processes in accordance with one or more techniques of this disclosure.
Figure 8C:
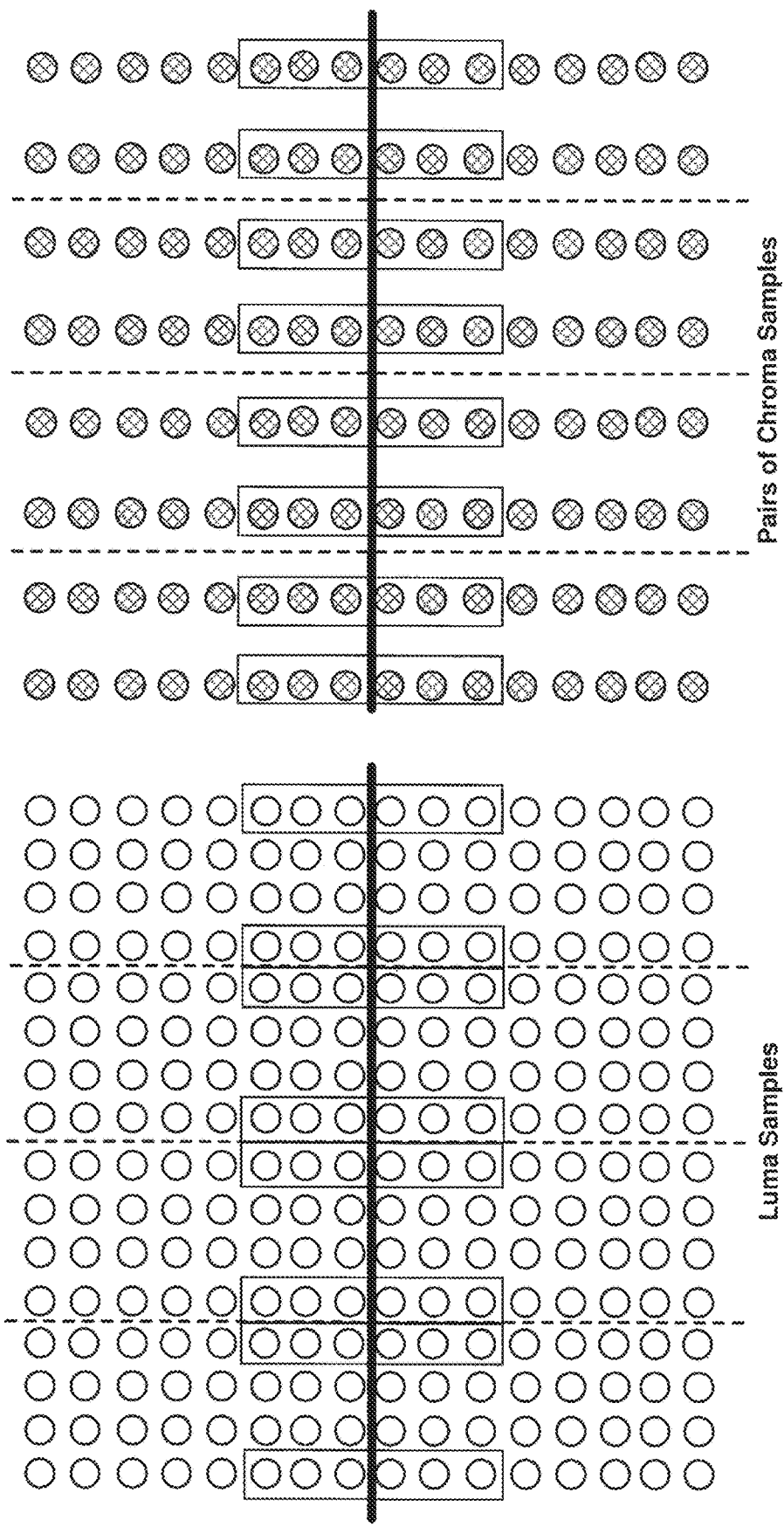
FIG. 8C is a conceptual diagram illustrating an example of a video component sampling format and corresponding deblocking decision processes in accordance with one or more techniques of this disclosure.
Figure 9A:
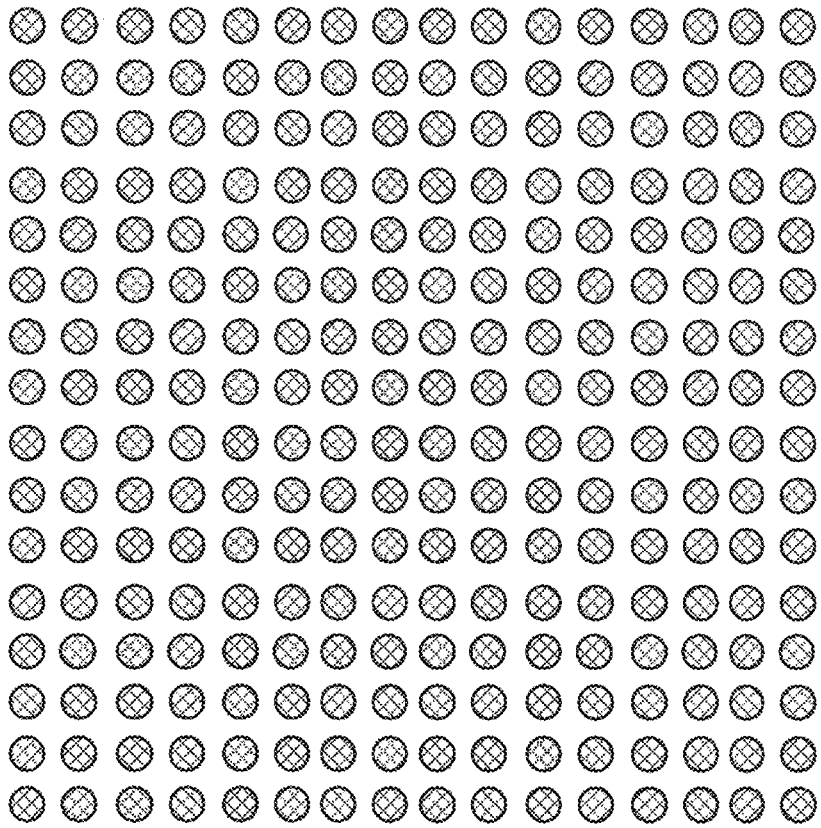
FIG. 9A is a conceptual diagram illustrating an example of a video component sampling format and corresponding deblocking decision processes in accordance with one or more techniques of this disclosure.
Figure 9A:
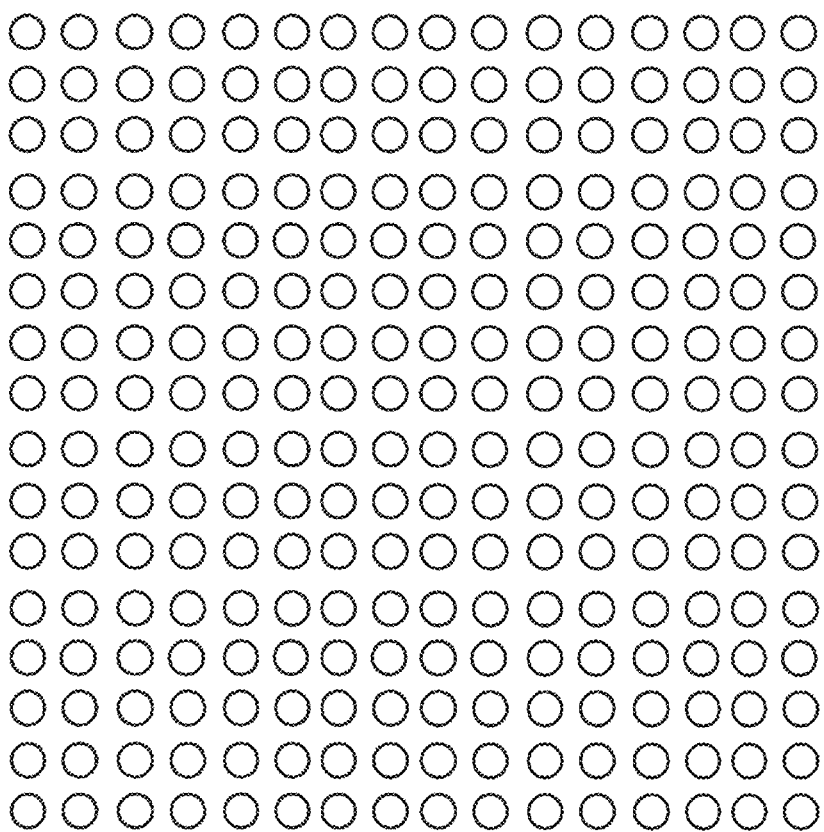
Figure 9B:
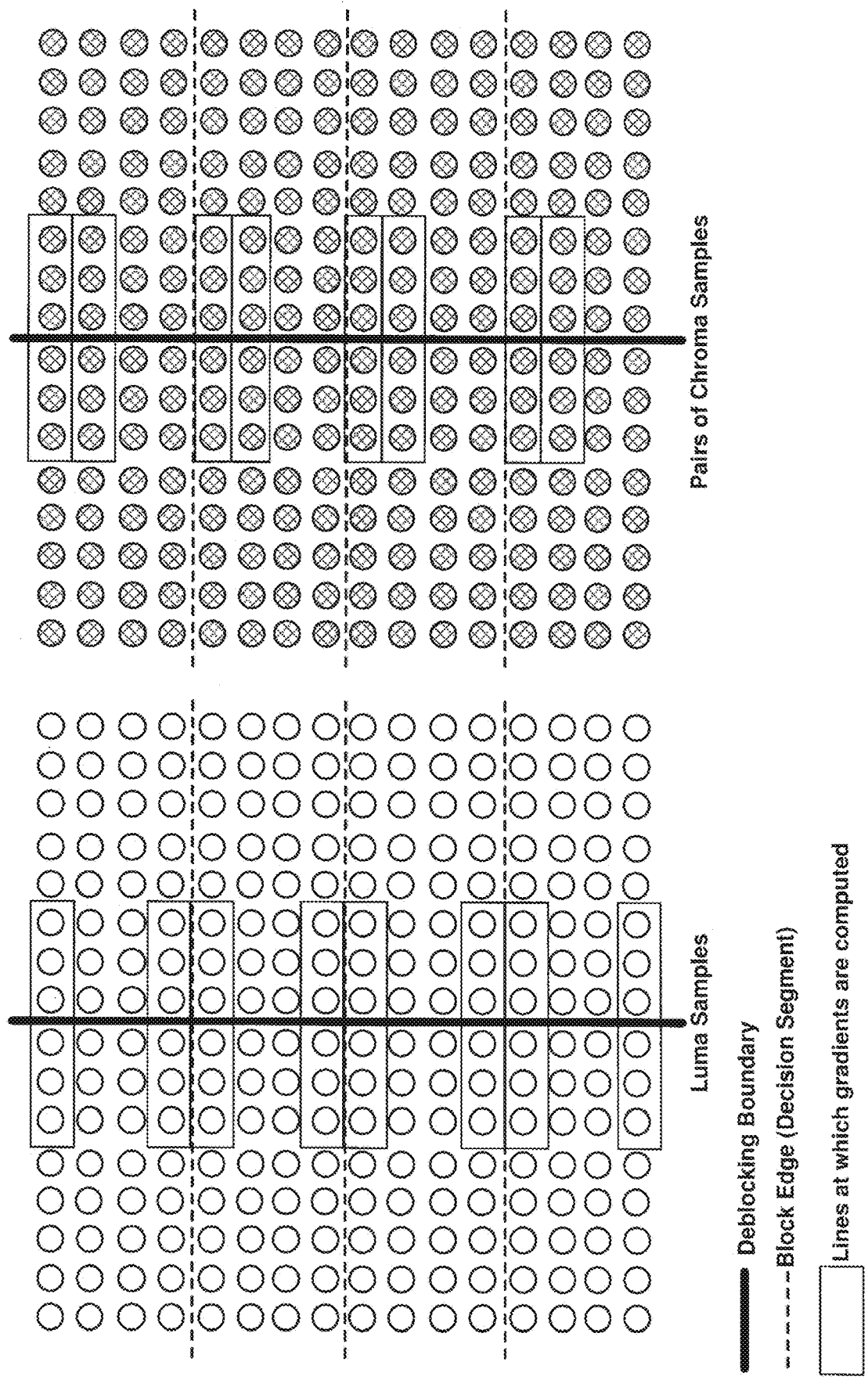
FIG. 9B is a conceptual diagram illustrating an example of a video component sampling format and corresponding deblocking decision processes in accordance with one or more techniques of this disclosure.
Figure 9C:
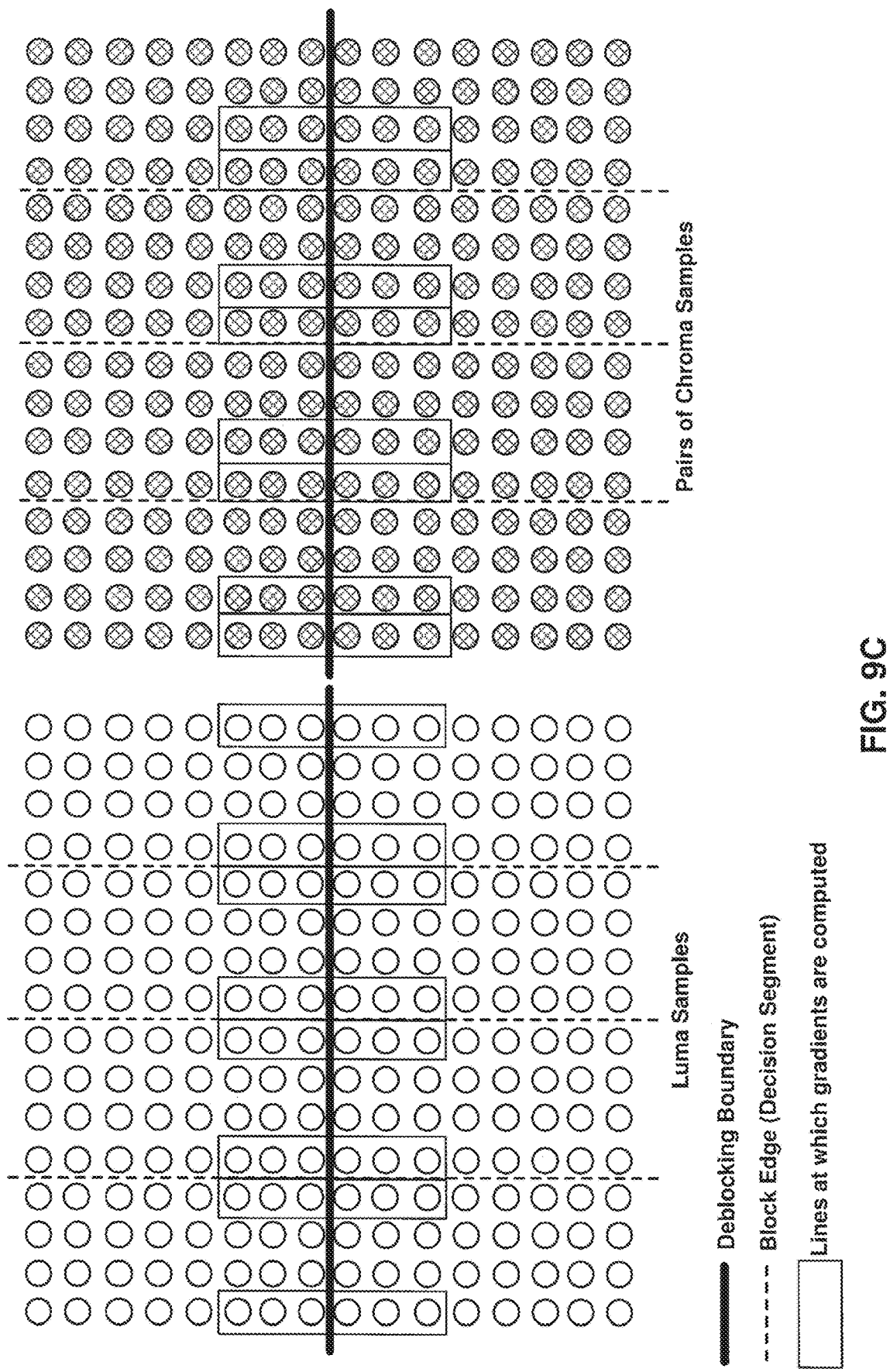
FIG. 9C is a conceptual diagram illustrating an example of a video component sampling format and corresponding deblocking decision processes in accordance with one or more techniques of this disclosure.

FIGS. 7A-7C, FIGS. 8A-8C, and FIGS. 9A-9C are conceptual diagrams that illustrate lines at which samples therefrom are used to compute gradients, i.e., lines at which gradients are computed for determining blockiness. FIGS. 7A-7C, FIGS. 8A-8C, and FIGS. 9A-9C illustrate lines at which gradients are computed for each channel of a reconstructed picture having a respective chroma format. FIGS. 7A-7C illustrate lines at which gradients are computed for the 4:2:0 chroma format. It should be noted that in the example illustrated in FIG. 7A-7C, the Chroma Location Type 0 is illustrated. FIGS. 8A-8C illustrate lines at which gradients are computed for the 4:2:2 chroma format. FIGS. 9A-9C illustrate lines at which gradients are computed for the 4:4:4 chroma format. It should be noted that the examples in FIGS. 7A-7C. FIGS. 8A-8C, and FIGS. 9A-9C illustrate a worst-case scenario, i.e., the maximum number of gradient computations that may be needed to be computed for a given boundary direction. Increased number of computations adversely impact the ability to meet a throughput requirement e.g., number of pictures to be processed in a second. It should be noted that in some cases, a computation for a block edge may be skipped, e.g., based on a boundary strength determination.

The computation of gradients for determining blockiness in JVET-N1001 may be less than ideal. That is, with respect to FIGS. FIGS. 7A-7C. FIGS. 8A-8C, and FIGS. 9A-9C the following deficiencies may be observed: For 4:2:0, gradients are computed for every chroma line, which is more than for luma, where in the worst-case, gradients are computed for two out of four lines. For 4:2:2, for the horizontal chroma boundary deblocking, the same issue occurs. Additionally, for the vertical chroma boundary de-blocking, line 0 and line 1 are used for gradient determination, whereas for luma line 0 and line 3 is used. This may result in inconsistency in the blockiness determination for each channel. For 4:4:4, this inconsistency in the blockiness determination for each channel exists for both horizontal and vertical chroma boundary deblocking.

It should be noted that in addition to applying a deblocking filter as part of an in-loop filtering process, Sample Adaptive Offset (SAO) filtering may be applied in the in-loop filtering process. In ITU-T H.265, SAO is a process that modifies the deblocked sample values in a region by conditionally adding an offset value. ITU-T H.265 provides two types of SAO filters that may be applied to a CTB: band offset or edge offset. For each of band offset and edge offset, four offset values are included in a bitstream. For band offset, the offset which is applied depends on the amplitude of a sample value (e.g., amplitudes are mapped to bands which are mapped to the four signaled offsets). For edge offset, the offset which is applied depends on a CTB having one of a horizontal, vertical, first diagonal, or second diagonal edge classification (e.g., classifications are mapped to the four signaled offsets). Another type of filtering process includes the so-called adaptive loop filter (ALF). An ALF with block-based adaption is specified in JEM. In JEM, the ALF is applied after the SAO filter. It should be noted that an ALF may be applied to reconstructed samples independently of other filtering techniques. The process for applying the ALF specified in JEM at a video encoder may be summarized as follows: (1) each 2×2 block of the luma component for a reconstructed picture is classified according to a classification index; (2) sets of filter coefficients are derived for each classification index; (3) filtering decisions are determined for the luma component; (4) a filtering decision is determined for the chroma components; and (5) filter parameters (e.g., coefficients and decisions) are signaled. Further, it should be noted that JVET-N1001 specifies SAO, and ALF filters which can be described as being generally based on the SAO and ALF filters provided in ITU-T H.265 and JEM.

Figure 10:
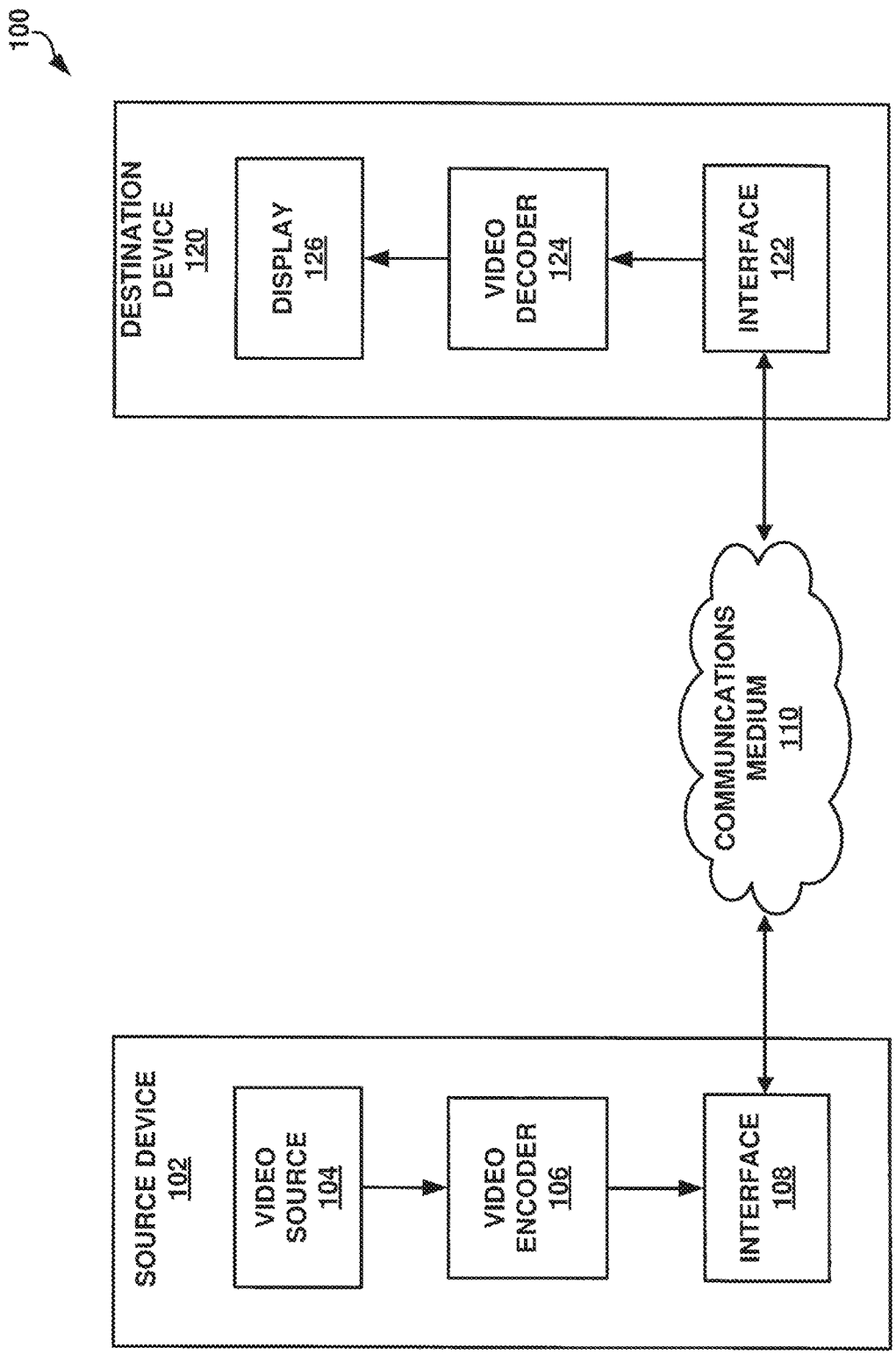
FIG. 10 is a block diagram illustrating an example of a system that may be configured to encode and decode video data according to one or more techniques of this disclosure.

FIG. 10 is a block diagram illustrating an example of a system that may be configured to code (i.e., encode and/or decode) video data according to one or more techniques of this disclosure. System 100 represents an example of a system that may perform video coding using partitioning techniques described according to one or more techniques of this disclosure. As illustrated in FIG. 10, system 100 includes source device 102, communications medium 110, and destination device 120. In the example illustrated in FIG. 10, source device 102 may include any device configured to encode video data and transmit encoded video data to communications medium 110. Destination device 120 may include any device configured to receive encoded video data via communications medium 110 and to decode encoded video data. Source device 102 and/or destination device 120 may include computing devices equipped for wired and/or wireless communications and may include set top boxes, digital video recorders, televisions, desktop, laptop, or tablet computers, gaming consoles, mobile devices, including, for example, "smart" phones, cellular telephones, personal gaming devices, and medical imagining devices.

Communications medium 110 may include any combination of wireless and wired communication media, and/or storage devices. Communications medium 110 may include coaxial cables, fiber optic cables, twisted pair cables, wireless transmitters and receivers, routers, switches, repeaters, base stations, or any other equipment that may be useful to facilitate communications between various devices and sites. Communications medium 110 may include one or more networks. For example, communications medium 110 may include a network configured to enable access to the World Wide Web, for example, the Internet. A network may operate according to a combination of one or more telecommunication protocols. Telecommunications protocols may include proprietary aspects and/or may include standardized telecommunication protocols. Examples of standardized telecommunications protocols include Digital Video Broadcasting (DVB) standards. Advanced Television Systems Committee (ATSC) standards, Integrated Services Digital Broadcasting (ISDB) standards. Data Over Cable Service Interface Specification (DOCSIS) standards, Global System Mobile Communications (GSM) standards, code division multiple access (CDMA) standards, 3rd Generation Partnership Project (3GPP) standards, European Telecommunications Standards Institute (ETSI) standards, Internet Protocol (IP) standards, Wireless Application Protocol (WAP) standards, and Institute of Electrical and Electronics Engineers (IEEE) standards.

Storage devices may include any type of device or storage medium capable of storing data. A storage medium may include a tangible or non-transitory computer-readable media. A computer readable medium may include optical discs, flash memory, magnetic memory, or any other suitable digital storage media. In some examples, a memory device or portions thereof may be described as non-volatile memory and in other examples portions of memory devices may be described as volatile memory. Examples of volatile memories may include random access memories (RAM), dynamic random access memories (DRAM), and static random access memories (SRAM). Examples of non-volatile memories may include magnetic hard discs, optical discs, floppy discs, flash memories, or forms of electrically programmable memories (EPROM) or electrically erasable and programmable (EEPROM) memories. Storage device(s) may include memory cards (e.g., a Secure Digital (SD) memory card), internal/external hard disk drives, and/or internal/external solid state drives. Data may be stored on a storage device according to a defined file format.

Referring again to FIG. 10, source device 102 includes video source 104, video encoder 106, and interface 108. Video source 104 may include any device configured to capture and/or store video data. For example, video source 104 may include a video camera and a storage device operably coupled thereto. Video encoder 106 may include any device configured to receive video data and generate a compliant bitstream representing the video data. A compliant bitstream may refer to a bitstream that a video decoder can receive and reproduce video data therefrom. Aspects of a compliant bitstream may be defined according to a video coding standard. When generating a compliant bitstream video encoder 106 may compress video data. Compression may be lossy (discernible or indiscernible) or lossless. Interface 108 may include any device configured to receive a compliant video bitstream and transmit and/or store the compliant video bitstream to a communications medium. Interface 108 may include a network interface card, such as an Ethernet card, and may include an optical transceiver, a radio frequency transceiver, or any other type of device that can send and/or receive information. Further, interface 108 may include a computer system interface that may enable a compliant video bitstream to be stored on a storage device. For example, interface 108 may include a chipset supporting Peripheral Component Interconnect (PCI) and Peripheral Component Interconnect Express (PCIe) bus protocols, proprietary bus protocols, Universal Serial Bus (USB) protocols, PC, or any other logical and physical structure that may be used to interconnect peer devices.

Referring again to FIG. 10, destination device 120 includes interface 122, video decoder 124, and display 126. Interface 122 may include any device configured to receive a compliant video bitstream from a communications medium. Interface 108 may include a network interface card, such as an Ethernet card, and may include an optical transceiver, a radio frequency transceiver, or any other type of device that can receive and/or send information. Further, interface 122 may include a computer system interface enabling a compliant video bitstream to be retrieved from a storage device. For example, interface 122 may include a chipset supporting PCI and PCIe bus protocols, proprietary bus protocols, USB protocols, PC, or any other logical and physical structure that may be used to interconnect peer devices. Video decoder 124 may include any device configured to receive a compliant bitstream and/or acceptable variations thereof and reproduce video data therefrom. Display 126 may include any device configured to display video data. Display 126 may comprise one of a variety of display devices such as a liquid crystal display (LCD), a plasma display, an organic light emitting diode (OLED) display, or another type of display. Display 126 may include a High Definition display or an Ultra High Definition display. It should be noted that although in the example illustrated in FIG. 10, video decoder 124 is described as outputting data to display 126, video decoder 124 may be configured to output video data to various types of devices and/or subcomponents thereof. For example, video decoder 124 may be configured to output video data to any communication medium, as described herein.

Figure 11:
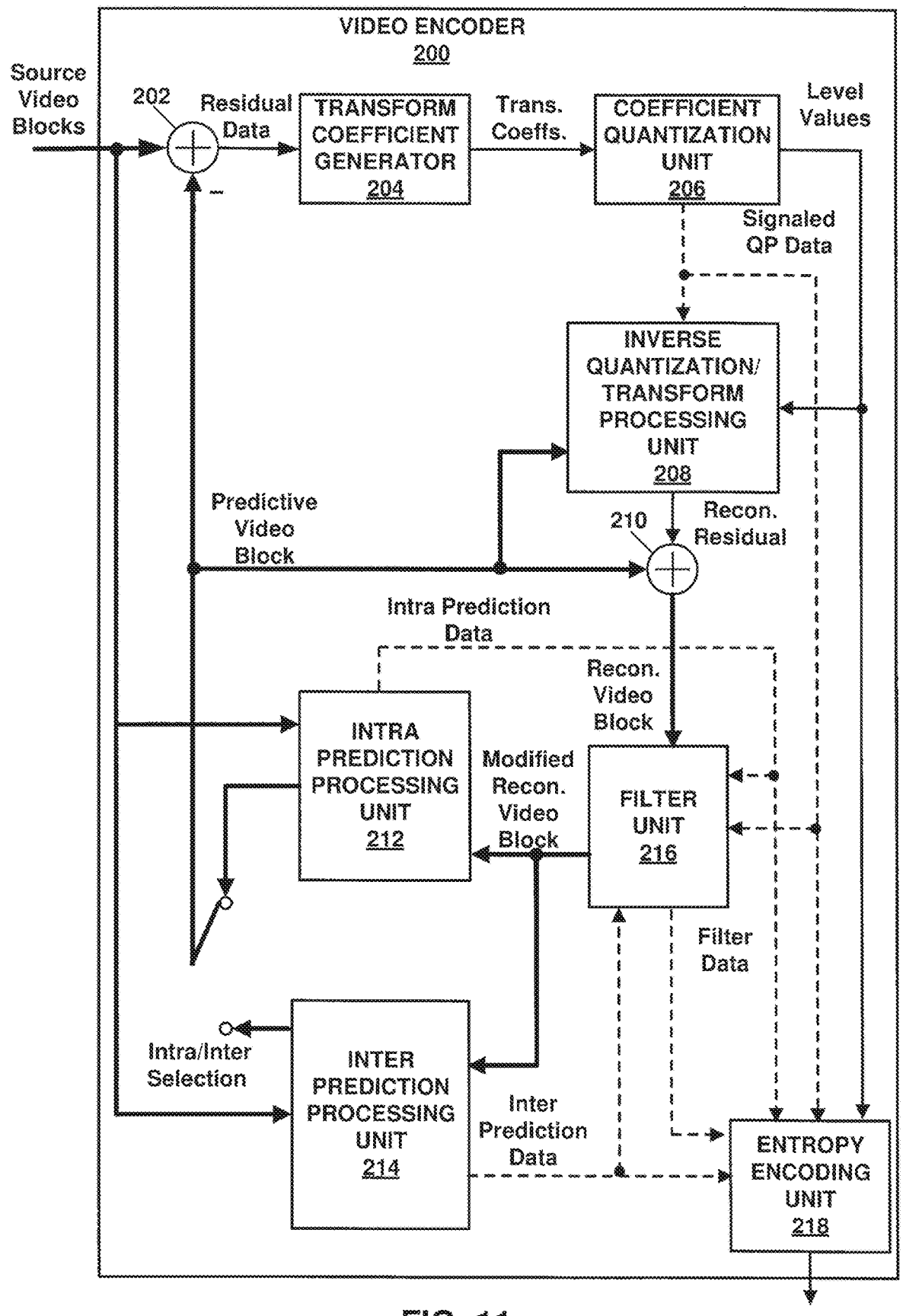
FIG. 11 is a block diagram illustrating an example of a video encoder that may be configured to encode video data according to one or more techniques of this disclosure.

FIG. 11 is a block diagram illustrating an example of video encoder 200 that may implement the techniques for encoding video data described herein. It should be noted that although example video encoder 200 is illustrated as having distinct functional blocks, such an illustration is for descriptive purposes and does not limit video encoder 200 and/or sub-components thereof to a particular hardware or software architecture. Functions of video encoder 200 may be realized using any combination of hardware, firmware, and/or software implementations. In one example, video encoder 200 may be configured to encode video data according to the techniques described herein. Video encoder 200 may perform intra prediction coding and inter prediction coding of picture areas, and, as such, may be referred to as a hybrid video encoder. In the example illustrated in FIG. 11, video encoder 200 receives source video blocks. In some examples, source video blocks may include areas of picture that has been divided according to a coding structure. For example, source video data may include macroblocks, CTUs, CBs, sub-divisions thereof, and/or another equivalent coding unit. In some examples, video encoder 200 may be configured to perform additional sub-divisions of source video blocks. It should be noted that some techniques described herein may be generally applicable to video coding, regardless of how source video data is partitioned prior to and/or during encoding. In the example illustrated in FIG. 11, video encoder 200 includes summer 202, transform coefficient generator 204, coefficient quantization unit 206, inverse quantization/transform processing unit 208, summer 210, intra prediction processing unit 212, inter prediction processing unit 214, filter unit 216, and entropy encoding unit 218.

As illustrated in FIG. 6, video encoder 200 receives source video blocks and outputs a bitstream. Video encoder 200 may generate residual data by subtracting a predictive video block from a source video block. Summer 202 represents a component configured to perform this subtraction operation. In one example, the subtraction of video blocks occurs in the pixel domain. Transform coefficient generator 204 applies a transform, such as a discrete cosine transform (DCT), a discrete sine transform (DST), or a conceptually similar transform, to the residual block or sub-divisions thereof (e.g., four 8×8 transforms may be applied to a 16×16 array of residual values) to produce a set of residual transform coefficients. Transform coefficient generator 204 may be configured to perform any and all combinations of the transforms included in the family of discrete trigonometric transforms. As described above, in ITU-T H.265, TBs are restricted to the following sizes 4×4, 8×8, 16×16, and 32×32. In one example, transform coefficient generator 204 may be configured to perform transformations according to arrays having sizes of 4×4, 8×8, 16×16, and 32×32. In one example, transform coefficient generator 204 may be further configured to perform transformations according to arrays having other dimensions. In particular, in some cases, it may be useful to perform transformations on rectangular arrays of difference values. In one example, transform coefficient generator 204 may be configured to perform transformations according to the following sizes of arrays: 2×2, 2×4N, 4M×2, and/or 4M×4N. In one example, a 2-dimensional (2D) M×N inverse transform may be implemented as 1-dimensional (1D) M-point inverse transform followed by a 1D N-point inverse transform. In one example, a 2D inverse transform may be implemented as a 1D N-point vertical transform followed by a 1D N-point horizontal transform. In one example, a 2D inverse transform may be implemented as a 1D N-point horizontal transform followed by a 1D N-point vertical transform. Transform coefficient generator 204 may output transform coefficients to coefficient quantization unit 206.

Coefficient quantization unit 206 may be configured to perform quantization of the transform coefficients. As described above, the degree of quantization may be modified by adjusting a quantization parameter. Coefficient quantization unit 206 may be further configured to determine quantization parameters and output QP data (e.g., data used to determine a quantization group size and/or delta QP values) that may be used by a video decoder to reconstruct a quantization parameter to perform inverse quantization during video decoding. It should be noted that in other examples, one or more additional or alternative parameters may be used to determine a level of quantization (e.g., scaling factors). The techniques described herein may be generally applicable to determining a level of quantization for transform coefficients corresponding to a component of video data based on a level of quantization for transform coefficients corresponding another component of video data.

Referring again to FIG. 11, quantized transform coefficients are output to inverse quantization/transform processing unit 208. Inverse quantization/transform processing unit 208 may be configured to apply an inverse quantization and an inverse transformation to generate reconstructed residual data. As illustrated in FIG. 11, at summer 210, reconstructed residual data may be added to a predictive video block. In this manner, an encoded video block may be reconstructed and the resulting reconstructed video block may be used to evaluate the encoding quality for a given prediction, transformation, and/or quantization. Video encoder 200 may be configured to perform multiple coding passes (e.g., perform encoding while varying one or more of a prediction, transformation parameters, and quantization parameters). The rate-distortion of a bitstream or other system parameters may be optimized based on evaluation of reconstructed video blocks. Further, reconstructed video blocks may be stored and used as reference for predicting subsequent blocks.

As described above, a video block may be coded using an intra prediction. Intra prediction processing unit 212 may be configured to select an intra prediction mode for a video block to be coded. Intra prediction processing unit 212 may be configured to evaluate a frame and/or an area thereof and determine an intra prediction mode to use to encode a current block. As illustrated in FIG. 6, intra prediction processing unit 212 outputs intra prediction data (e.g., syntax elements) to entropy encoding unit 218 and transform coefficient generator 204. As described above, a transform performed on residual data may be mode dependent. As described above, possible intra prediction modes may include planar prediction modes, DC prediction modes, and angular prediction modes. Further, in some examples, a prediction for a chroma component may be inferred from an intra prediction for a luma prediction mode. Inter prediction processing unit 214 may be configured to perform inter prediction coding for a current video block. Inter prediction processing unit 214 may be configured to receive source video blocks and calculate a motion vector for PUs of a video block. A motion vector may indicate the displacement of a PU (or similar coding structure) of a video block within a current video frame relative to a predictive block within a reference frame. Inter prediction coding may use one or more reference pictures. Further, motion prediction may be uni-predictive (use one motion vector) or bi-predictive (use two motion vectors). Inter prediction processing unit 214 may be configured to select a predictive block by calculating a pixel difference determined by, for example, sum of absolute difference (SAD), sum of square difference (SSD), or other difference metrics. As described above, a motion vector may be determined and specified according to motion vector prediction. Inter prediction processing unit 214 may be configured to perform motion vector prediction, as described above. Inter prediction processing unit 214 may be configured to generate a predictive block using the motion prediction data. For example, inter prediction processing unit 214 may locate a predictive video block within a frame buffer (not shown in FIG. 11). It should be noted that inter prediction processing unit 214 may further be configured to apply one or more interpolation filters to a reconstructed residual block to calculate sub-integer pixel values for use in motion estimation. Inter prediction processing unit 214 may output motion prediction data for a calculated motion vector to entropy encoding unit 218. As illustrated in FIG. 11, inter prediction processing unit 214 may receive reconstructed video block via filter unit 216. Entropy encoding unit 218 receives quantized transform coefficients and predictive syntax data (i.e., intra prediction data, motion prediction data. QP data, etc.). It should be noted that in some examples, coefficient quantization unit 206 may perform a scan of a matrix including quantized transform coefficients before the coefficients are output to entropy encoding unit 218. In other examples, entropy encoding unit 218 may perform a scan. Entropy encoding unit 218 may be configured to perform entropy encoding according to one or more of the techniques described herein. Entropy encoding unit 218 may be configured to output a compliant bitstream, i.e., a bitstream that a video decoder can receive and reproduce video data therefrom.

Referring again to FIG. 11, filter unit 216 may be configured to perform deblocking, Sample Adaptive Offset (SAO) filtering and/or ALF filtering as described above. As described above, the computation of gradients for determining blockiness in JVET-N1001 may be less than ideal. According to the techniques herein, filter unit 216 may be configured to compute gradients for determining blockiness where the number of chroma gradient computations is reduced compared to JVET-N1001 and where the selection of lines for gradient computation is aligned for luma and chroma, when luma and chroma have the same dimension in a direction.

In particular, in one example, according to the techniques herein, filter unit 216 may be configured to compute gradients for determining blockiness with respect to chroma as follows: when the number of chroma samples is half the number of luma samples in a direction, for each block edge, compute a gradient at a single line corresponding to the block edges, and when the number of chroma samples is the same as the number of luma samples, compute a gradient at each line corresponding to a line where a luma gradient is computed.

With respect to JVET-N1001, in one example, this example of computing gradients for determining blockiness with respect to chroma may be express as follows:

When SubWidthC is 2 only compute gradient for line 0 for horizontal chroma boundary deblocking
When SubHeightC is 2 only compute gradient for line 0 for vertical chroma boundary deblocking
When SubWidthC is 1 compute gradient for line 0 and line 3 for horizontal chroma boundary deblocking
When SubHeightC is 1 compute gradient for line 0 and line 3 for vertical chroma boundary deblocking Thus, according to the techniques herein, filter unit 216 may be configured to perform a decision process for a block edge based on the following:

This process is only invoked when ChromaArrayType is not equal to 0.

Inputs to this process are:

a chroma picture sample array recPicture, a chroma location (xCb, yCb) specifying the top-left sample of the current chroma coding block relative to the top-left chroma sample of the current picture, a chroma location (xB1, yB1) specifying the top-left sample of the current chroma block relative to the top-left sample of the current chroma coding block, a variable edgeType specifying whether a vertical (EDGE_VER) or a horizontal (EDGE_HOR) edge is filtered, a variable cQpPicOffset specifying the picture-level chroma quantization parameter offset, a variable bS specifying the boundary filtering strength, a variable maxFilterLengthCbCr.

Outputs of this process are the modified variable maxFilterLengthCbCr, the variable $t_C$.

The values $p_i$ and $q_i$ with i=0 . . . maxFilterLengthCbCr and k=0 . . . 3 are derived as follows:

If edgeType is equal to EDGE_VER, the following applies::

$$q_{i,k} = recPicture[xCb + xB1 + i][yCb + yB1 + k]$$
$$p_{i,k} = recPicture[xCb + xB1 - i - 1][yCb + yB1 + k]$$
$$subSampling = SubHeightC$$

Otherwise (edgeType is equal to EDGE_HOR), the following applies:

$$q_{i,k} = recPicture[xCb + xB1 + k][yCb + yB1 + i]$$
$$p_{i,k} = recPicture[xCb + xB1 + k][yCb + yB1 - i - 1]$$
$$subSampling = SubWidthC$$

The variables $Qp_Q$ and $Qp_P$ are set equal to the $Qp_Y$ values of the coding units which include the coding blocks containing the sample $q_{0,0}$ and $p_0$, respectively.

The variable $Qp_C$ is derived as follows:

If ChromaArrayType is equal to 1, the variable $Qp_C$: is determined as specified in Table 3 based on the index qPi derived as follows:

$$qPi = ((Qp_Q + Qp_P + 1) >> 1) + cQpPicOffset$$

Otherwise (ChromaArrayType is greater than 1), the variable $Qp_C$ is set equal to Min(qPi, 63).

NOTE—The variable cQpPicOffset provides an adjustment for the value of pps_cb_qp_offset or pps_cr_qp_offset, according to whether the filtered chroma component is the Cb or Cr component. However, to avoid the need to vary the amount of the adjustment within the picture, the filtering process does not include an adjustment for the value of slice_cb_qp_offset or slice_cr_qp_offset.

The value of the variable β' is determined as specified in the Table illustrated in FIG. 6 based on the quantization parameter Q derived as follows:

$$Q = Clip3(0, 63, Qp_C + (slice\_beta\_offset\_div2 << 1))$$

where slice_beta_offset_div2 is the value of the syntax element
slice_beta_offset_div2 for the slice that contains sample $q_{0,0}$.
The variable β is derived as follows:

$$\beta = \beta' * (1 << (BitDepth_C - 8))$$

The value of the variable $t_C'$ is determined as specified in the Table illustrated in FIG. 6 based on the chroma quantization parameter Q derived as follows:

$$Q = Clip3(0, 65, Qp_C + 2*(bS-1) + (slice\_tc\_offset\_div2 << 1))$$

where slice_tc_offset_div2 is the value of the syntax element slice_tc_offset_div2 for the slice that contains sample $q_{0,0}$.
The variable $t_C$ is derived as follows:

$$t_C = t_C' * (1 (<< BitDepth)_C - 8))$$

When maxFilterLengthCbCr is equal to 1 and bS is not equal to 2, maxFilterLengthCbCr is set equal to 0.

When maxFilterLengthCbCr is equal to 3, the following ordered steps apply:
1. The variables dpq0, dpq3, dp, dq and d are derived as follows:

$$dp0 = Abs(p_{2,0} - 2*p_{1,0} + p_{0,0})$$
$$dp3 = (subSampling == 2)?dp0 : Abs(p_{2,3} - 2*p_{1,3} + p_{0,3})$$
$$dq0 = Abs(q_{2,0} - 2*q_{1,0} + q_{0,0})$$
$$dq3 = (subSampling == 2)?dq0 : Abs(q_{2,3} - 2*q_{1,3} + q_{0,3})$$
$$dpq0 = dp0 + dq0$$
$$dpq3 = dp3 + dq3$$
$$dp = dp0 + dp3$$
$$dq = dq0 + dq3$$
$$d = dpq0 + dpq3$$

In one example, dp3 and dq3 may be respectively computed as follows:

$$dp3 = (subSampling == 2)?Abs(p_{2,1} - 2*p_{1,1} + p_{0,1}) : Abs(p_{2,3} - 2*p_{1,3} + p_{0,3})$$

$$dq3 = (subSampling == 2)?Abs(q_{2,1} - 2*q_{1,1} + q_{0,1}) : Abs(q_{2,3} - 2*q_{1,3} + q_{0,3})$$

2. The variables dSam0 and dSam3 are both set equal to 0.
3. When d is less than 0, the following ordered steps apply:
   a. The variable dpq is set equal to 2*dpq0.
   b. The variable dSam0 is derived by invoking the decision process for a chroma sample as specified above for the sample location (xCb+xBl, yCb+yBl) with sample values $p_{0,0}$, $p_{3,0}$, $q_{0,0}$, and $q_{3,0}$, the variables dpq, β and $t_C$ as inputs, and the output is assigned to the decision dSam0.
   c. The variable dpq is set equal to 2*dpq3.
   d. The variable dSam3 is modified as follows:
   The variable n3 is derived as follows:

$$n3 = (subSampling == 2)?1:3$$

If edgeType is equal to EDGE_VER, for the sample location (xCb+xBl, yCb+yBl+n3), the decision process for a chroma sample as specified above invoked with sample values $p_{0,n3}$, $p_{3,n3}$, $q_{0,q3}$, and $q_{3,n3}$, the variables dpq, β and $t_C$ as inputs, and the output is assigned to the decision dSam3.
   Otherwise (edgeType is equal to EDGE_HOR), f or the sample location (xCb+xBl+n3, yCb+yBl), the decision process for a chroma sample as specified above is invoked with sample values $p_{0,n3}$, $p_{3,n3}$, $q_{0,n3}$, and $q_{3,n3}$, the variables dpq, β and $t_C$ as inputs, and the output is assigned to the decision dSam3.
4. The variable maxFilterLengthCbCr is modified as follows:
   If dSam0 is equal to 1 and dSam3 is equal to 1, maxFilterLengthCbCr is set equal to 3.
   Otherwise, maxFilterLengthCbCr is set equal to 1.

It should be noted that in the above process, the phrase "The variables $Qp_Q$ and $Qp_P$ are set equal to the $Qp_Y$ values of the coding units which include the coding blocks containing the sample $q_{0,0}$ and $p_{0,0}$, respectively." may be ambiguous. That is, in cases where dual trees are used for partitioning (i.e., DUAL_TREE_CHROMA in JVET-N1001) samples $q_{0,0}$ and $p_{0,0}$, belong to a chroma-only coding unit. As a result, no corresponding value is defined for $Qp_Y$, in these cases.

In one example, according to the techniques herein, a luma location corresponding to samples $q_{0,0}$ and $p_{0,0}$ may be used for predictor derivation. That is, in one example, according to the techniques herein, in the process above, the phrase "The variables $Qp_Q$ and $Qp_P$ are set equal to the $Qp_Y$ values of the coding units which include the coding blocks containing the sample $q_{0,0}$ and $p_{0,0}$, respectively."

May be replaced with the following:
"When treeType is equal to DUAL_TREE_CHROMA, the variables $Qp_Q$ and $Qp_P$ are derived using the following ordered steps:
The variables (xQ, yQ) and (xP, yP) are set equal to chroma locations for samples $q_{0,0}$ and $p_{0,0}$ The variables $Qp_Q$ and $Qp_P$ are set equal to the $Qp_Y$ values at luma locations (xQ*SubWidthC, yQ*SubHeightC) and (xP*SubWidthC, yP*SubHeightC), respectively Otherwise, the variables $Qp_Q$ and $Qp_P$ are set equal to the $Qp_Y$ values of the coding units which include the coding blocks containing the sample $q_{0,0}$ and $p_{0,0}$."

Further, in one example, according to the techniques herein, luma location corresponding to center of chroma coding block of $q_{0,0}$ and $p_{0,0}$ may be used for predictor derivation. That is, in one example, according to the techniques herein, in the process above, the phrase "The variables $Qp_Q$ and $Qp_P$ are set equal to the $Qp_Y$ values of the coding units which include the coding blocks containing the sample $q_{0,0}$ and $p_{0,0}$, respectively."

May be replaced with the following:

"When treeType is equal to DUAL_TREE_CHROMA, the variables $Qp_Q$ and $Qp_P$ are derived using the following ordered steps:

The variables (xQ, yQ) and (xP, yP) are set equal to top-left samples chroma locations of coding block for samples $q_{0,0}$ and $p_{0,0}$ respectively The variables (cbWidthQ, cbHeightQ) are set equal to coding block width and coding block height in chroma samples, respectively, of the coding block of sample $q_{0,0}$ The variables (cbWidthP, cbHeightP) are set equal to coding block width and coding block height in chroma samples, respectively, of the coding block of sample $p_{0,0}$ The variables $Qp_Q$ and $Qp_P$ are set equal to the $Qp_Y$ values of coding unit that covers the luma locations $$((xQ + cbWidthQ/2) * SubWidthC, (yQ + cbHeightQ/2) * SubHeightC) \text{ and}$$
$$((xP + cbWidthP/2) * SubWidthC, (yP + cbHeightP/2) * SubHeightC),$$

respectively.

Otherwise, the variables $Qp_Q$ and $Qp_P$ are set equal to the $Qp_Y$ values of the coding units which include the coding blocks containing the sample $q_{0,0}$ and $p_{0,0}$."

Further, in one example, according to the techniques herein, luma location corresponding to center of chroma coding block of $q_{0,0}$ and $p_{0,0}$ may be used for predictor derivation, with the computation units being luma samples. That is, in one example, according to the techniques herein, in the process above, the phrase "The variables $Qp_Q$ and $Qp_P$ are set equal to the $Qp_Y$ values of the coding units which include the coding blocks containing the sample $q_{0,0}$ and $p_{0,0}$, respectively."

May be replaced with the following:

"When treeType is equal to DUAL_TREE_CHROMA, the variables $Qp_Q$ and $Qp_P$ are derived using the following ordered steps:

The variables (xQ, yQ) and (xP, yP) are set equal to top-left samples luma locations of coding block for samples $q_{0,0}$ and $p_{0,0}$ respectively The variables (cbWidthQ, cbHeightQ) are set equal to coding block width and coding block height in luma samples, respectively, of the coding block of sample $q_{0,0}$ The variables (cbWidthP, cbHeightP) are set equal to coding block width and coding block height in luma samples, respectively, of the coding block of sample $p_{0,0}$ The variables $Qp_Q$ and $Qp_P$ are set equal to the $Qp_Y$ values of coding unit that covers the luma locations (xQ+cbWidthQ/2, yQ+cbHeightQ/2) and (xP+cbWidthP/2, yP+cbHeightP/2), respectively.

Otherwise, the variables $Qp_Q$ and $Qp_P$ are set equal to the $Qp_Y$ values of the coding units which include the coding blocks containing the sample $q_{0,0}$ and $p_{0,0}$."

Figure 12A:
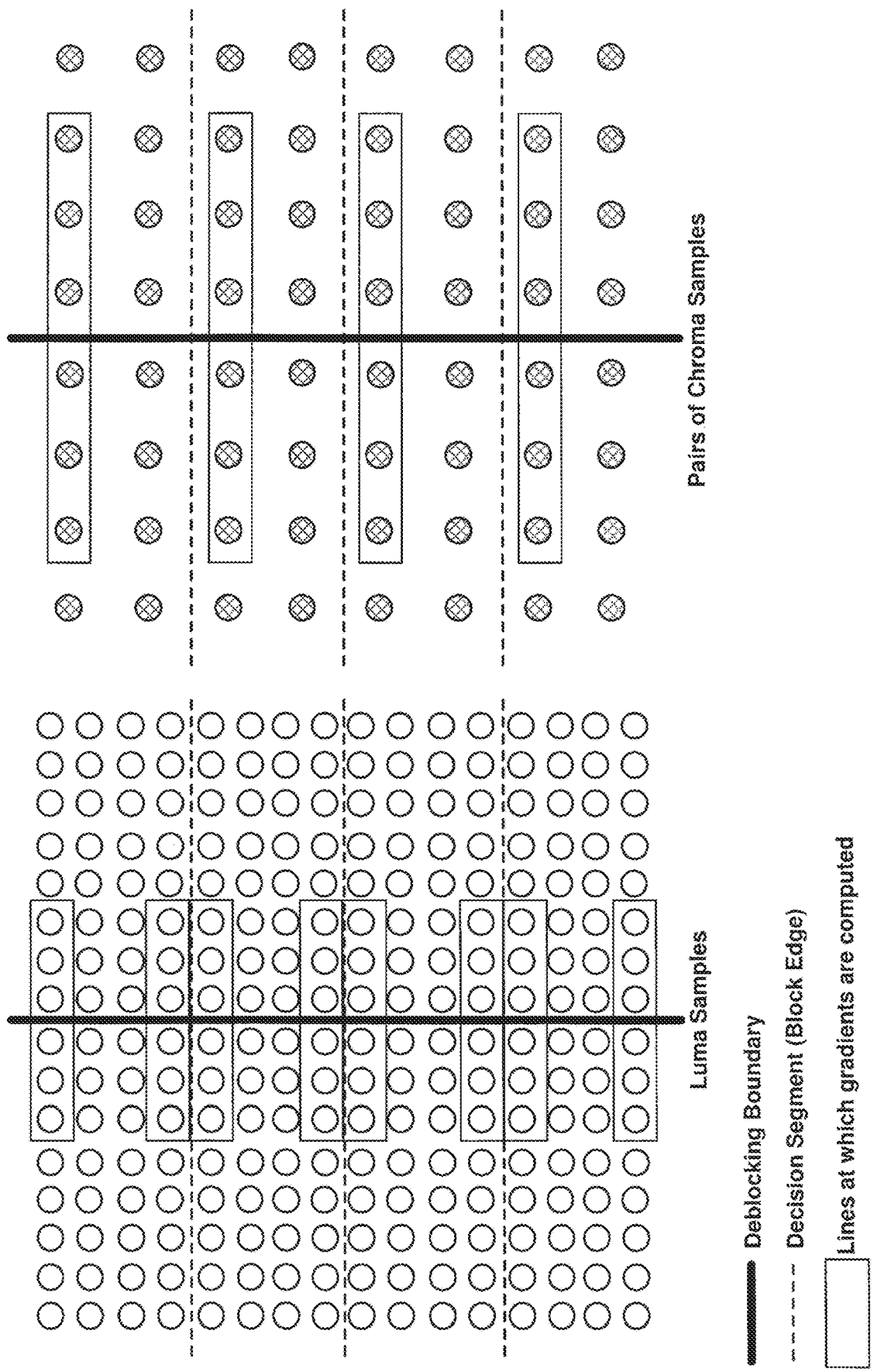
FIG. 12A is a conceptual diagram illustrating an example of a video component sampling format and corresponding deblocking decision processes according to one or more techniques of this disclosure.
Figure 12B:
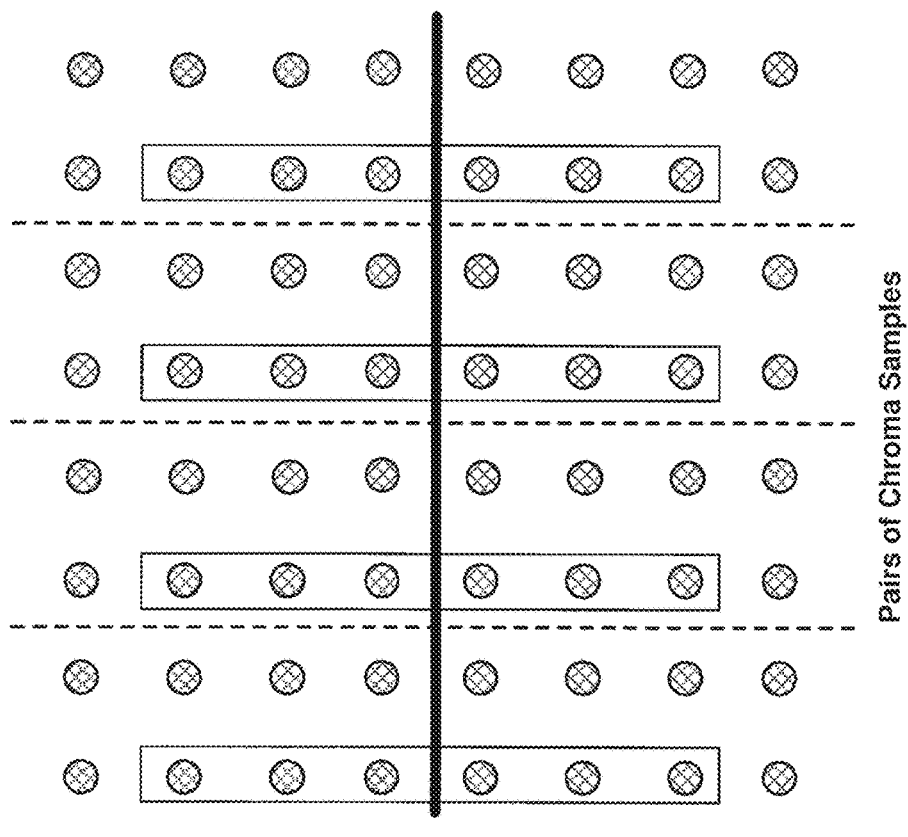
FIG. 12B is a conceptual diagram illustrating an example of a video component sampling format and corresponding deblocking decision processes according to one or more techniques of this disclosure.
Figure 12B:
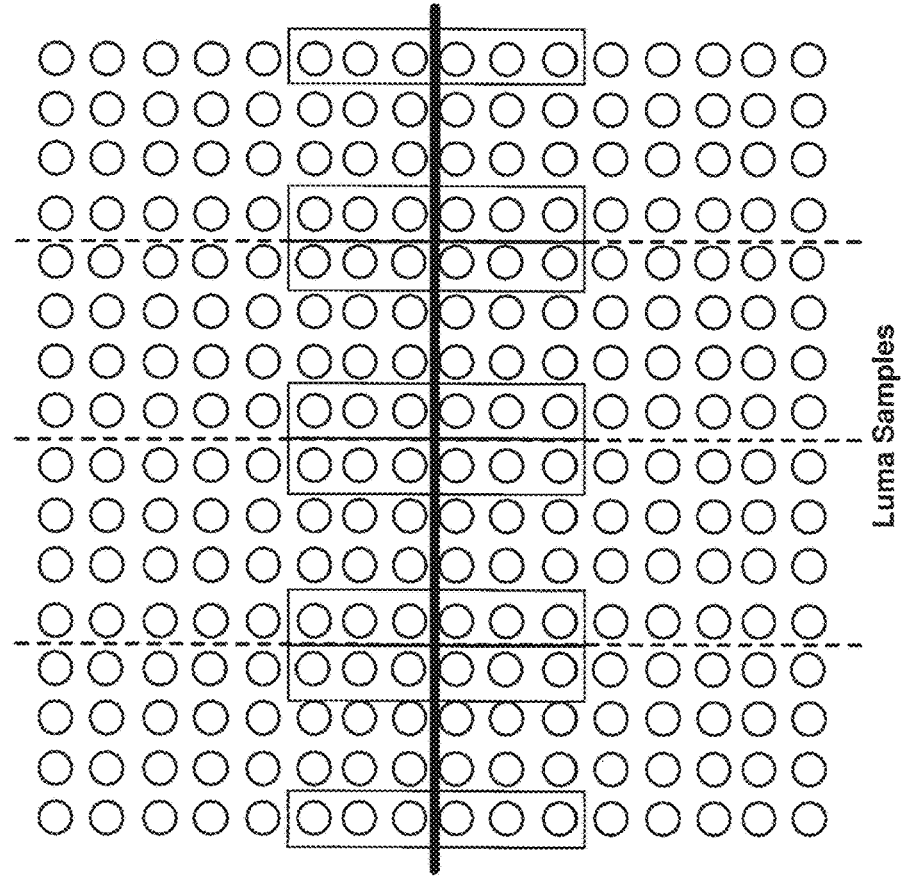
Figure 13A:
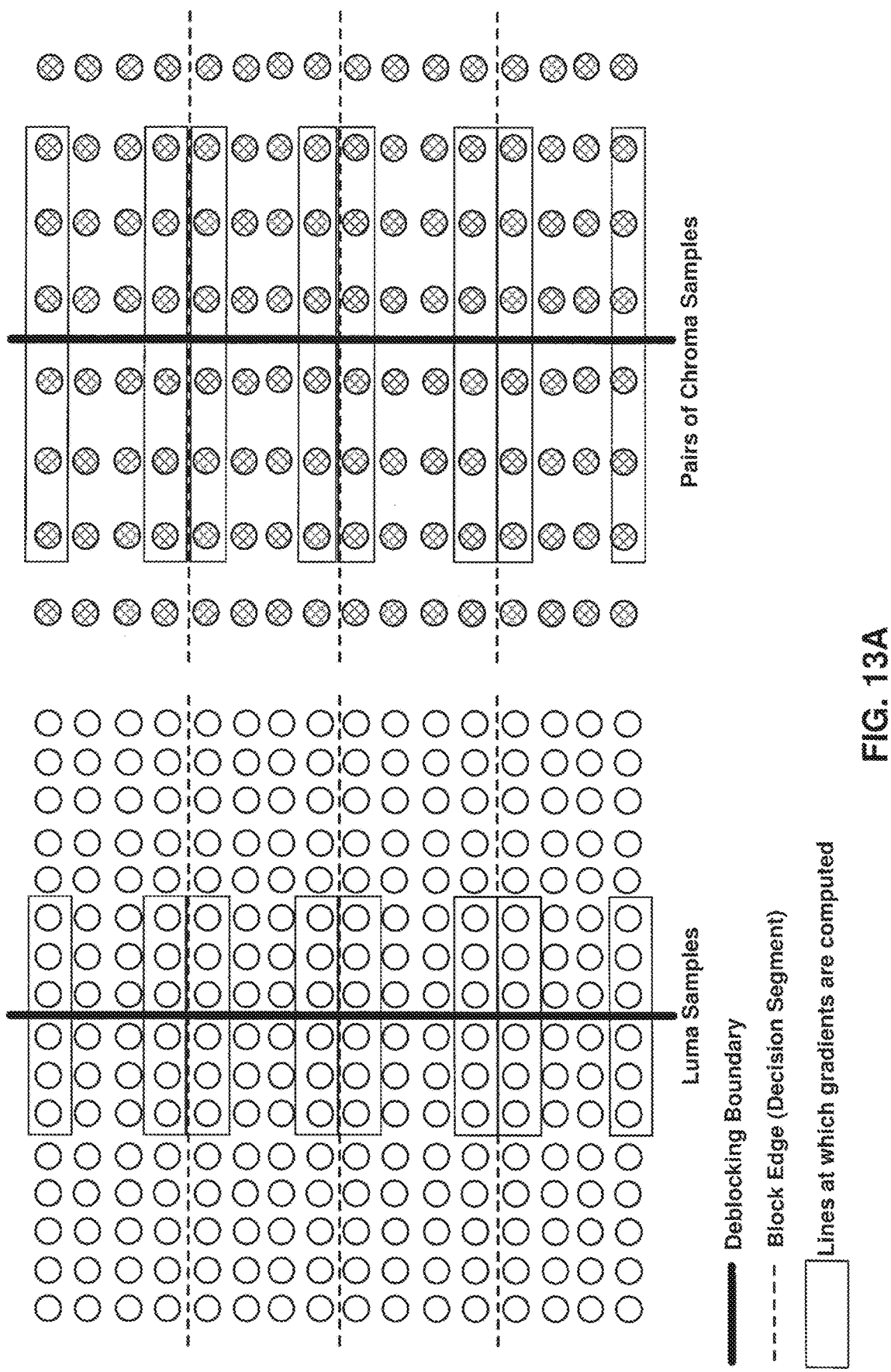
FIG. 13A is a conceptual diagram illustrating an example of a video component sampling format and corresponding deblocking decision processes according to one or more techniques of this disclosure.
Figure 13B:
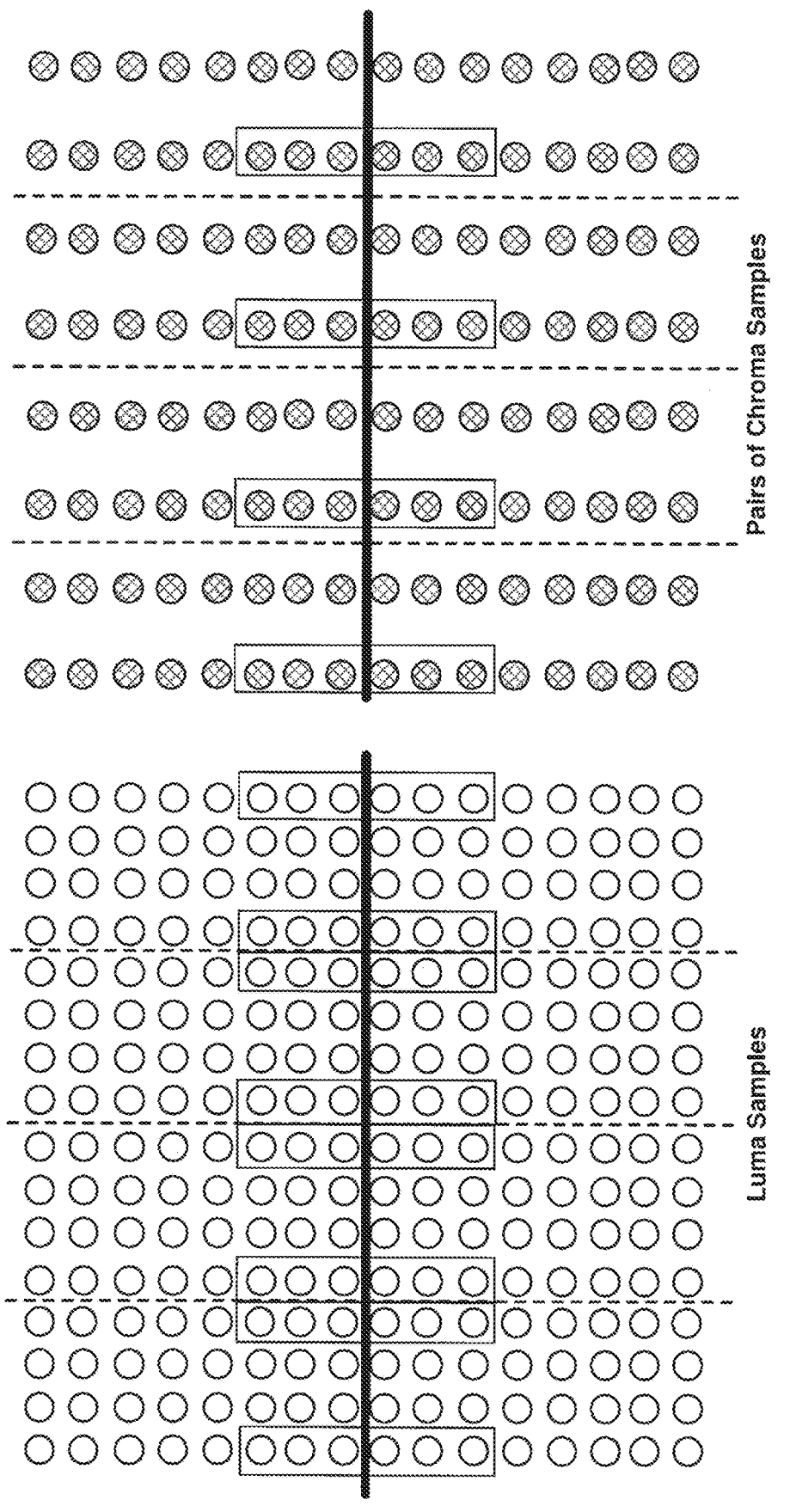
FIG. 13B is a conceptual diagram illustrating an example of a video component sampling format and corresponding deblocking decision processes according to one or more techniques of this disclosure.
Figure 14A:
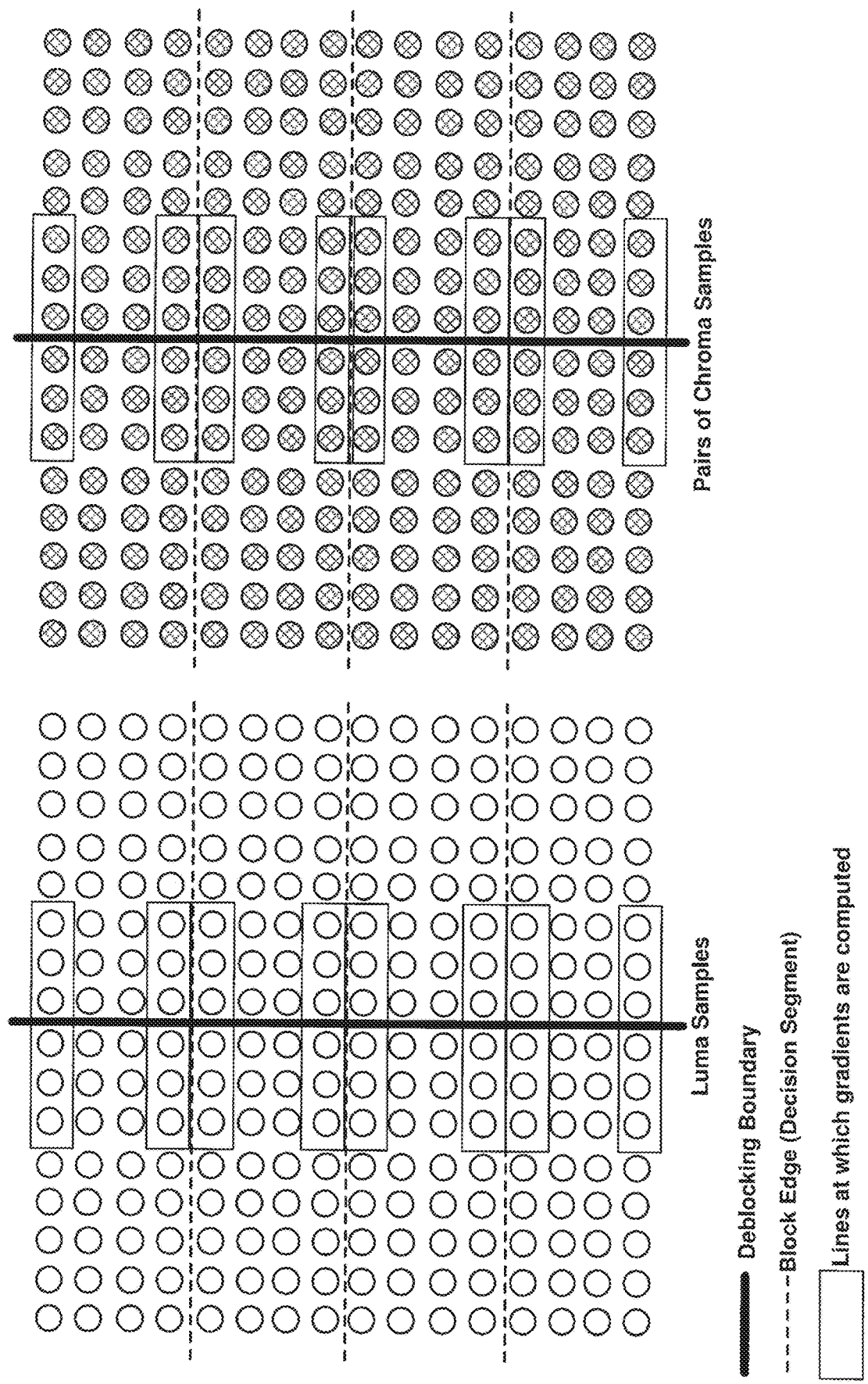
FIG. 14A is a conceptual diagram illustrating an example of a video component sampling format and corresponding deblocking decision processes according to one or more techniques of this disclosure.
Figure 14B:
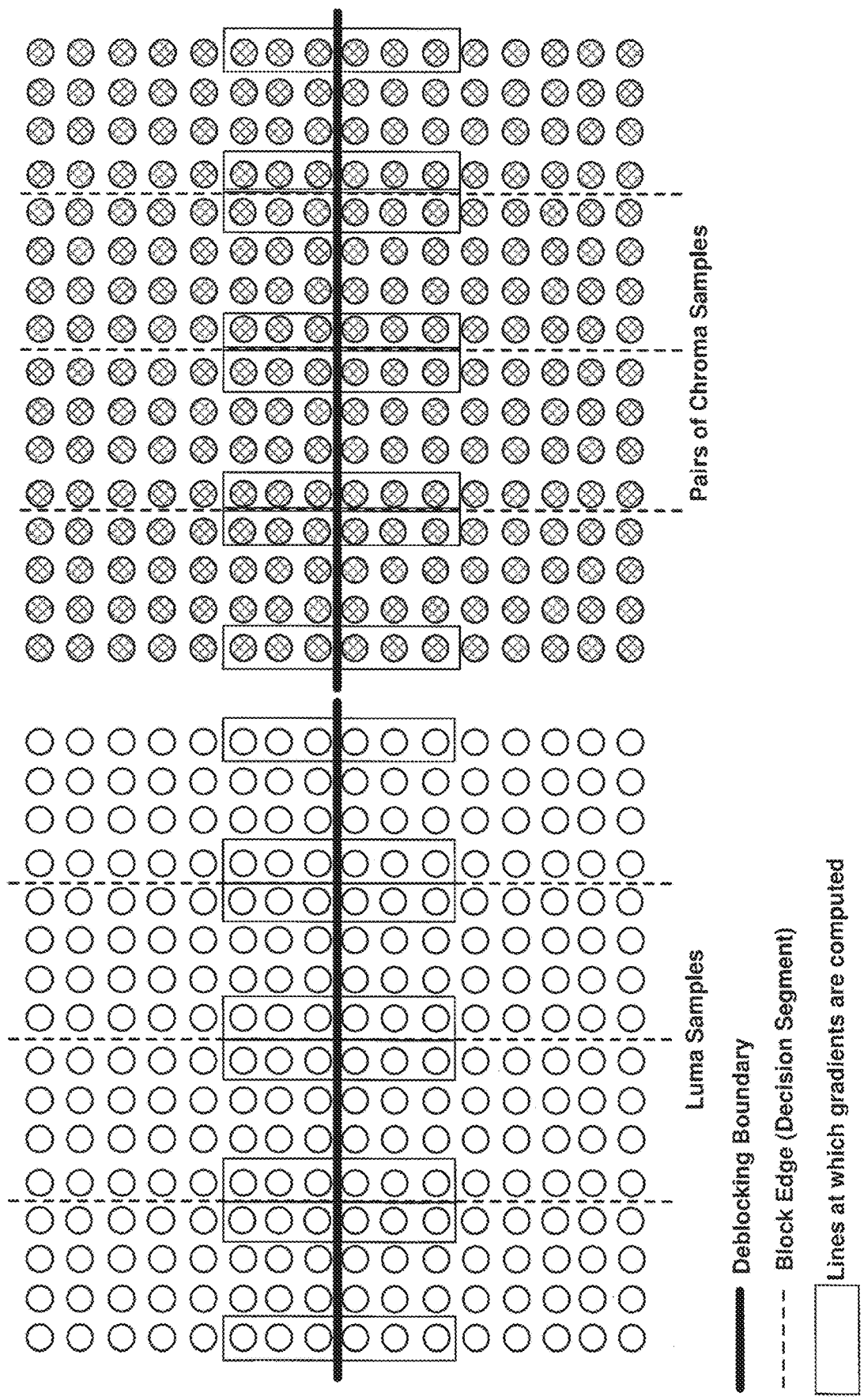
FIG. 14B is a conceptual diagram illustrating an example of a video component sampling format and corresponding deblocking decision processes according to one or more techniques of this disclosure.

FIGS. 12A-12C, FIGS. 13A-13C, and FIGS. 14A-14C are conceptual diagrams that illustrate lines at which samples therefrom are used to compute gradients according to the techniques herein, i.e., lines at which gradients are computed for determining blockiness. FIGS. 12A-12C illustrate lines at which gradients are computed for the 4:2:0 chroma formal. FIGS. 13A-13C illustrate lines at which gradients are computed for the 4:2:2 chroma format. FIGS. 14A-14C illustrate lines at which gradients are computed for the 4:4:4 chroma format.

"Versatile Video Coding (Draft 6)," 15th Meeting of ISO/IEC JTC1/SC29/WG11 3-12 Jul. 2019, Gothenburg, SE, document JVET-O2001-vE, which is incorporated by reference herein, and referred to as JVET-O2001, represents the current iteration of the draft text of a video coding specification corresponding to the VVC project. In JVET-O2001, determining candidate boundaries for deblocking may be performed using the following approach:

Mark CU boundaries on a 4×4 grid as candidates for deblocking

Mark coding sub-blocks on an 8×8 grid within their CU as candidates for deblocking.

Mark transform boundaries as candidates for deblocking

It should be noted that sub-blocks on an 8×8 grid within their CU may correspond to boundaries resulting from affine or ATMVP modes. Such sub-blocks, in some cases, may be referred to as motion boundaries. Determining candidate boundaries for de-blocking in this manner is less than ideal. In particular, there is a design inconsistency for CUs that use coding sub-blocks and transform sub-blocks. Specifically, the transform sub-blocks may create boundaries that are not on a 8×8 grid, but that are on the 4×4 grid. In this case, the process in JVET-O2001 would cause a decoder to consider deblocking motion boundaries within a CU on an 8×8 grid and also consider deblocking the transform boundaries within the CU on the 4×4 grid. This requires additional computational logic and increases complexity. It also creates some unexpected design inconsistency.

According to the techniques herein, the deblocking inconsistences are resolved by limiting how a CU may utilize coding sub-blocks and transform sub-blocks. In one example, a CU is not allowed to have transform sub-blocks that create a transform boundary on the 4×4 grid, when coding sub-blocks are present. Such a condition can be realized by not allowing a transform sub-block of one quarter size when the CU dimension is equal to 16 samples or smaller. A CU dimension, in this case may refer to a corresponding width or height of a corresponding block structure, e.g., an sub-block width or height, a CB width or height, etc. Table 4 illustrates an example of relevant CU syntax, according to the techniques herein, that does not allow a transform sub-block of one quarter size to occur when the CU dimension is equal to 16 samples or smaller.

TABLE 4

| | Descriptor |
|---|---|
| coding_unit( x0, y0, cbWidth, cbHeight, cqtDepth, treeType, modeType ) { | |
| ... | |
|   cu_cbf | ae(v) |
|   if( cu_cbf ) { | |
|     if( CuPredMode[ chType ][ x0 ][ y0 ] == MODE_INTER && sps_sbt_enabled_flag | |
|       && !ciip_flag[ x0 ][ y0 ] && !MergeTriangleFlag[ x0 ][ y0 ] ) { | |
|       if( cbWidth <= MaxSbtSize && cbHeight <= MaxSbtSize ) { | |
|         allowSbtVerH = cbWidth >= 8 | |
|         allowSbtVerQ = cbWidth > 16 | |
|         allowSbtHorH = cbHeight >= 8 | |
|         allowSbtHorQ = cbHeight > 16 | |
|         if( allowSbtVerH \|\| allowSbtHorH \|\| allowSbtVerQ \|\| allowSbtHorQ ) | |
|           cu_sbt_flag | ae(v) |
|       } | |
|       if( cu_sbt_flag ) { | |
|         if( ( allowSbtVerH \|\| allowSbtHorH ) && ( allowSbtVerQ \|\| allowSbtHorQ) ) | |
|           cu_sbt_quad_flag | ae(v) |
|         if( ( cu_sbt_quad_flag && allowSbtVerQ && allowSbtHorQ ) \|\| | |
|           ( !cu_sbt_quad_flag && allowSbtVerH && allowSbtHorH ) ) | |
|           cu_sbt_horizontal_flag | ae(v) |
|         cu_sbt_pos_flag | ae(v) |
|       } | |
|     } | |
|   ... | |
| } | |

With respect to Table 4 the semantics of the illustrated syntax elements may be based on the following:

cu_cbf equal to 1 specifies that the transform_tree( ) syntax structure is present for the current coding unit. cu_cbf equal to 0 specifies that the transform tree( ) syntax structure is not present for the current coding unit.

When cu_cbf is not present, it is inferred as follows:

If cu_skip_flag[x0][y0] is equal to 1 or pred_modeplt_flag is equal to 1, cu_cbf is inferred to be equal to 0.

Otherwise, cu_cbf is inferred to be equal to 1.

cu_sbt_flag equal to 1 specifies that for the current coding unit, subblock transform is used. cu_sbt_flag equal to 0 specifies that for the current coding unit, subblock transform is not used.

When cu_sbt_flag is not present, its value is inferred to be equal to 0.

NOTE—: When subblock transform is used, a coding unit is split into two transform units; one transform unit has residual data, the other does not have residual data.

cu_sbt_quad_flag equal to 1 specifies that for the current coding unit, the subblock transform includes a transform unit of ¼ size of the current coding unit. cu_sbt_quad_flag equal to 0 specifies that for the current coding unit the subblock transform includes a transform unit of ½ size of the current coding unit.

When cu_sbt_quad flag is not present, its value is inferred to be equal to 0.

cu_sbt_horizontal_flag equal to 1 specifies that the current coding unit is split horizontally into 2 transform units. cu_sbt_horizontal_flag[x0][y0] equal to 0 specifies that the current coding unit is split vertically into 2 transform units.

When cu_sbt_horizontal_flag is not present, its value is derived as follows:

If cu_sbt_quad_flag is equal to 1, cu_sbt_horizontal_flag is set to be equal to allowSbtHotQ.

Otherwise (cu_sbt_quad_flag is equal to 0), cu_sbt_horizontal_flag is set to be equal to allowSbtHorH.

cu_sbt_pos_flag equal to 1 specifies that the tu_cbf_luma, tu_cbf_cb and tu_cbf_cr of the first transform unit in the current coding unit are not present in the bitstream. cu_sbt_pos_flag equal to 0 specifies that the tu_cbf_luma, tu_cbf_cb and tu_cbf_cr of the second transform unit in the current coding unit are not present in the bitstream.

The variable SbtNumFourthsTb0 is derived as follows:

$$sbtMinNumFourths = \text{cu\_sbt\_quad\_flag} ? 1 : 2$$

$$SbtNumFourthsTb0 = \text{cu\_sbt\_pos\_flag} ? (4 - sbtMinNumFourths) : sbtMinNumFourths$$

Further, clip_flag may be included in a merge_data syntax structure of a CU and have the following semantics:

ciip_flag[x0][y0] specifies whether the combined inter-picture merge and intra-picture prediction is applied for the current coding unit. The array indices x0, y0 specify the location (x0, y0) of the top-left luma sample of the considered coding block relative to the top-left luma sample of the picture.

When ciip_flag[x0][y0] is not present, it is inferred as follows:

If all the following conditions are true, clip_flag[x0][y0] is inferred to be equal to 1:
sps_ciip_enabled_flag is equal to 1.
general_merge_flag[x0][y0] is equal to 1.
merge_subblock_flag[x0][y0] is equal to 0.
regular merge_flag[x0][y0] is equal to 0.
cbWidth is less than 128.
cbHeight is less than 128.
cbWidth*cbHeight is greater than or equal to 64.

Otherwise, ciip_flag[x0][0] is inferred to be equal to 0.

When ciip_flag[x0][y0] is equal to 1, the variable IntraPredModeY[x][y] with x=x0 . . . x0+cbWidth−1 and y=y0 . . . y0+cbHeight−1 is set to be equal to INTRA_PLANAR.

The variable MergeTriangleFlag[x0][y0], which specifies whether triangular shape based motion compensation is used to generate the prediction samples of the current coding unit, when decoding a B slice, is derived as follows:
  If all the following conditions are true, MergeTriangleFlag[x0][y0] is set equal to 1:
    sps_triangle_enabled_flag is equal to 1.
    slice_type is equal to B.
    general_merge_flag[x0][y0] is equal to 1.
    MaxNumTriangleMergcCand is greater than or equal to 2.
    cbWidth*cbHeight is greater than or equal to 64.
    regular_merge_flag[x0][y0] is equal to 0.
    merge_subblock_flag[x0][y0] is equal to 0.
    ciip_flag[x0][y0] is equal to 0.
  Otherwise, MergeTriangleFlag[x0][y0] is set equal to 0.
Further,
Variable cbWidth is the width of the current coding block;
Variable cbHeight is the height of the current coding block; and
Variable MaxSbtSize is the maximum sub-block size
Further, sps_sbtmvp_enabled_flag, sps_affine_enabled_flag, sps_sbt_enabled_flag, sps_sbt_max_size_64_flag and sps_max_luma_transform_size_64_flag are in the SPS and have the following semantics:
  sps sbtmvp enabled_flag equal to 1 specifies that subblock-based temporal motion vector predictors may be used in decoding of pictures with all slices having slice_type not equal to I in the CVS. sps_sbtmvp_enabled_flag equal to 0 specifies that subblock-based temporal motion vector predictors are not used in the CVS. When sps sbtmvp_enabled_flag is not present, it is inferred to be equal to 0.
  sps_affine_enabled_flag specifies whether affine model based motion compensation can be used for inter prediction. If sps_affine_enabled_flag is equal to 0, the syntax shall be constrained such that no affine model based motion compensation is used in the CVS, and inter affine flag and cu_affine_type_flag are not present in coding unit syntax of the CVS. Otherwise (sps affine enabled_flag is equal to 1), affine model based motion compensation can be used in the CVS.
  sps_sbt_enabled_flag equal to 0 specifies that subblock transform for inter-predicted CUs is disabled. sps_sbt_enabled_flag equal to 1 specifies that subblock transform for inter-predicted CU is enabled.
  sps_sbt_max_size_64_flag equal to 0 specifies that the maximum CU width and height for allowing subblock transform is 32 luma samples. sps_sbt_max_size_64_flag equal to 1 specifies that the maximum CU width and height for allowing subblock transform is 64 luma samples.

$$MaxSbtSize = \operatorname{Min}(MaxTbSizeY, \text{sps\_sbt\_max\_size\_64\_flag}?64:32),$$

sps_max_luma_transform_size_64_flag equal to 1 specifies that the maximum transform size in luma samples is equal to 64. sps_max_luma_transform_size_64_flag equal to 0 specifies that the maximum transform size in luma samples is equal to 32.
  When CtbSizeY is less than 64, the value of sps_max_luma_transform_size_64_flag shall be equal to 0.
  The variables MinTb Log 2SizeY, MaxTb Log 2SizeY, MinThSizeY, and MaxTbSizeY are derived as follows:

$$MinTbLog2SizeY = 2$$

$$MaxTbLog2SizeY = \text{sps\_max\_luma\_transform\_size\_64\_flag}?6{:}5$$

$$MinTbSizeY = 1 \ll MinTbLog2SizeY$$

$$MaxTbSizeY = 1 \ll MaxTbLog2SizeY$$

Table 5 illustrates an example of relevant CU syntax, according to the techniques herein, that does not allow a transform sub-block of one quarter size to occur when the CU dimension is greater equal to 16 samples or smaller when coding sub-blocks may be present.

TABLE 5

| | Descriptor |
|---|---|
| coding_unit( x0, y0, cbWidth, cbHeight, cqtDepth, treeType, modeType ) { | |
| ... | |
|   cu_cbf | ae(v) |
|   if( cu_cbf ) { | |
|     if( CuPredMode[ chType ][ x0 ][ y0 ] == MODE_INTER && sps_sbt_enabled_flag | |
|       && !ciip_flag[ x0 ][ y0 ] && !MergeTriangleFlag[ x0 ][ y0 ] ) { | |
|       if( cbWidth <= MaxSbtSize && cbHeight <= MaxSbtSize ) { | |
|         allowSbtVerH = cbWidth >= 8 | |
|         allowSbtVerQ = cbWidth >= ( (sps_sbtmvp_enabled_flag \|\| sps_affine_enabled_flag) ? 32: 16 ) ) | |
|         allowSbtHorH = cbHeight >= 8 | |
|         allowSbtHorQ = cbHeight >= ( (sps_sbtmvp_enabled_flag \|\| sps_affine_enabled_flag) ? 32: 16 ) ) | |
|         if( allowSbtVerH \|\| allowSbtHorH \|\| allowSbtVerQ \|\| allowSbtHorQ ) | |
|           cu_sbt_flag | ae(v) |
|       } | |
|       if( cu_sbt_flag ) { | |
|         if( ( allowSbtVerH \|\| allowSbtHorH ) && ( allowSbtVerQ \|\| allowSbtHorQ) ) | |
|           cu_sbt_quad_flag | ae(v) |
|         if( ( cu_sbt_quad_flag && allowSbtVerQ && allowSbtHorQ ) \|\| | |

TABLE 5-continued

| | Descriptor |
|---|---|
| ( !cu_sbt_quad_flag && allowSbtVerH && allowSbtHorH ) )<br>  cu_sbt_horizontal_flag | ae(v) |
| cu_sbt_pos_flag | ae(v) |
| }<br>  }<br>...<br>} | |

With respect to Table 5 the semantics of the illustrated syntax elements may be based on those provided above with respect to Table 4.

It should be noted that CU syntax includes syntax element inter_affine_flag having the following semantics:

inter_affine_flag[x0][y0] equal to 1 specifies that for the current coding unit, when decoding a P or B slice, affine model based motion compensation is used to generate the prediction samples of the current coding unit. inter_affine_flag[x0][y0] equal to 0 specifies that the coding unit is not predicted by affine model based motion compensation. When inter_affine_flag[x0][y0] is not present, it is inferred to be equal to 0.

In one example, sps_affine_enabled_flag in Table 5 may be replaced with inter_affine_flag.

It should be noted that CU syntax includes syntax element merge_subblock_flag having the following semantics:

merge subblock flag[x0][y0] specifies whether the subblock-based inter prediction parameters for the current coding unit are inferred from neighbouring blocks. The array indices x0, y0 specify the location (x0, y0) of the top-left luma sample of the considered coding block relative to the top-left luma sample of the picture. When merge_subblock_flag[x0][y0] is not present, it is inferred to be equal to 0.

In one example, sps_sbtmvp_enabled_flag in Table 5 may be replaced with merge_subblock_flag.

In one example, according to the techniques herein, anytime it is possible for a coding block to have associated motion vectors stored at subblock level, then there may be a limitation on whether subblock transforms can be used on that coding subblock. In one example, the limitation may be based on block size. For example, in one example, if it is possible for a coding block to have associated motion vectors stored at subblock level and a coding block dimension is less than (or greater than) a threshold value, then subblock transforms may be disabled. It should be noted that such a limitation is based on how data is stored and the corresponding prediction process may actually operate in a different manner, e.g., at a sample level.

As described above, a variable, bS, specifies the boundary filtering strength. As further described above, a boundary strength determination may be used to determine whether to skip computations for a particular block e.g., with respect to determining the blockiness of a particular block (i.e., based on a computed gradient). In general, the boundary filtering strength is used in JVET-O2001 to determine if/how to apply deblocking. JVET-O2001 provides the following with respect to determining a variable bS specifying the boundary filtering strength:

Inputs to this process are:
    a picture sample array recPicture,
    a location (xCb, yCb) specifying the top-left sample of the current coding block relative to the top-left sample of the current picture,
    a variable nCbW specifying the width of the current coding block,
    a variable nCbH specifying the height of the current coding block,
    a variable edgeType specifying whether a vertical (EDGE_VER) or a horizontal (EDGE_HOR) edge is filtered,
    a variable cIdx specifying the colour component of the current coding block,
    a two-dimensional (nCbW)×(nCbH) array edgeFlags.

Output of this process is a two-dimensional (nCbW)×(nCbH) array bS specifying the boundary filtering strength.

The variables $xD_i$, $yD_j$, xN and yN are derived as follows:
The variable gridSize is set as follows:

$$gridSize = cIdx == 0\,?\,4:8$$

If edgeType is equal to EDGE_VER, $$xD_i = (i * gridSize)$$
$$yD_j = cIdx == 0\,?\,(j \ll 2):(j \ll 1)$$
$$xN \text{ is set equal to } \text{Max}(0, (nCbW/gridSize) - 1)$$
$$yN = cIdx == 0\,?\,(nCbH/4) - 1:(nCbH/2) - 1$$

Otherwise (edgeType is equal to EDGE_HOR), $$xD_i = cIdx == 0\,?\,(i \ll 2):(i \ll 1)$$
$$yD_j = (j * gridSize)$$
$$xN = cIdx == 0\,?\,(nCbW/4) - 1:(nCbW/2) - 1$$
$$yN = \text{Max}(0, (nCbH/gridSize) - 1)$$

For $xD_i$ with i=0 . . . xN and $yD_j$ with j=0 . . . yN, the following applies:
    If edgeFlags[$xD_i$][$yD_j$] is equal to 0, the variable bS[$xD_i$][$yD_j$] is set equal to 0.
    Otherwise, the following applies:
        The sample values $p_0$ and $q_0$ are derived as follows:
            If edgeType is equal to EDGE_VER, $p_0$ is set equal to recPicture[xCb+$xD_i$−1][yCb+$yD_j$] and $q_0$ is set equal to recPicture[xCb+$xD_i$][yCb+$yD_j$].
            Otherwise (edgeType is equal to EDGE_HOR), $p_0$ is set equal to recPicture[xCb+$xD_i$][yCb+$yD_j$−1] and $q_0$ is set equal to recPicture[xCb+$xD_i$][yCb+$yD_j$].
        The variable bS[$xD_i$][$yD_j$] is derived as follows:
            If cIdx is equal to 0 and both samples $p_0$ and $q_0$ are in a coding block with intra_bdpcm_flag equal to 1, bS[$xD_i$][$yD_j$] is set equal to 0.

Otherwise, if the sample $p_0$ or $q_0$ is in the coding block of a coding unit coded with intra prediction mode, $bS[xD_i][yD_j]$ is set equal to 2.

Otherwise, if the block edge is also a transform block edge and the sample $p_0$ or $q_0$ is in a coding block with ciip_flag equal to 1, $bS[xD_i][yD_j]$ is set equal to 2.

Otherwise, if the block edge is also a transform block edge and the sample $p_0$ or $q_0$ is in a transform block which contains one or more non-zero transform coefficient levels, $bS[xD_i][yD_j]$ is set equal to 1.

Otherwise, if the block edge is also a transform block edge, cIdx is greater than 0, and the sample $p_0$ or $q_0$ is in a transform unit with tu_joint_cber_residual_flag equal to 1, $bS[xD_i][yD_j]$ is set equal to 1.

Otherwise, if the prediction mode of the coding subblock containing the sample $p_0$ is different from the prediction mode of the coding subblock containing the sample $q_0$ (i.e. one of the coding subblock is coded in IBC prediction mode and the other is coded in inter prediction mode), $bS[xD_i][yD_j]$ is set equal to 1.

Otherwise, if cIdx is equal to 0 and one or more of the following conditions are true, $bS[xD_i][yD_j]$ is set equal to 1:

The coding subblock containing the sample $p_0$ and the coding subblock containing the sample $q_0$ are both coded in IBC prediction mode, and the absolute difference between the horizontal or vertical component of the block vectors used in the prediction of the two coding subblocks is greater than or equal to 8 in units of 1/16 luma samples.

For the prediction of the coding subblock containing the sample $p_0$ different reference pictures or a different number of motion vectors are used than for the prediction of the coding subblock containing the sample $q_0$.

NOTE—The determination of whether the reference pictures used for the two coding subblocks are the same or different is based only on which pictures are referenced, without regard to whether a prediction is formed using an index into reference picture list 0 or an index into reference picture list 1, and also without regard to whether the index position within a reference picture list is different.

NOTE—The number of motion vectors that are used for the prediction of a coding subblock with top-left sample covering (xSb, ySb), is equal to PredFlagL0[xSb][ySb]+PredFlagL1[xSb][ySb].

One motion vector is used to predict the coding subblock containing the sample $p_0$ and one motion vector is used to predict the coding subblock containing the sample $q_0$, and the absolute difference between the horizontal or vertical component of the motion vectors used is greater than or equal to 8 in units of 1/16 luma samples.

Two motion vectors and two different reference pictures are used to predict the coding subblock containing the sample $p_0$, two motion vectors for the same two reference pictures are used to predict the coding subblock containing the sample $q_0$ and the absolute difference between the horizontal or vertical component of the two motion vectors used in the prediction of the two coding subblocks for the same reference picture is greater than or equal to 8 in units of 1/16 luma samples.

Two motion vectors for the same reference picture are used to predict the coding subblock containing the sample $p_0$, two motion vectors for the same reference picture are used to predict the coding subblock containing the sample $q_0$ and both of the following conditions are true:

The absolute difference between the horizontal or vertical component of list 0 motion vectors used in the prediction of the two coding subblocks is greater than or equal to 8 in 1/16 luma samples, or the absolute difference between the horizontal or vertical component of the list 1 motion vectors used in the prediction of the two coding subblocks is greater than or equal to 8 in units of 1/16 luma samples.

The absolute difference between the horizontal or vertical component of list 0 motion vector used in the prediction of the coding subblock containing the sample $p_0$ and the list 1 motion vector used in the prediction of the coding subblock containing the sample $q_0$ is greater than or equal to 8 in units of 1/16 luma samples, or the absolute difference between the horizontal or vertical component of the list 1 motion vector used in the prediction of the coding subblock containing the sample $p_0$ and list 0 motion vector used in the prediction of the coding subblock containing the sample $q_0$ is greater than or equal to 8 in units of 1/16 luma samples.

Otherwise, the variable $bS[xD_i][yD_j]$ is set equal to 0.

As described above, in JVET-02001, the variable MergeTriangleFlag[x0][y0] may specify whether triangular shape based motion compensation is used to generate the prediction samples of a current coding unit. In triangular shape based motion compensation, a rectangular video block is predicted using two triangular shaped predictions. Two weighting processes may be specified that assign equal or nearly equal weights to the reference prediction samples either about the diagonal (from top-left corner to bottom-right corner) or about the inverse diagonal (from top-right corner to bottom-left corner) direction. Each reference rectangular prediction is generated using its own motion vector(s) and reference frame index. Each prediction sample of a current coding unit is obtained using a weighting of two reference prediction sample values and as such motion discontinuity may be smoothened by the weighting process. As such, deblocking internal edges based on motion discontinuity for a coding unit with triangular shape based weighting process may be less than ideal.

In one example, according to the techniques herein, motion discontinuity for internal edges may not be considered for deblocking in cases where triangular shape based weighting process is used to generate the prediction samples of a current coding unit. Whether an edge is an internal edge may be determined based on edge type being filtered and distance from a corresponding coding unit edge (e.g., distance from left and/or right coding unit edge when performing deblocking for a vertical edge type; distance from top and/or bottom coding unit edge when performing deblocking for a horizontal edge type). In one example, not considering motion discontinuity for internal edges for deblocking in cases where triangular shape based weighting process is used to generate the prediction samples of a current coding unit, may be achieved by deriving a bS value according to the following process:

Inputs to this process are:
a picture sample array recPicture,
a location (xCb, yCb) specifying the top-left sample of the current coding block relative to the top-left sample of the current picture,
a variable nCbW specifying the width of the current coding block,
a variable nCbH specifying the height of the current coding block,
a variable edgeType specifying whether a vertical (EDGE_VER) or a horizontal (EDGE_HOR) edge is filtered,
a variable cIdx specifying the colour component of the current coding block,
a two-dimensional (nCbW)×(nCbH) array edgeFlags.

Output of this process is a two-dimensional (nCbW)×(nCbH) array bS specifying the boundary filtering strength.

The variables $xD_i$, $yD_j$, xN and yN are derived as follows:
The variable gridSize is set as follows:

$$gridSize = cIdx == 0 ? 4 : 8$$

If edgeType is equal to EDGE_VER, $$xD_i = (i * gridSize)$$
$$yD_j = cIdx == 0 ? (j \ll 2) : (j \ll 1)$$
$$xN \text{ is set equal to } \operatorname{Max}(0, (nCbW/gridSize) - 1)$$
$$yN = cIdx == 0 ? (nCbH/4) - 1 : (nCbH/2) - 1$$

Otherwise (edgeType is equal to EDGE_HOR), $$xD_i = cIdx == 0 ? (i \ll 2) : (i \ll 1)$$
$$yD_j = (j * gridSize)$$
$$xN = cIdx == 0 ? (nCbW/4) - 1 : (nCbW/2) - 1$$
$$yN = \operatorname{Max}(0, (nCbH/gridSize) - 1)$$

For $xD_i$ with i=0 . . . xN and $yD_j$ with j=0 . . . yN, the following applies:

If edgeFlags[$xD_i$][$yD_j$] is equal to 0, the variable bS[$xD_i$][$yD_j$] is set equal to 0.

Otherwise, the following applies:
The sample values $p_0$ and $q_0$ are derived as follows:
If edgeType is equal to EDGE_VER, $p_0$ is set equal to recPicture[xCb+$xD_i$−1][yCb+$yD_j$] and $q_0$ is set equal to recPicture[xCb+$xD_i$][yCb+$yD_j$].
Otherwise (edgeType is equal to EDGE_HOR), $p_0$ is set equal to recPicture[xCb+$xD_i$][yCb+$yD_j$−1] and $q_0$ is set equal to recPicture[xCb+$xD_i$][yCb+$yD_j$].

The variable bS[$xD_i$][$yD_j$] is derived as follows:
If cIdx is equal to 0 and both samples $p_0$ and $q_0$ are in a coding block with intra_bdpcm_flag equal to 1, bS[$xD_i$][$yD_j$] is set equal to 0.

Otherwise, if the sample $p_0$ or $q_0$ is in the coding block of a coding unit coded with intra prediction mode, bS[$xD_i$][$yD_j$] is set equal to 2.
Otherwise, if the block edge is also a transform block edge and the sample $p_0$ or $q_0$ is in a coding block with clip_flag equal to 1, bS[$xD_i$][$yD_j$] is set equal to 2.
Otherwise, if the block edge is also a transform block edge and the sample $p_0$ or $q_0$ is in a transform block which contains one or more non-zero transform coefficient levels, bS[$xD_i$][$yD_j$] is set equal to 1.
Otherwise, if the block edge is also a transform block edge, cIdx is greater than 0, and the sample $p_0$ or $q_0$ is in a transform unit with tu_joint_cber_residual_flag equal to 1, bS[$xD_A$][$yD_j$] is set equal to 1.
Otherwise, if the prediction mode of the coding subblock containing the sample $p_0$ is different from the prediction mode of the coding subblock containing the sample $q_0$ (i.e. one of the coding subblock is coded in IBC prediction mode and the other is coded in inter prediction mode), bS[$xD_i$][$yD_j$] is set equal to 1.
Otherwise, if MergeTriangleFlag[xCb][yCb] is equal to 1, edgeType is equal to EDGE_VER, and $xD_i$ is not equal to 0, bS[$xD_i$][$yD_j$] is set equal to 0.
Otherwise, if MergeTriangleFlag[xCb][yCb] is equal to 1, edgeType is equal to EDGE_HOR, and $yD_j$ is not equal to 0, bS[$xD_i$][$yD_j$] is set equal to 0.
Otherwise, if cIdx is equal to 0 and one or more of the following conditions are true, bS[$xD_i$][$yD_j$] is set equal to 1:
The coding subblock containing the sample $p_0$ and the coding subblock containing the sample $q_0$ are both coded in IBC prediction mode, and the absolute difference between the horizontal or vertical component of the block vectors used in the prediction of the two coding subblocks is greater than or equal to 8 in units of ⅟₁₆ luma samples.
For the prediction of the coding subblock containing the sample $p_0$ different reference pictures or a different number of motion vectors are used than for the prediction of the coding subblock containing the sample $q_0$.
NOTE—The determination of whether the reference pictures used for the two coding subblocks are the same or different is based only on which pictures are referenced, without regard to whether a prediction is formed using an index into reference picture list 0 or an index into reference picture list 1, and also without regard to whether the index position within a reference picture list is different.
NOTE—The number of motion vectors that are used for the prediction of a coding subblock with top-left sample covering (xSb,ySb), is equal to PredFlagL0[xSb][ySb]+
One motion vector is used to predict the coding subblock containing the sample $p_0$ and one motion vector is used to predict the coding subblock containing the sample $q_0$, and the absolute difference between the horizontal or vertical component of the motion vectors used is greater than or equal to 8 in units of ⅟₁₆ luma samples.

Two motion vectors and two different reference pictures are used to predict the coding subblock containing the sample pa, two motion vectors for the same two reference pictures are used to predict the coding subblock containing the sample $q_0$ and the absolute difference between the horizontal or vertical component of the two motion vectors used in the prediction of the two coding subblocks for the same reference picture is greater than or equal to 8 in units of 1/16 luma samples.

Two motion vectors for the same reference picture are used to predict the coding subblock containing the sample $p_0$, two motion vectors for the same reference picture are used to predict the coding subblock containing the sample $q_0$ and both of the following conditions are true:
The absolute difference between the horizontal or vertical component of list 0 motion vectors used in the prediction of the two coding subblocks is greater than or equal to 8 in 1/16 luma samples, or the absolute difference between the horizontal or vertical component of the list 1 motion vectors used in the prediction of the two coding subblocks is greater than or equal to 8 in units of 1/16 luma samples.
The absolute difference between the horizontal or vertical component of list 0 motion vector used in the prediction of the coding subblock containing the sample $p_0$ and the list 1 motion vector used in the prediction of the coding subblock containing the sample $q_0$ is greater than or equal to 8 in units of 1/16 luma samples, or the absolute difference between the horizontal or vertical component of the list 1 motion vector used in the prediction of the coding subblock containing the sample $p_0$ and list 0 motion vector used in the prediction of the coding subblock containing the sample $q_0$ is greater than or equal to 8 in units of 1/16 luma samples.
Otherwise, the variable $bS[xD_i][yD_j]$ is set equal to 0.

In one example, according to the techniques herein, motion discontinuity for internal edges may not be considered for deblocking in cases where a CU makes use of affine mode, and the edge is not a 8×8 CU grid. In one example, not considering motion discontinuity for internal edges for deblocking in cases where a CU makes use of affine mode, and the edge is not a 8×8 CU grid, may be achieved by deriving a bS value according to the following process:
Inputs to this process are:
a picture sample array recPicture,
a location (xCb, yCb) specifying the top-left sample of the current coding block relative to the top-left sample of the current picture,
a variable nCbW specifying the width of the current coding block,
a variable nCbH specifying the height of the current coding block,
a variable edgeType specifying whether a vertical (EDGE_VER) or a horizontal (EDGE_HOR) edge is filtered,
a variable cIdx specifying the colour component of the current coding block,
a two-dimensional (nCbW)×(nCbH) array edgeFlags.

Output of this process is a two-dimensional (nCbW)×(nCbH) array bS specifying the boundary filtering strength.
The variables $xD_i$, $yD_j$, xN and yN are derived as follows:
The variable gridSize is set as follows:

$$gridSize = cIdx == 0\,?\,4:8$$

If edgeType is equal to EDGE_VER, $$xD_i = (i * gridSize)$$
$$yD_j = cIdx == 0\,?\,(j \ll 2):(j \ll 1)$$
$$xN \text{ is set equal to } \mathrm{Max}(0, (nCbW/gridSize) - 1)$$
$$yN = cIdx == 0\,?\,(nCbH/4) - 1: (nCbH/2) - 1$$

Otherwise (edgeType is equal to EDGE_HOR), $$xD_i = cIdx == 0\,?\,(i \ll 2):(i \ll 1)$$
$$yD_j = (j * gridSize)$$
$$xN = cIdx == 0\,?\,(nCbW/4) - 1: (nCbW/2) - 1$$
$$yN = \mathrm{Max}(0, (nCbH/gridSize) - 1)$$

For $xD_i$ with i=0 . . . xN and $yD_j$ with j=0 . . . yN, the following applies:
If edgeFlags[$xD_i$][$yD_j$] is equal to 0, the variable $bS[xD_i][yD_j]$ is set equal to 0.
Otherwise, the following applies:
The sample values $p_0$ and $q_0$ are derived as follows:
If edgeType is equal to EDGE_VER, pc is set equal to recPicture[xCb+$xD_i$−1][yCb+$yD_j$] and $q_0$ is set equal to recPicture[xCb+$xD_i$][yCb+$yD_j$].
Otherwise (edgeType is equal to EDGE_HOR), $p_0$ is set equal to recPicture[xCb+$xD_i$][yCb+$yD_j$−1] and $q_0$ is set equal to recPicture[xCb+$xD_i$][yCb+$yD_j$].
The variable $bS[xD_i][yD_j]$ is derived as follows:
If cIdx is equal to 0 and both samples $p_0$ and $q_0$ are in a coding block with intra_bdpcm_flag equal to 1, $bS[xD_i][yD_j]$ is set equal to 0.
Otherwise, if the sample $p_0$ or $q_0$ is in the coding block of a coding unit coded with intra prediction mode, $bS[xD_i][yD_i]$ is set equal to 2.
Otherwise, if the block edge is also a transform block edge and the sample $p_0$ or $q_0$ is in a coding block with ciip_flag equal to 1, $bS[xD_i][yD_j]$ is set equal to 2.
Otherwise, if the block edge is also a transform block edge and the sample $p_0$ or $q_0$ is in a transform block which contains one or more non-zero transform coefficient levels, $bS[xD_i][yD_j]$ is set equal to 1.
Otherwise, if the block edge is also a transform block edge, cIdx is greater than 0, and the sample $p_0$ or $q_0$ is in a transform unit with tu_joint_cber_residual_flag equal to 1, $bS[xD_i][yD_j]$ is set equal to 1.
Otherwise, if the prediction mode of the coding subblock containing the sample $p_0$ is different from the prediction mode of the coding subblock containing the sample $q_0$ (i.e. one of the coding subblock is coded in IBC prediction mode and the other is coded in inter prediction mode), $bS[xD_i][yD_1]$ is set equal to 1.

Otherwise, if ((subblock_merge_flag[xCb][yCb] is equal to 1 and MotionModelIdc[xCb][yCb] is not equal to 0) or (inter_affine_flag[xCb][yCb] is equal to 1)), edgeType is equal to EDGE_VER and ($xD_i$% 8) is not equal to 0, $bS[xD_i][yD_j]$ is set equal to 0.

Otherwise, if ((subblock_merge_flag[xCb][yCb] is equal to 1 and MotionModelIdc[xCb][yCb] is not equal to 0) or (inter_affine_flag[xCb][yCb] is equal to 1)), edgeType is equal to EDGE_HOR, and ($yD_j$% 8) is not equal to 0, $bS[xD_j][yD_j]$ is set equal to 0.

Otherwise, if MergeTriangleFlag[xCb][yCb] is equal to 1, edgeType is equal to EDGE_VER, and $xD_i$ is not equal to 0, $bS[xD_i][yD_j]$ is set equal to 0.

Otherwise, if MergeTriangleFlag[xCb][yCb] is equal to 1, edgeType is equal to EDGE_HOR, and $yD_j$ is not equal to 0, $bS[xD_i][yD_j]$ is set equal to 0.

Otherwise, if cIdx is equal to 0 and one or more of the following conditions are true, $bS[xD_i][yD_j]$ is set equal to 1:

- The coding subblock containing the sample $p_0$ and the coding subblock containing the sample $q_0$ are both coded in IBC prediction mode, and the absolute difference between the horizontal or vertical component of the block vectors used in the prediction of the two coding subblocks is greater than or equal to 8 in units of 1/16 luma samples.
- For the prediction of the coding subblock containing the sample $p_0$ different reference pictures or a different number of motion vectors are used than for the prediction of the coding subblock containing the sample $q_0$.
  NOTE—The determination of whether the reference pictures used for the two coding subblocks are the same or different is based only on which pictures are referenced, without regard to whether a prediction is formed using an index into reference picture list 0 or an index into reference picture list 1, and also without regard to whether the index position within a reference picture list is different.
  NOTE—The number of motion vectors that are used for the prediction of a coding subblock with top-left sample covering (xSb, ySb), is equal to PredFlagL0[xSb][ySb]+PredFlagL1[xSb][ySb].
- One motion vector is used to predict the coding subblock containing the sample $p_0$ and one motion vector is used to predict the coding subblock containing the sample $q_0$, and the absolute difference between the horizontal or vertical component of the motion vectors used is greater than or equal to 8 in units of 1/16 luma samples.
- Two motion vectors and two different reference pictures are used to predict the coding subblock containing the sample $p_0$, two motion vectors for the same two reference pictures are used to predict the coding subblock containing the sample $q_0$ and the absolute difference between the horizontal or vertical component of the two motion vectors used in the prediction of the two coding subblocks for the same reference picture is greater than or equal to 8 in units of 1/16 luma samples.
- Two motion vectors for the same reference picture are used to predict the coding subblock containing the sample $p_0$, two motion vectors for the same reference picture are used to predict the coding subblock containing the sample $q_0$ and both of the following conditions are true:
  The absolute difference between the horizontal or vertical component of list 0 motion vectors used in the prediction of the two coding subblocks is greater than or equal to 8 in 1/16 luma samples, or the absolute difference between the horizontal or vertical component of the list 1 motion vectors used in the prediction of the two coding subblocks is greater than or equal to 8 in units of 1/16 luma samples.
  The absolute difference between the horizontal or vertical component of list 0 motion vector used in the prediction of the coding subblock containing the sample $p_0$ and the list 1 motion vector used in the prediction of the coding subblock containing the sample $q_0$ is greater than or equal to 8 in units of 1/16 luma samples, or the absolute difference between the horizontal or vertical component of the list 1 motion vector used in the prediction of the coding subblock containing the sample $p_0$ and list 0 motion vector used in the prediction of the coding subblock containing the sample $q_0$ is greater than or equal to 8 in units of 1/16 luma samples.

Otherwise, the variable $bS[xD_i][yD_j]$ is set equal to 0.

Referring again to FIG. 8, entropy encoding unit 218 receives quantized transform coefficients and predictive syntax data (i.e., intra prediction data, motion prediction data, QP data, etc.). Entropy encoding unit 218 may be configured to perform entropy encoding according to one or more of the techniques described herein. Entropy encoding unit 218 may be configured to output a compliant bitstream, i.e., a bitstream that a video decoder can receive and reproduce video data therefrom. In this manner, video encoder 200 represents an example of a device configured to receive arrays of sample values including adjacent reconstructed video blocks for respective luma and chroma channels of video data, for each of a horizontal and vertical direction, determine whether the number of chroma samples is half of or equal to the number of luma samples, select lines for computing gradients for determining blockiness for chroma based on the determination, determine blockiness based on the selected lines, and modify sample values in the adjacent reconstructed video blocks based on the determined blockiness according to a deblocking filter.

Figure 15:
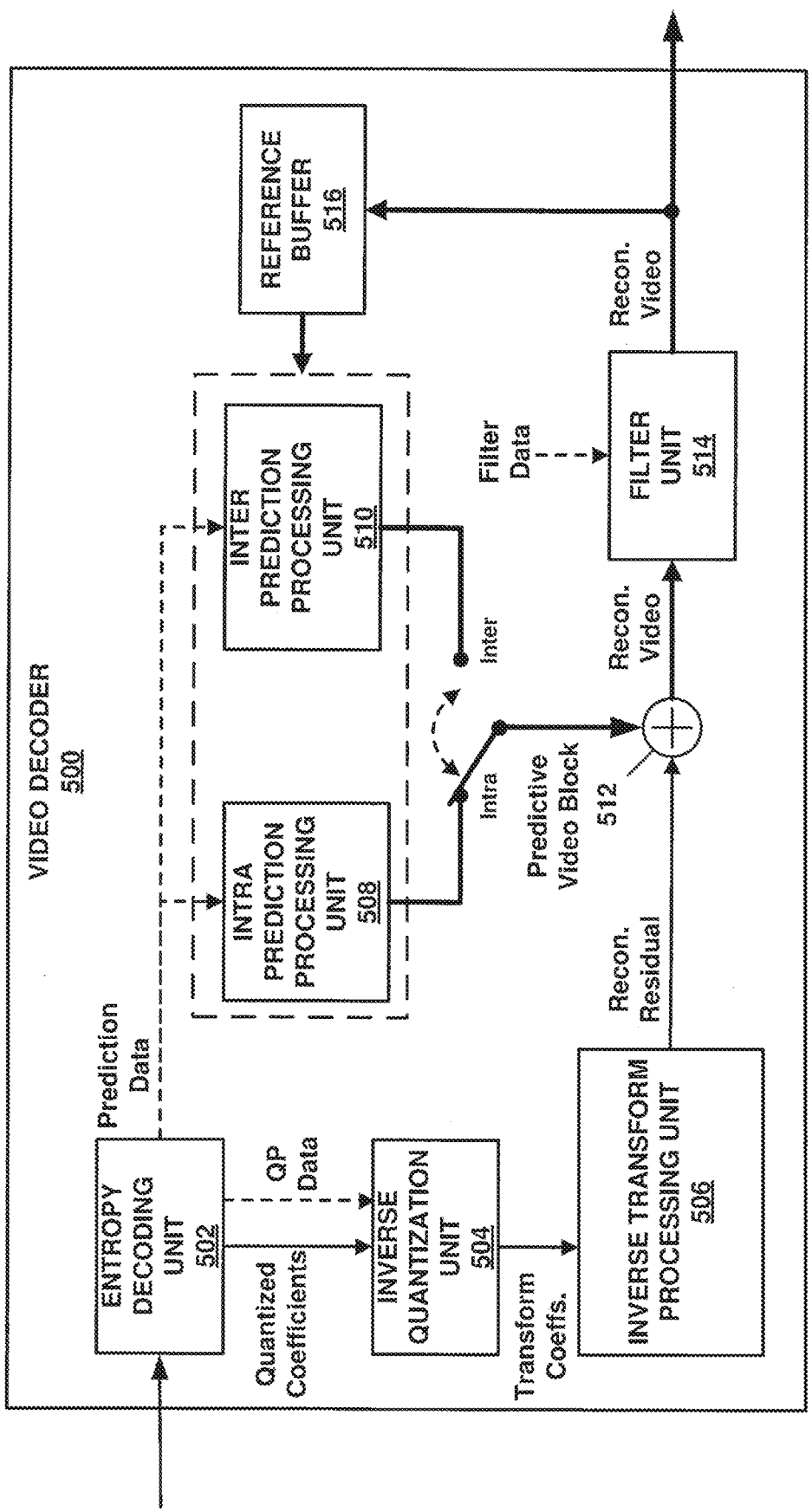
FIG. 15 is a block diagram illustrating an example of a video decoder that may be configured to decode video data according to one or more techniques of this disclosure.

FIG. 15 is a block diagram illustrating an example of a video decoder that may be configured to decode video data according to one or more techniques of this disclosure. In one example, video decoder 500 may be configured to reconstruct video data based on one or more of the techniques described above. That is, video decoder 500 may operate in a reciprocal manner to video encoder 200 described above. Video decoder 500 may be configured to perform intra prediction decoding and inter prediction decoding and, as such, may be referred to as a hybrid decoder. In the example illustrated in FIG. 15 video decoder 500 includes an entropy decoding unit 502, inverse quantization unit 504, inverse transformation processing unit 506, intra prediction processing unit 508, inter prediction processing unit 510, summer 512, filter unit 514, and reference buffer 516. Video decoder 500 may be configured to decode video data in a manner consistent with a video encoding system, which may implement one or more aspects of a video coding standard. It should be noted that although example video decoder 500 is illustrated as having distinct functional blocks, such an illustration is for descriptive purposes and does not limit video decoder 500 and/or subcomponents thereof to a particular hardware or software architecture. Functions of video decoder 500 may be realized using any combination of hardware, firmware, and/or software implementations.

As illustrated in FIG. 15, entropy decoding unit 502 receives an entropy encoded bitstream. Entropy decoding unit 502 may be configured to decode quantized syntax elements and quantized coefficients from the bitstream according to a process reciprocal to an entropy encoding process. Entropy decoding unit 502 may be configured to perform entropy decoding according any of the entropy coding techniques described above. Entropy decoding unit 502 may parse an encoded bitstream in a manner consistent with a video coding standard. Video decoder 500 may be configured to parse an encoded bitstream where the encoded bitstream is generated based on the techniques described above.

Referring again to FIG. 15, inverse quantization unit 504 receives quantized transform coefficients (i.e., level values) and quantization parameter data from entropy decoding unit 502. Quantization parameter data may include any and all combinations of delta QP values and/or quantization group size values and the like described above. Video decoder 500 and/or inverse quantization unit 504 may be configured to determine QP values used for inverse quantization based on values signaled by a video encoder and/or through video properties and/or coding parameters. That is, inverse quantization unit 504 may operate in a reciprocal manner to coefficient quantization unit 206 described above. For example, inverse quantization unit 504 may be configured to infer predetermined values), allowed quantization group sizes, and the like, according to the techniques described above. Inverse quantization unit 504 may be configured to apply an inverse quantization. Inverse transform processing unit 506 may be configured to perform an inverse transformation to generate reconstructed residual data. The techniques respectively performed by inverse quantization unit 504 and inverse transform processing unit 506 may be similar to techniques performed by inverse quantization/transform processing unit 208 described above. Inverse transform processing unit 506 may be configured to apply an inverse DCT, an inverse DST, an inverse integer transform, Non-Separable Secondary Transform (NSST), or a conceptually similar inverse transform processes to the transform coefficients in order to produce residual blocks in the pixel domain. Further, as described above, whether a particular transform (or type of particular transform) is performed may be dependent on an intra prediction mode. As illustrated in FIG. 15, reconstructed residual data may be provided to summer 512. Summer 512 may add reconstructed residual data to a predictive video block and generate reconstructed video data. A predictive video block may be determined according to a predictive video technique (i.e., intra prediction and inter frame prediction).

Intra prediction processing unit 508 may be configured to receive intra prediction syntax elements and retrieve a predictive video block from reference buffer 516. Reference buffer 516 may include a memory device configured to store one or more frames of video data. Intra prediction syntax elements may identify an intra prediction mode, such as the intra prediction modes described above. In one example, intra prediction processing unit 308 may reconstruct a video block using according to one or more of the intra prediction coding techniques described herein. Inter prediction processing unit 510 may receive inter prediction syntax elements and generate motion vectors to identify a prediction block in one or more reference frames stored in reference buffer 516. Inter prediction processing unit 510 may produce motion compensated blocks, possibly performing interpolation based on interpolation filters. Identifiers for interpolation filters to be used for motion estimation with sub-pixel precision may be included in the syntax elements. Inter prediction processing unit 510 may use interpolation filters to calculate interpolated values for sub-integer pixels of a reference block.

Filter unit 514 may be configured to perform filtering on reconstructed video data. For example, Filter unit 514 may be configured to perform deblocking and/or SAO filtering, as described above with respect to filter unit 216. Further, it should be noted that in some examples, filter unit 514 may be configured to perform proprietary discretionary filter (e.g., visual enhancements). As illustrated in FIG. 15, a reconstructed video block may be output by video decoder 500. In this manner, video decoder 500 represents an example of a device configured to receive arrays of sample values including adjacent reconstructed video blocks for respective luma and chroma channels of video data, for each of a horizontal and vertical direction, determine whether the number of chroma samples is half of or equal to the number of luma samples, select lines for computing gradients for determining blockiness for chroma based on the determination, determine blockiness based on the selected lines, and modify sample values in the adjacent reconstructed video blocks based on the determined blockiness according to a deblocking filter.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM. EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium.

For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

Various examples have been described. These and other examples are within the scope of the following claims.

SUMMARY

In one example, a method of filtering reconstructed video data, the method comprising: receiving arrays of sample values including adjacent reconstructed video blocks for respective luma and chroma channels of video data; for each of a horizontal and vertical direction, determining whether the number of chroma samples is half of or equal to the number of luma samples; selecting lines for computing gradients for determining blockiness for chroma based on the determination; determining blockiness based on the selected lines; and modifying sample values in the adjacent reconstructed video blocks based on the determined blockiness according to a deblocking filter.

In one example, the method, wherein the video data has a chroma format selected from: 4:2:0, 4:2:2, and 4:4:4.

In one example, a device for coding video data, the device comprising one or more processors configured to perform any and all combinations of the steps.

In one example, the device, wherein the device includes a video encoder.

In one example, the device, wherein the device includes a video decoder.

In one example, a system comprising: the device includes a video encoder; and the device includes a video decoder.

In one example, an apparatus for coding video data, the apparatus comprising means for performing any and all combinations of the steps.

In one example, a non-transitory computer-readable storage medium comprising instructions stored thereon that, when executed, cause one or more processors of a device for coding video data to perform any and all combinations of the steps.

In one example, a method of filtering reconstructed video data, the method comprising: receiving reconstructed video data having a 4:2:2 chroma format; for a four line decision segment corresponding to a vertical deblocking boundary for a chroma component of the video data, computing a gradient value using samples included in the first and fourth lines; modifying a parameter on which a filter length depends by using sample values adjacent to the vertical deblocking boundary.

In one example, the method, wherein a filter length is determined based on the parameter and based on whether the computed gradient value is less than a threshold value.

In one example, the method, wherein computing a gradient value using samples included in the first and fourth lines includes adding a gradient result corresponding to the first line to a gradient result corresponding to the fourth line.

In one example, a device for coding video data, the device comprising one or more processors configured to: receive reconstructed video data having a 4:2:2 chroma format; for a four line decision segment corresponding to a vertical deblocking boundary for a chroma component of the video data, compute a gradient value using samples included in the first and fourth lines; and modify a parameter on which a filter length depends by using sample values adjacent to the vertical deblocking boundary.

In one example, the device, wherein a filter length is determined based on the parameter and based on whether the computed gradient value is less than a threshold value.

In one example, the device, wherein computing a gradient value using samples included in the first and fourth lines include adding a gradient result corresponding to the first line to a gradient result corresponding to the fourth line.

In one example, the device, wherein the device includes a video decoder.

CROSS REFERENCE

This Nonprovisional application claims priority under 35 U.S.C. § 119 on provisional Application No. 62/866,596 on Jun. 25, 2019, No. 62/871,156 on Jul. 7, 2019, No. 62/891,262 on Aug. 23, 2019, No. 62/898,411 on Sep. 10, 2019, No. 62/900,965 on Sep. 16, 2019, the entire contents of which are hereby incorporated by reference.

The invention claimed is:

1. A method of filtering reconstructed video data, the method comprising:
   deriving a sub width chroma variable based on a chroma format, wherein the sub width chroma variable is set to 2 for a 4:2:0 chroma format and is set to 1 for a 4:4:4 chroma format;
   for a chroma component of the reconstructed video data with an edge type being a horizontal edge, computing a gradient value as follows, computing a first value using samples included in a first line perpendicular to the horizontal edge, determining whether the sub width chroma variable is equal to 2, computing a second value by using one of: samples included in a fourth line perpendicular to the horizontal edge based on the sub height chroma variable not being equal to 2 or samples included in a second line perpendicular to the horizontal edge based on the sub width chroma variable being equal to 2, and computing the gradient value using the first value and the second value;
   determining, based on whether or not the gradient value is less than a threshold variable, whether or not to modify a maximum filter length variable from 3 to 1; and
   filtering the chroma component of the reconstructed video data with the edge type being the horizontal edge based on the maximum filter length variable.

2. A device of filtering reconstructed video data, the device comprising one or more processors configured to:
   derive a sub width chroma variable based on a chroma format, wherein the sub width chroma variable is set to 2 for a 4:2:0 chroma format and is set to 1 for a 4:4:4 chroma format;
   for a chroma component of the reconstructed video data with an edge type being a horizontal edge, compute a gradient value as follows, compute a first value using samples included in a first line perpendicular to the horizontal edge, determine whether the sub width chroma variable is equal to 2, compute a second value by using one of: samples included in a fourth line perpendicular to the horizontal edge based on the sub height chroma variable not being equal to 2 or samples included in a second line perpendicular to the horizontal edge based on the sub width chroma variable being equal to 2, and compute the gradient value using the first value and the second value;
   determine, based on whether or not the gradient value is less than a threshold variable, whether or not to modify a maximum filter length variable from 3 to 1; and
   filter the chroma component of the reconstructed video data with the edge type being the horizontal edge based on the maximum filter length variable.

3. The device of claim 2, wherein the device is a video decoder.

* * * * *